US007770500B2

(12) United States Patent
Nishio et al.

(10) Patent No.: US 7,770,500 B2
(45) Date of Patent: Aug. 10, 2010

(54) SUBSTRATE DIVIDING SYSTEM, SUBSTRATE MANUFACTURING EQUIPMENT, SUBSTRATE SCRIBING METHOD AND SUBSTRATE DIVIDING METHOD

(75) Inventors: Yoshitaka Nishio, Osaka (JP); Yasutomo Okajima, Osaka (JP); Yukio Oshima, Osaka (JP); Hiroyuki Ohnari, Hyogo (JP); Kazuhiro Yoshimoto, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 750 days.

(21) Appl. No.: 10/598,878

(22) PCT Filed: Mar. 14, 2005

(86) PCT No.: PCT/JP2005/004478

§ 371 (c)(1),
(2), (4) Date: May 21, 2007

(87) PCT Pub. No.: WO2005/087458

PCT Pub. Date: Sep. 22, 2005

(65) Prior Publication Data

US 2007/0281444 A1      Dec. 6, 2007

(30) Foreign Application Priority Data

Mar. 15, 2004   (JP)   .............................. 2004-117374

(51) Int. Cl.
*B26D 3/08*    (2006.01)
*B26D 5/04*    (2006.01)
*B26F 3/00*    (2006.01)

(52) U.S. Cl. .............................. 83/435; 83/271; 83/879; 83/882; 225/2

(58) Field of Classification Search .................. 83/401, 83/517, 559, 733, 271, 435, 885, 434, 879, 83/882; 225/2, 96, 96.5; 901/40; 248/128; 198/606; 162/194, 286
See application file for complete search history.

(56) References Cited

U.S. PATENT DOCUMENTS 4,736,661 A * 4/1988 Shirai .......................... 83/882
6,774,978 B2 * 8/2004 Shin ............................ 349/187

FOREIGN PATENT DOCUMENTS

| JP | 05-229840 | 9/1993 |
| JP | 07-223830 | 8/1995 |
| JP | 09-188534 | 7/1997 |
| JP | 10-209086 | 8/1998 |
| JP | 2000-264657 | 9/2000 |
| JP | 2001-206727 | 7/2001 |
| JP | 2001-347497 | 12/2001 |
| JP | 2004-066636 | 3/2004 |
| WO | WO 02/057192 | 7/2002 |
| WO | WO 2057192 A1 * | 7/2002 |
| WO | WO 03/072516 | 9/2003 |

* cited by examiner

*Primary Examiner*—Ghassem Alie
(74) *Attorney, Agent, or Firm*—Snell & Wilmer L.L.P.

(57) ABSTRACT

A substrate cutting system which requires a small footprint area so as to be compact, and also which is capable of efficiently cutting a substrate is disclosed. A pair of substrate cutting devices are provided in a cutting device guide body 30 so as to be movable along a direction perpendicular to the moving direction of the clamp devices 50, the pair of substrate cutting devices cutting the mother substrate from each of the top surface and the bottom surface of the mother substrate which is clamped by the clamp devices 50.

22 Claims, 39 Drawing Sheets

FIG.5
(a)
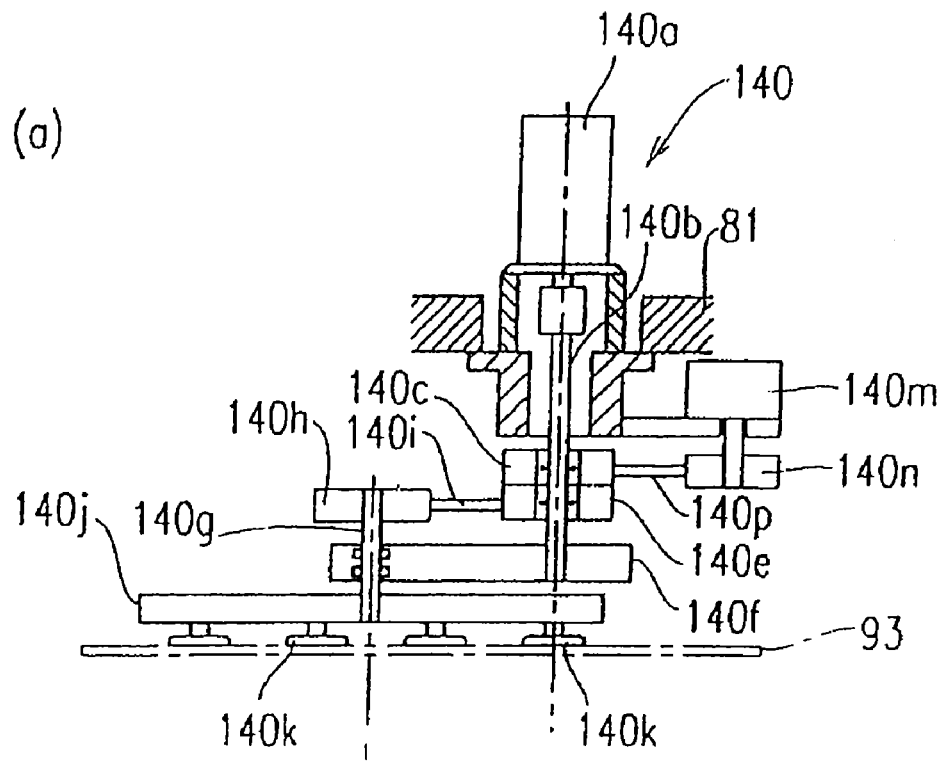
(b)
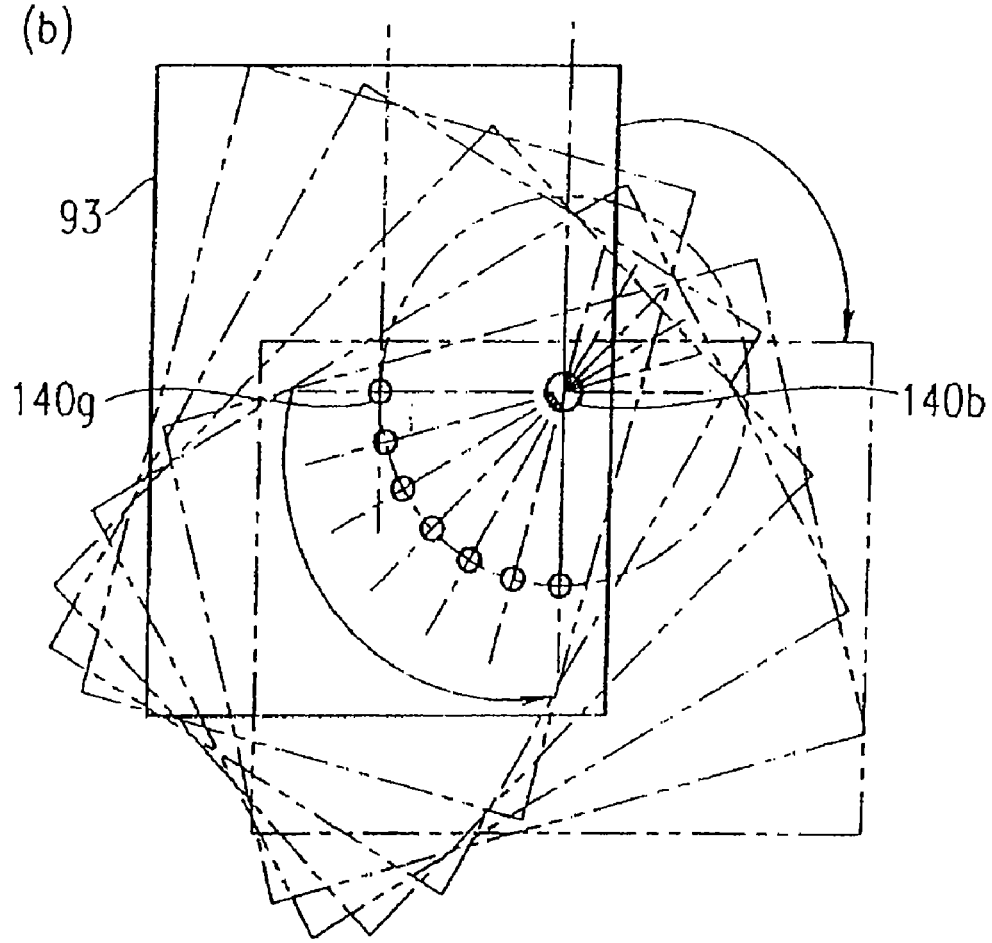

——— Main scribing line
----- Supplementary scribing line

— Main scribing line
------- Supplementary scribing line

FIG.26
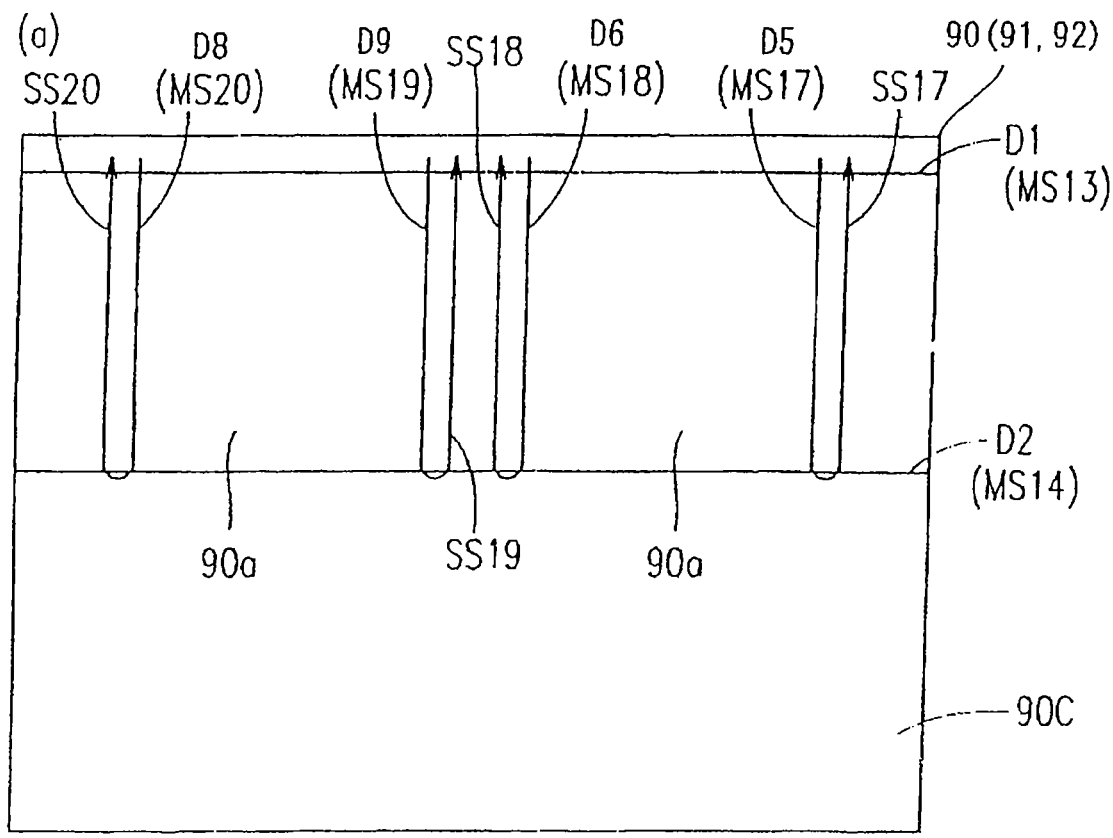
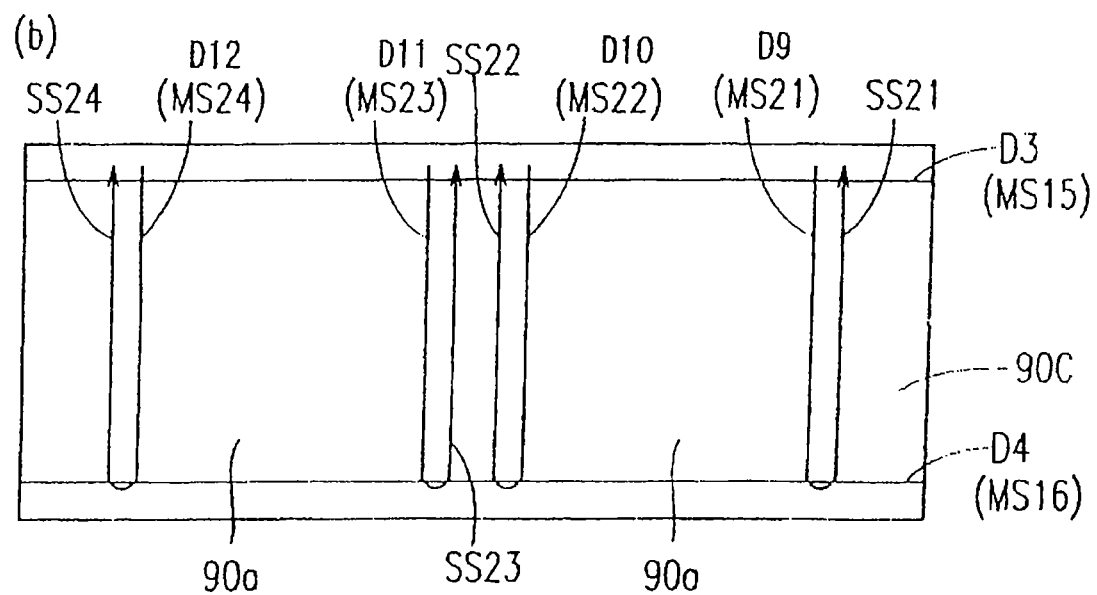

FIG.42
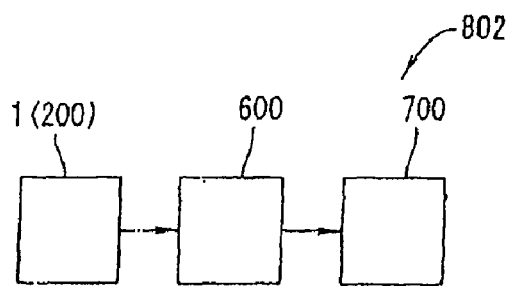
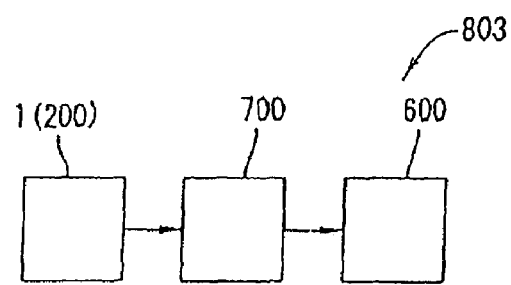
FIG.43
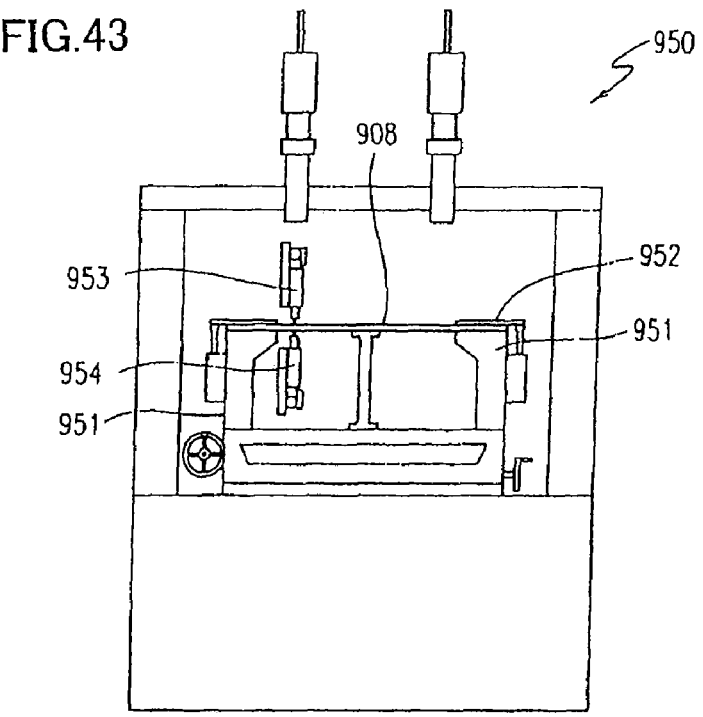
PRIOR ART

SUBSTRATE DIVIDING SYSTEM, SUBSTRATE MANUFACTURING EQUIPMENT, SUBSTRATE SCRIBING METHOD AND SUBSTRATE DIVIDING METHOD

TECHNICAL FIELD

The present invention relates to a substrate cutting system used for cutting a mother substrate made of a variety of materials including a mother substrate (e.g., a glass substrate used as a display panel for a liquid crystal display device, etc). In particular, the present invention relates to a substrate cutting system, a substrate manufacturing apparatus, a substrate scribing method and a substrate cutting method preferably used for cutting a bonded mother substrate for which a pair of brittle material substrates is bonded to each other.

BACKGROUND ART

Normally, a display panel for a liquid crystal display device, etc is formed with a glass substrate which is a brittle material substrate. In the liquid crystal display device, the display panel is fabricated by bonding a pair of glass substrates with an appropriate space formed therebetween and thereafter, injecting a liquid crystal in the space therebetween.

When such a display panel is fabricated, a bonded mother substrate for which a pair of mother substrates is bonded to each other is cut so as to retrieve a plurality of display panels from the bonded mother substrate. A scribing device used for cutting the bonded mother substrate is disclosed in Japanese Utility Model Publication for Opposition No. 59-22101 (Reference 1).

FIG. 43 shows a view schematically showing the scribing device in Reference 1. The scribing device 950 includes tables 951 having side edges on both sides of a bonded mother substrate 908 mounted thereon, respectively. A clamp member 952 is attached to the table 951 for clamping each side edge of the bonded mother substrate 908. The scribing device 950 includes a pair of cutter heads 953 and 954. The cutter heads 953 and 954 are provided above and below the bonded mother substrate 908 respectively. The cutter heads 953 and 954 are in a state of facing each other with the bonded mother substrate 908 therebetween.

In the scribing device 950 having such a structure, when the bonded mother substrate 908 is fixed to each table 951 by each clamp member 952, a top surface and a bottom surface of the bonded mother substrate 908 are simultaneously scribed, respectively, by the pair of cutter heads 953 and 954, and scribing lines are formed.

Reference 1: Japanese Utility Model Publication for Opposition No. 59-22101

DISCLOSURE OF THE INVENTION

However, the scribing device 950 requires a breaking device, separately, for cutting the bonded mother substrate 908 on which the scribing lines have been formed. Also, when the bonded mother substrate 908 is cut by the breaking device, it is necessary to invert the bonded mother substrate 908 (inverting such that the upper surface of the bonded mother substrate 908 becomes the lower surface) in order to cut the mother substrate on the other side of the bonded mother substrate 908 after the mother substrate on one side of the bonded mother substrate 908 is cut. Thus, in order to cut display panels from the bonded mother substrate 908, a complex line system has to be constructed.

In order to cut display panels from the bonded mother substrate 908 by using the scribing device 950, a complex line system has to be constructed. The complex system has a footprint area several times larger than the scribing device 950, which is one of the reasons of the manufacturing cost of display panel increases.

The scribing device 950 shown in FIG. 43 simultaneously scribes the top and bottom surfaces of the bonded mother substrate 908 for which a pair of mother substrate is bonded. However, the direction of scribing is limited to only one direction (left-to-right direction in the figure) and therefore, a cross scribing (scribing in a direction perpendicular to a scribing line (vertical direction in the figure)) can not be performed.

Accordingly, another scribing device is further required in order to perform a cross scribing. Therefore, a problem exists that the efficiency of scribing the bonded mother substrate 908 is extremely poor.

Even when a variety of mother substrates are simultaneously cut from the top and bottom surfaces of the substrate by using a device similar to the aforementioned scribing device 950, there is a problem that with one setting for a substrate, a process can not be performed in two directions perpendicular to each other.

The present invention is made to solve the aforementioned problems. The objective of the present invention is to provide a substrate cutting system which requires a small footprint area so as to be compact, and also which is capable of efficiently cutting a substrate.

A substrate cutting system according to the present invention includes: a mounting base having a substrate supporting device for supporting a substrate; clamp devices for holding at least one part of a side edge of the substrate carried-in on the table, the clamp devices reciprocating the substrate along the Y direction, the Y direction being along one side of the mounting base; a pair of substrate cutting devices for cutting both sides of the substrate, respectively; and substrate cutting device guide bodies, fixed to the mounting base facing each other, for moving each of the substrate cutting devices on a top surface side and a bottom surface side of the substrate in the X direction perpendicular to the Y direction, the substrate being moved in the Y direction by the clamp devices, wherein the substrate supporting device further includes first substrate supporting units and second substrate supporting units, the first substrate supporting units and the second substrate supporting units are apart from each other in the Y direction and arranged with the substrate cutting devices therebetween, and the first substrate supporting units and the second substrate supporting units support the substrate such that the substrate which has been moved in the Y direction by the clamp devices is cut along the X direction and the Y direction by the substrate cutting devices.

The first substrate supporting units and the second substrate supporting units support the substrate without rubbing against the substrate when the clamp devices moves while holding the substrate.

The first substrate supporting units and the second substrate supporting units are structured by conveyor belts, respectively, the conveyor belts being rotary-driven in the moving direction of the clamp devices at the same speed as that when the clamp devices move while holding the substrate.

The substrate cutting devices include a cutter wheel for forming a scribing line on the substrate; and a cutter head having a servo motor for transmitting a pressure force against the substrate to the cutter wheel.

A substrate cutting system according to the present invention further includes: a steam unit section for spraying steam onto the top surface and the bottom surface of the substrate, on both of which the scribing line is scribed.

A substrate drying means is provided in the steam unit section, the substrate drying means for drying the top surface and the bottom surface of the substrate.

A substrate cutting system according to the present invention further includes a substrate carry-out device for retrieving the substrate cut by the steam unit section.

The substrate carry-out device includes a carry-out robot, the carry-out robot including: a substrate holding means for holding the substrate; a substrate rotating means for rotating the substrate holding means having the substrate held thereby about a first axis vertical to the substrate; and a substrate circling means for circling the substrate rotating means around a second axis, the second axis being different from the first axis vertical to the substrate held by the substrate holding means.

A substrate cutting system according to the present invention further includes a substrate inversion means for inverting the top surface and the bottom surface of the substrate transported by the substrate transportation device.

A substrate cutting system according to the present invention further includes a positioning unit section for positioning the substrate to be transported to the substrate supporting device.

A substrate cutting system according to the present invention further includes a transportation unit for transporting the substrate to the substrate drying means, the substrate having been scribed by the substrate cutting device.

A substrate cutting system according to the present invention further includes a removal means for removing an unnecessary portion of the substrate cut by the substrate cutting devices.

The substrate is a bonded mother substrate for which a pair of mother substrates is bonded to each other.

A substrate cutting system according to the present invention includes: a mounting base having a substrate supporting device for supporting a substrate; clamp devices for holding at least one part of a side edge of the substrate carried-in on the table and reciprocating the substrate along the Y direction, the Y direction being along one side of the mounting base; a pair of substrate cutting devices for cutting both side of the substrate, respectively; and substrate cutting device guide bodies, fixed to the mounting base facing each other, for moving each of the substrate cutting devices on a top surface side and a bottom surface side of the substrate in the X direction perpendicular to the Y direction, the substrate being moved in the Y direction by the clamp devices, wherein the substrate supporting device further includes first substrate supporting units and second substrate supporting units, the first substrate supporting units and the second substrate supporting units are apart from each other in the Y direction and arranged with the substrate cutting devices therebetween, and the substrate cutting system further includes substrate floating units for supporting the substrate with air, the substrate being clamped by the clap devices when the substrate which has been moved by the clamp devices in the Y direction is cut by the substrate cutting devices along the X direction and the Y direction.

The substrate floating units include first substrate floating units arranged within the first substrate supporting section and second substrate floating units arranged within the second substrate supporting section.

The first substrate supporting units and the second substrate supporting units include a plurality of conveyor belts arranged along the Y direction, respectively, and the first substrate floating units and the second substrate floating units are arranged between the conveyor belts adjacent to each other.

The first substrate floating units and the second substrate floating units respectively include a table arranged between the conveyor belts adjacent to each other; and an air gushing means for gushing air upward from the top surface of the table.

The air gushing means includes a plurality of air gushing rods supported by the table in a vertical state; and a buffer pad provided at the upper end of each of the air gushing rods wherein an air gushing opening is provided at each buffer pad.

A substrate manufacturing apparatus according to the present invention includes: the substrate cutting system; and a chamfering system for chamfering an edge face of a substrate cut by the substrate cutting system.

A substrate manufacturing apparatus according to the present invention includes: the substrate cutting system; and an inspection system for inspecting the function of a substrate cut by the substrate cutting system.

A substrate scribing method according to the present invention is a scribing method for forming scribing lines on the a surface and a bottom surface of a substrate by using the substrate cutting system, wherein when at least two scribing lines are formed along at least two lines to be scribed on the substrate with scribing line forming means facing each other, the scribing line forming means forms a first scribing line, then moves on the substrate so as to draw a circular region without being apart from the substrate and then forms a second scribing line.

Three or more scribing lines are formed by the scribing line forming means and a polygonal region is formed by all the formed scribing lines.

A rectangular region is formed by the scribing lines.

The scribing line forming means is a disk-shaped cutter wheel, a blade edge contacting and rolling on the surface of the substrate being formed on the outer circumference of the scribing line forming means.

A plurality of protrusions is formed on the blade edge of the cutter wheel with a predetermined pitch.

When the scribing line forming means moves on the substrate so as to draw a circular track, a pressure against the substrate is less than a pressure against the substrate when each scribing line is formed.

A substrate cutting method according to the present invention includes the steps of: forming a main scribing line along a line to be cut on the upper surface and the lower surface of a substrate by using the substrate cutting system; and forming a supplementary scribing line proximal to the formed main scribing line and approximately in parallel with the main scribing line, wherein the substrate is cut along the main scribing line by formation of the supplementary scribing line.

The supplementary scribing line is formed with a space of 0.5 mm to 1.0 mm apart from the main scribing line.

The main scribing line is formed by a vertical crack which extends to at least 80% or more of the thickness direction of the substrate from a surface of the substrate.

The main scribing line is formed by a disk-shaped cutter wheel which rolls on the surface of the substrate, the cutter wheel protrudes outward such that the central portion of the outer circumferential face of the cutter wheel in the thickness direction has an obtuse V shape, a plurality of protrusions with a predetermined height is provided across the entire circumference with a predetermined pitch in portions having the obtuse angle.

A forming direction of the main scribing line and a forming direction of the supplementary scribing line by the cutter wheel are opposite to each other, and the cutter wheel continuously forms the main scribing line and the supplementary scribing line while being in contact with the surface of the substrate.

The main scribing line and/or the supplementary scribing line is formed with an appropriate space apart from at least one end portion of either of the lines.

When at least two main scribing lines are formed by the scribing line forming means, the scribing line forming means forms a first main scribing line, then moves on the substrate so as to draw a circular region without being apart from the substrate, forms a second main scribing line and then forms supplementary scribing lines along the at least two main scribing lines.

Three or more main scribing lines are formed by the scribing line forming means and a polygonal region is formed by all the formed scribing lines.

A rectangular region is formed by the plurality of main scribing lines.

The scribing line forming means is a disk-shaped cutter wheel, a blade edge contacting and rotating on the surface of the substrate being formed on the outer circumference of the scribing line forming means.

A plurality of protrusions is formed on the blade edge of the cutter wheel with a predetermined pitch.

When the scribing line forming means moves on the substrate so as to draw a circular track, a pressure against the substrate is less than a pressure against the substrate when each main scribing line is formed.

A substrate cutting method according to the present method is a method for cutting a substrate in which a scribing line is formed on each of the upper surface and the lower surface of the substrate by using the substrate cutting system according, wherein steam is sprayed onto the upper surface and the lower surface of the substrate so as to cut the substrate.

According to the substrate cutting system of the present invention, the substrate supported by the first substrate supporting units and the second substrate supporting units is moved in the Y direction while being held by the clamp devices; the substrate being moved can be cut in the X direction from the upper surface side and the lower surface side of the substrate by the substrate cutting device; and then, the substrate supported by the first substrate supporting units and the second substrate supporting units is reciprocated in the Y direction while being held by the clamp devices; and the substrate being moved can be cut in the Y direction from the upper surface side and the lower surface side of the substrate by the substrate cutting device. Therefore, it is possible to continuously cut single-plate substrates of both top and bottom surfaces forming the bonded substrate in two directions perpendicular to each other in a horizontal direction without the bonded substrate being inverted in the up-and-down direction or being rotated by 90 degrees in the horizontal direction. Thus, the entire system becomes compact and it is possible to continuously process in two directions with one setting, such as positioning.

The first substrate supporting units and the second supporting units support the substrate without each unit rubbing against the substrate when the clamp devices move while holding the substrate. Thus, when the clamp devices move in the Y direction while holding the substrate supported by the first substrate supporting units and the second substrate supporting units, the clamp devices move without loading any distortion stress on the substrate, thereby the substrate having a strong end face being stably obtained.

BRIEF DESCRIPTION OF THE DRAWINGS

FIG. 5($a$) is a diagram schematically showing the structure of the carry-out robot of the substrate carry-out device; and FIG. 5($b$) is a view for explaining the operation of the carry-out robot.

FIG. 26($a$) is a plan view of the substrate showing a scribing pattern of the substrate for explaining yet another example of the substrate cutting method according to the present invention; and FIG. 26($b$) is a plan view of the substrate showing a scribing pattern of the substrate for explaining yet another example of the substrate cutting method according to the present invention.

FIG. 42 is a view schematically showing another example of the structure of a substrate manufacturing apparatus according to the present invention in Embodiment 3.

FIG. 43 is a front view showing the structure of a conventional scribing device.

Figure 1:
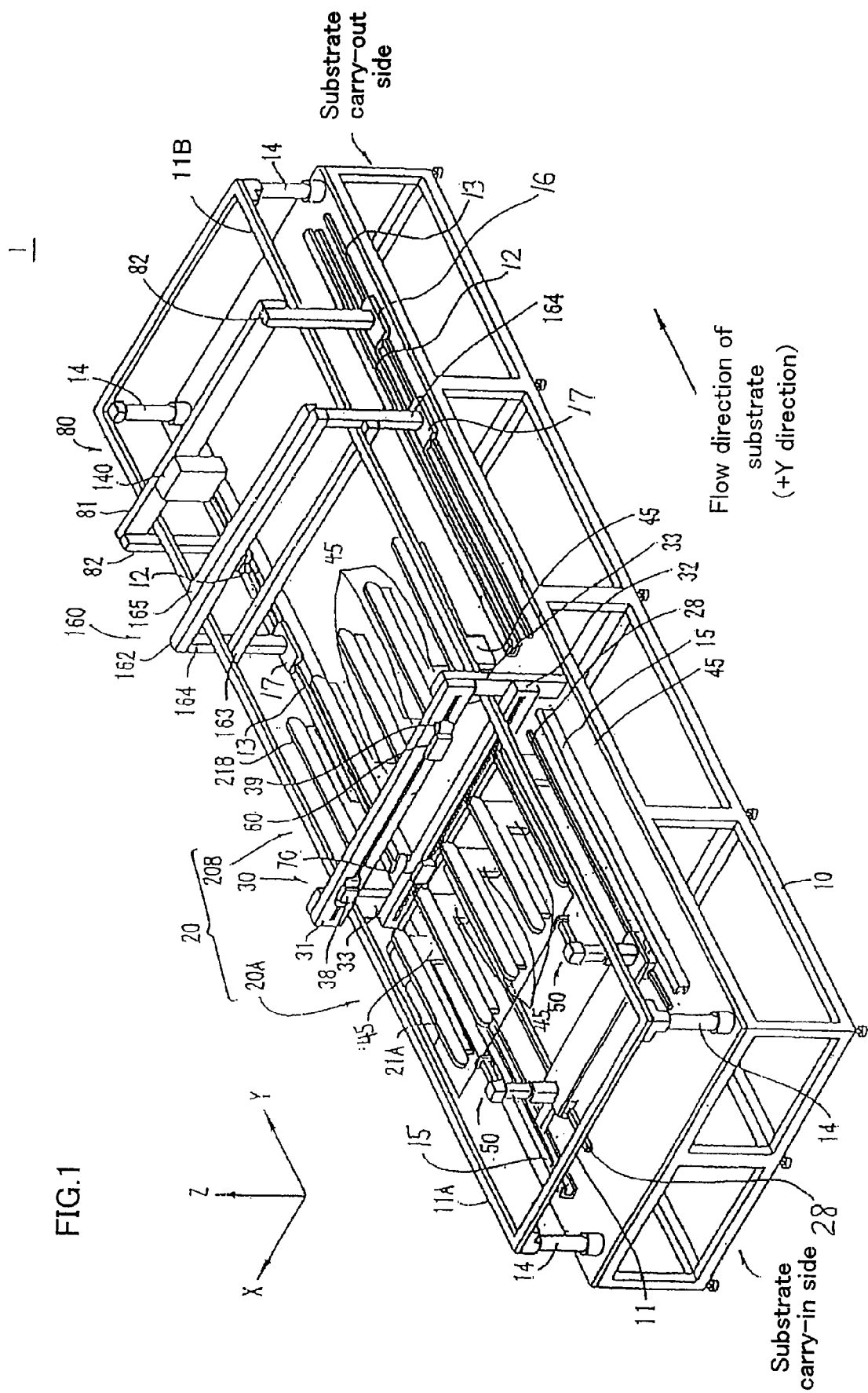
FIG. 1 is a perspective view schematically showing an example of a substrate cutting system according to Embodiment 1 of the present invention.

10 mounting base
20 substrate supporting section
20A first substrate supporting section
20B second substrate supporting section
21A first substrate supporting unit
21B second substrate supporting unit
29A first substrate floating unit
29B second substrate floating unit
30 substrate cutting device guide body
50 clamp device
60 upper substrate cutting device
70 lower substrate cutting device
80 substrate carry-out device
90 bonded mother substrate
220 positioning unit section
240 scribing unit section
241A first substrate supporting section
241B second substrate supporting section
244A first substrate supporting unit
244B second substrate supporting unit
260 buffer conveyor section
280 steam break unit section
300 substrate transportation unit section
320 panel inversion unit section
340 panel terminal separation section

BEST MODE FOR CARRYING OUT THE INVENTION

Hereinafter, embodiments of the present invention will be described in detail with reference to the drawings.

Embodiment 1

Figure 2:
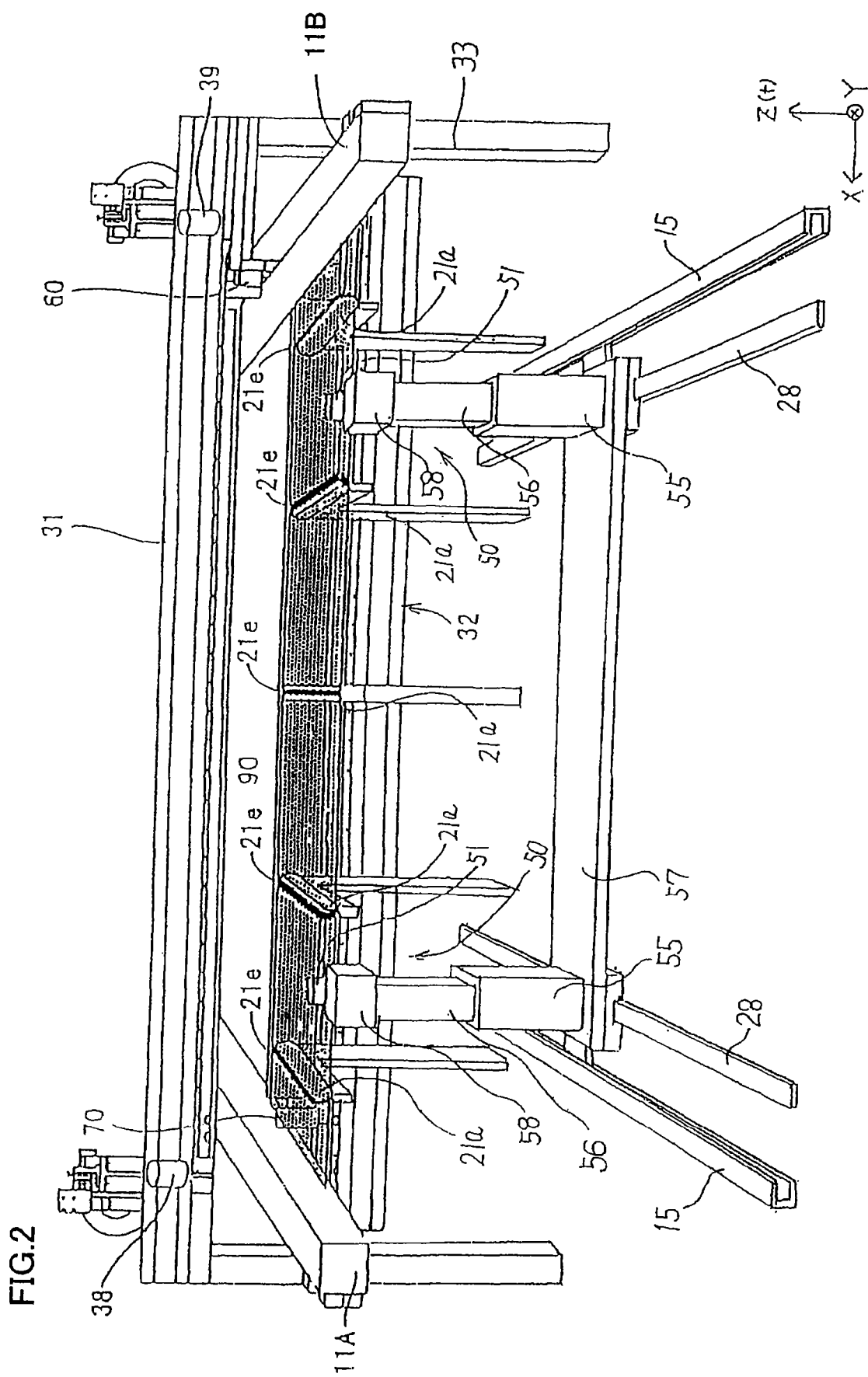
FIG. 2 is a perspective view schematically showing the substrate cutting system when viewed from another direction.

FIGS. 1 and 2 are perspective views entirely and schematically showing one example of a substrate cutting system according to the present invention. FIGS. 1 and 2 are viewed from different directions. In the present invention, the term "substrate" includes a single plate, such as a mother substrate cut into a plurality of substrates, a metal substrate (e.g., a steel plate), a wood plate, a plastic plate and a brittle material substrate (e.g., a ceramic substrate, a semiconductor substrate and a glass substrate). However, the substrate according to the present invention is not limited to such a single plate. The substrate according to the present invention may include a bonded substrate for which a pair of substrates is bonded to each other and a stacked substrate for which a pair of substrates is stacked on each other.

In the substrate cutting system in the present invention, for example, when a panel substrate (bonded substrate for display panel) for a liquid crystal device is manufactured from a pair of glass substrates bonded to each other, a plurality of panel substrates (bonded substrate for display panel) are cut, by the substrate cutting system according to the present invention, from the bonded mother substrate 90 for which a pair of mother glass substrates is bonded to each other.

In a substrate cutting system 1 according to Embodiment 1 of the present invention, description will be made by referring to the side where a first substrate supporting section 20A is arranged, as a "substrate carry-in side" and the side where a substrate carry-out device 80 is arranged, as a "substrate carry-out side", respectively. In the substrate cutting system 1 according to the present invention, the direction in which a substrate is transported (flow direction of the substrate) is +Y direction from the substrate carry-in side to the substrate carry-out side. The cutting device guide body 30 is provided in a horizontal state along the X direction which is perpendicular to the direction in which the substrate is transported.

The substrate cutting system 1 includes a mounting base 10 in a hollow rectangular parallelepiped. Four pillars 14 are provided on the upper surface of the mounting base 10. A main frame 11 having a frame shape is provided at the top portion of the pillars 14. A substrate supporting device 20 is arranged on the upper surface of the mounting base 10. The substrate supporting device 20 supports the bonded mother substrate 90 in a horizontal state, the bonded mother substrate 90 being transported to the substrate cutting system 1 by a transportation robot.

As shown in FIG. 1, the substrate supporting device 20 includes a first substrate supporting section 20A and a second substrate supporting section 20B. The first substrate supporting section 20A is arranged on the substrate carry-in side of the substrate cutting system 1 in order to support the bonded mother substrate 90 which is carried onto the main frame 11. The second substrate supporting section 20B is arranged on the substrate carry-out side in order to support the bonded mother substrate 90 after the bonded mother substrate 90 is cut and display panels are sequentially carried out from the substrate cutting system. The first substrate supporting section 20A side in the mounting base 10 is referred to as a substrate carry-in side. The second substrate supporting section 20B side in the mounting base 10 is referred to as a substrate carry-out side.

As shown in FIG. 2, above the mounting base 10, clamp devices 50 which hold the substrate in a horizontal state, the substrate being supported in a horizontal state by the substrate supporting device 20 (first substrate supporting unit 21A) are provided so as to be slidable along frames 11A and 11B in a longitudinal direction of the main frame 11. Furthermore, as shown in FIG. 1, a cutting device guide body 30 is provided between the first substrate supporting section 20A and the second substrate supporting section 20B on the top surface of the mounting base 10, the first substrate being fixed by each of the pillars 33 along a direction in a horizontal state is perpendicular to a direction in which the substrate is transported. The cutting device guide body 30 includes an upper guide rail 31 above the main frame 11 and a lower guide rail 32 below the main frame 11. The upper guide rail 31 is constructed along the X direction which is perpendicular to the frames 11A and 11B in the longitudinal direction of the main frame 11. The lower guide rail 32 is constructed along the upper guide rail 31.

Figure 3:
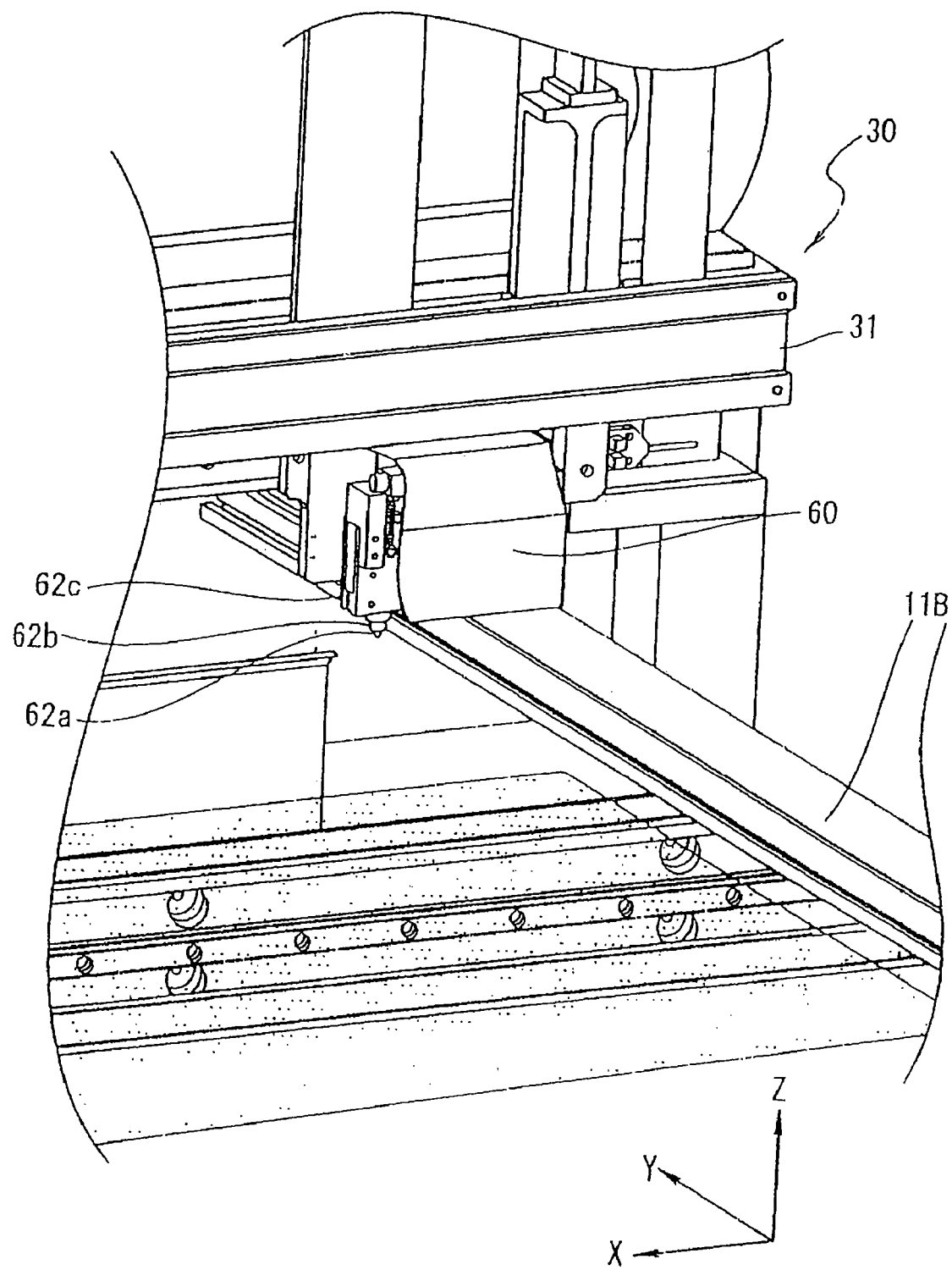
FIG. 3 is a perspective view schematically showing enlargement of important constituents of the substrate cutting system.
Figure 4:
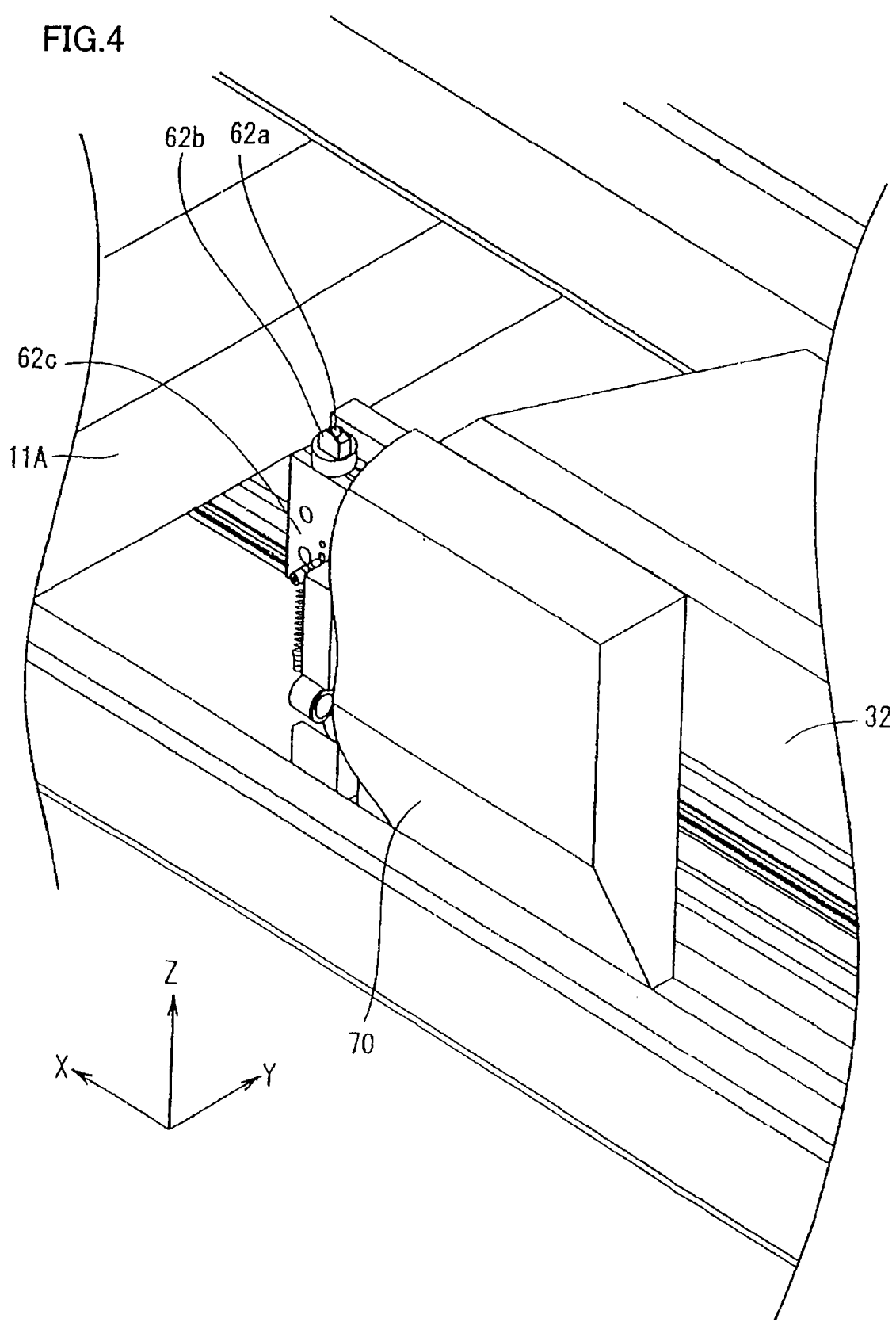
FIG. 4 is a perspective view schematically showing enlargement of other important constituents of the substrate cutting system.

FIG. 3 is a perspective view schematically showing the vicinity of the upper guide rail 31 of the cutting device guide body 30. An upper substrate cutting device 60 is attached to the upper guide rail 31 so as to be movable along the upper guide rail 31. FIG. 4 is a perspective view schematically showing the vicinity of the lower guide rail 32 of the cutting device guide body 30. A lower substrate cutting device 70 is attached to the lower guide rail 32 so as to be movable along the lower guide rail 32.

The upper substrate cutting device 60 and the lower substrate cutting device 70 reciprocate along the upper guide rail 31 and the lower guide rail 32, respectively, due to linear motors. Stators for the linear motors are attached to the upper guide rail 31 and the lower guide rail 32. Movers for the linear motors are attached to the upper substrate cutting device 60 and the lower substrate cutting device 70. The upper substrate cutting device 60 and the lower substrate cutting device 70 cut each glass substrate on the upper and lower sides of the bonded mother substrate 90 into a plurality of display panels, the bonded mother substrate 90 being held in a horizontal state by the clamp devices 50 and supported by the substrate supporting device 20 to provide assistance in holding the bonded mother substrate 90.

As shown in FIG. 2, a first optical device 38 is provided at one end of the cutting device guide body 30 so as to be movable along the cutting device guide body 30. The first optical device 38 captures a first alignment mark provided on the bonded mother substrate 90 which is held by the clamp devices 50 and supported by the substrate supporting device 20. A second optical device 39 is provided at the other end of the cutting device guide body 30 so as to be movable along the cutting device guide body 30. The second optical device 39 captures a second alignment mark provided on the bonded mother substrate 90.

As shown in FIGS. 1 and 2, end surfaces of the upper guide rail 31 and the lower guide rail 32 are connected to each other via each of the pillars 33, and both ends of the cutting device guide body 30 are fixed on the top surface of the mounting base 10 by each of the pillars 33.

Above the substrate carry-out side of the mounting base 10, the substrate carry-out device 80 is arranged on the substrate carry-out side with respect to the cutting device guide body 30. The substrate carry-out device 80 includes a carry-out robot 140 and a substrate carry-out device guide 81. The carry-out robot 140 carries out each display panel that has been cut from the bonded mother substrate 90. The substrate carry-out device guide 81 is constructed in order to move the carry-out robot 140 in the X direction which is perpendicular to the frames 11A and 11B in the longitudinal direction of the main frame 11. Ends of the substrate carry-out device guide 81 slide, by linear motors, along the guide rails 13 respectively provided on the top surface of the mounting base 10 through supporting members 82.

Stators 12 for the linear motors are provided on the upper surface of the mounting base 10 along the frames 11A and 11B in the longitudinal direction of the main frame 11. The linear motors having the stators 12 move the substrate carry-out device 80. Each stator 12 is formed in a shape of a flat and hollow rectangular parallelepiped, the outside surface thereof being open. The cross section thereof is formed in a shape of "⊐". Movers (not shown) for the linear motors are inserted in each of the stators, respectively, the movers being provided on each of the guide bases 16 respectively holding the pillars 82 which support both ends of the substrate carry-out device 80. The movers are slidable along the frames 11A and 11B in the longitudinal direction of the main frame 11.

A plurality of permanent magnets is arranged on each stator 12 along the longitudinal direction of the main frame 11. Magnetic poles of adjacent permanent magnets are in a state opposed to each other. Each mover is constructed with an electromagnet. When the magnetic pole of the electromagnet which constitutes each mover is sequentially changed, each mover slides along each stator 12.

An adsorption section (not shown) is provided on the carry-out robot 140 of the substrate carry-out device 80. The adsorption section adsorbs each display panel cut from the bonded mother substrate 90 by suction. While each display panel is in a state of being adsorbed by the adsorption section, the entire substrate carry-out device 80 is slid to the substrate carry-out side and each cut display panel is carried out from the mounting base 10.

FIG. 5(*a*) is a diagram schematically showing the structure of the carry-out robot 140 of the substrate carry-out device 80. The carry-out robot 140 is attached to the substrate carry-out device guide 81. The carry-out robot 140 is movable by a moving mechanism in a direction (X direction) along the substrate carry-out device guide 81. The moving mechanism combines a driving means due to a linear motor or a servo motor, and a straight-line guide.

The carry-out robot 140 includes two servo motors 140*a* and 140*m*. The servo motor 140*a* is connected to a driving shaft 140*b*. A first pulley 140*c* and a second pulley 140*e* are integrally attached to each other and are attached to the driving shaft 140*b* via a bearing. When the driving shaft 140*b* is rotated, the first pulley 140*c* and the second pulley 140*e* detach from the driving shaft 140*b*. An end of an arm 140*f* is integrally attached to the driving shaft 140*b*. The arm 140*f* rotates with the driving shaft 140*b* as its center due to the rotation of the driving shaft 140*b*. A rotating shaft 140*g* is supported on the tip of the arm 140*f* so as to be rotatable. The rotating shaft 140*g* penetrates the arm 140*f*. A third pulley 140*h* is integrally attached to one end of the rotating shaft 140*g*. For example, a belt (e.g., a timing belt 141*i*) is wound around the second pulley 140*e* and the third pulley 140*h*.

Furthermore, a fourth pulley 140*n* is attached to the rotating axis of the servo motor 140*m*. For example, a belt (e.g., a timing belt 141*p*) is wound around the fourth pulley 140*n* and the first pulley 140*c*. Therefore, the rotation of the servo motor 140*m* is transmitted to the first pulley 140*c* through the belt 140*p* and is further transmitted to the third pulley 140*h* through the belt 140*i*. As a result, the rotating shaft 140*g* rotates.

The central portion of an adsorption pad attachment plate 140*j* is integrally attached to the other end of the rotating shaft 140*g*. Adsorption pads 140*k*, which adsorb a substrate, by using an adsorption mechanism (not shown), cut by the substrate cutting system 1 are provided on the bottom surface of the adsorption pad attachment plate 140*j*.

When the carry-out robot 140 having such a structure is set using the combination of the rotating direction and the rotating angle of each servo motor 140*a* and 140*m*, the cut substrate can be carried out to an device for the next step while minimizing the distance moved by the arm 140*f* and maintaining the direction of the cut substrate being at a horizontal state or being changed to a variety of angle directions.

In the transportation of the cut substrate, the cut substrate is held by the adsorption of the adsorption pad. After the entire carry-out robot 140 is moved upward by an up-and-down moving mechanism (not shown) once, the cut substrate is transported to the device for the next step. Thereafter, the carry-out robot 140 is moved downward by the up-and-down moving mechanism (not shown) again and then, the cut substrate is mounted at a predetermined position in a predetermined state in the next step.

Next, the case in which the direction of the cut substrate is, for example, changed by 90 degrees by using the carry-out robot 140 having such a structure will be described with reference to FIG. 5(*b*).

When each adsorption pad 140*k* attached to the adsorption pad attachment plate 140*j* adsorbs the cut substrate 93, the entire carry-out robot 140 moves upward by the up-and-down moving mechanism. As a result, the servo motor 140*a* is driven and the driving shaft 140*b* is rotated by 90 degrees, the rotation direction of the driving shaft 140*b* being anti-clockwise when viewed from the substrate side. When the driving shaft 140*b* is rotated by 90 degrees, the arm 140*f* is rotated by 90 degrees with the driving shaft 140*b* as its center of rotation, the rotation direction of the arm 140*f* being anti-clockwise when viewed from the substrate side. As a result, the adsorption pad attachment plate 140*j* is rotated, along with the arm 140*f*, by 90 degrees with the driving shaft 140*b* as its center of rotation. The adsorption pad attachment plate 140*j* being rotatably supported by the tip of the arm 140*f* through the rotating shaft 140*g* and the rotation direction of the adsorption pad attachment plate 140*j* being anti-clockwise when viewed from the substrate side. In this case, the rotating shaft 140*g* attached to the adsorption pad attachment plate 140*j* is rotated with the driving shaft 140*b* as its center of rotation.

Concurrently, the rotation of the servo motor 140*m* is transmitted to the first pulley 140*c* through the belt 140*p* and is further transmitted to the third pulley 140*h* through the belt 140*i*. As a result, the rotating shaft 140*g* is rotated by 180 degrees clockwise. The adsorption pad attachment plate 140*j*, attached to the rotating shaft 140*g*, rotates by 180 degrees clockwise with the rotating shaft 140*g* as its center of rotation. Therefore, while the adsorption pad attachment plate 140*j* rotates by 90 degrees with the driving shaft 140*d* as its center of rotation, the rotation direction of the adsorption pad attachment plate 140*j* is anti-clockwise when viewed from the substrate side, and the adsorption pad attachment plate 140*j* rotates by itself by 180 degrees clockwise, when viewed from the substrate side, with the rotating shaft 140*g* as its center. As a result, as shown in FIG. 5(*b*), the cut substrate 93 adsorbed by each adsorption pad 140*k* is rotated, within a relatively small space, by 90 degrees clockwise when viewed from the substrate side while rotating around the center of the rotation.

As shown in FIG. 1, the first substrate supporting section 20A and the second substrate supporting section 20B of the substrate supporting device 20 include, for example, five first substrate supporting units 21A and five second substrate supporting units 21B, respectively, which are provided, along the Y direction, on both sides of the Y direction with respect to the cutting device guide body 30, respectively. Each of the first substrate supporting units 21A and each of the second substrate supporting units 21B are fixed on the mounting base 10, by each holding plate 45, on the substrate carry-in side and the substrate carry-out side with respect to the cutting device guide body 30, respectively, in line along a direction (Y direction) parallel to the frames 11A and 11B of the main frame 11.

Figure 6:
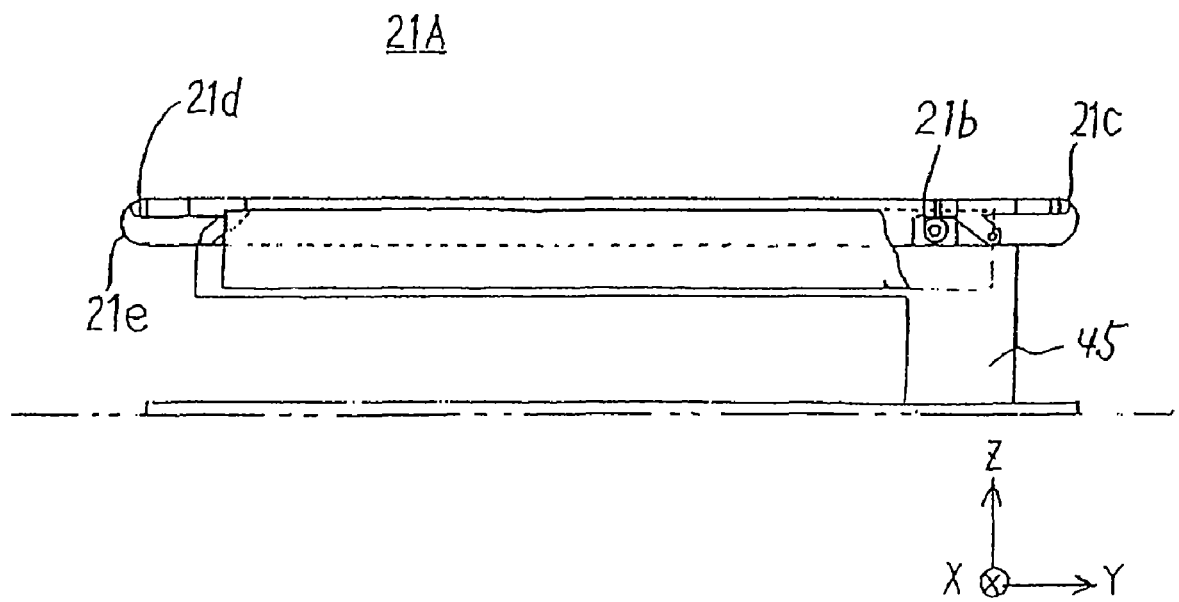
FIG. 6 is a side view showing a first substrate supporting unit provided on the substrate carry-out device of the substrate cutting system.

FIG. 6 is a diagram showing a side view of one of the first substrate supporting units 21A provided on the first substrate supporting section 20A. Each of the first substrate supporting units 21A is attached to the top surface of the mounting base 10 by the holding plate 45 and is provided above the mounting base 10.

A plurality of first substrate supporting units 21A (five in the explanation of the present embodiment) is arranged with a predetermined interval therebetween. The first substrate supporting units 21A are attached to the top surface of the mounting base 10 by using the holding plates 45.

The first substrate supporting unit 21A includes a supporting body section 21a, which linearly extends along a direction (Y direction) parallel to the main frame 11. Timing pulleys 21c and 21d which, for example, guide a timing belt 21e, are attached to each end of the supporting body section 21a, respectively. The timing belt 21e is caused to circle by the timing pulley 21b which is rotated when a motor 116 is driven (the motor 116 will be described later).

Figure 7:
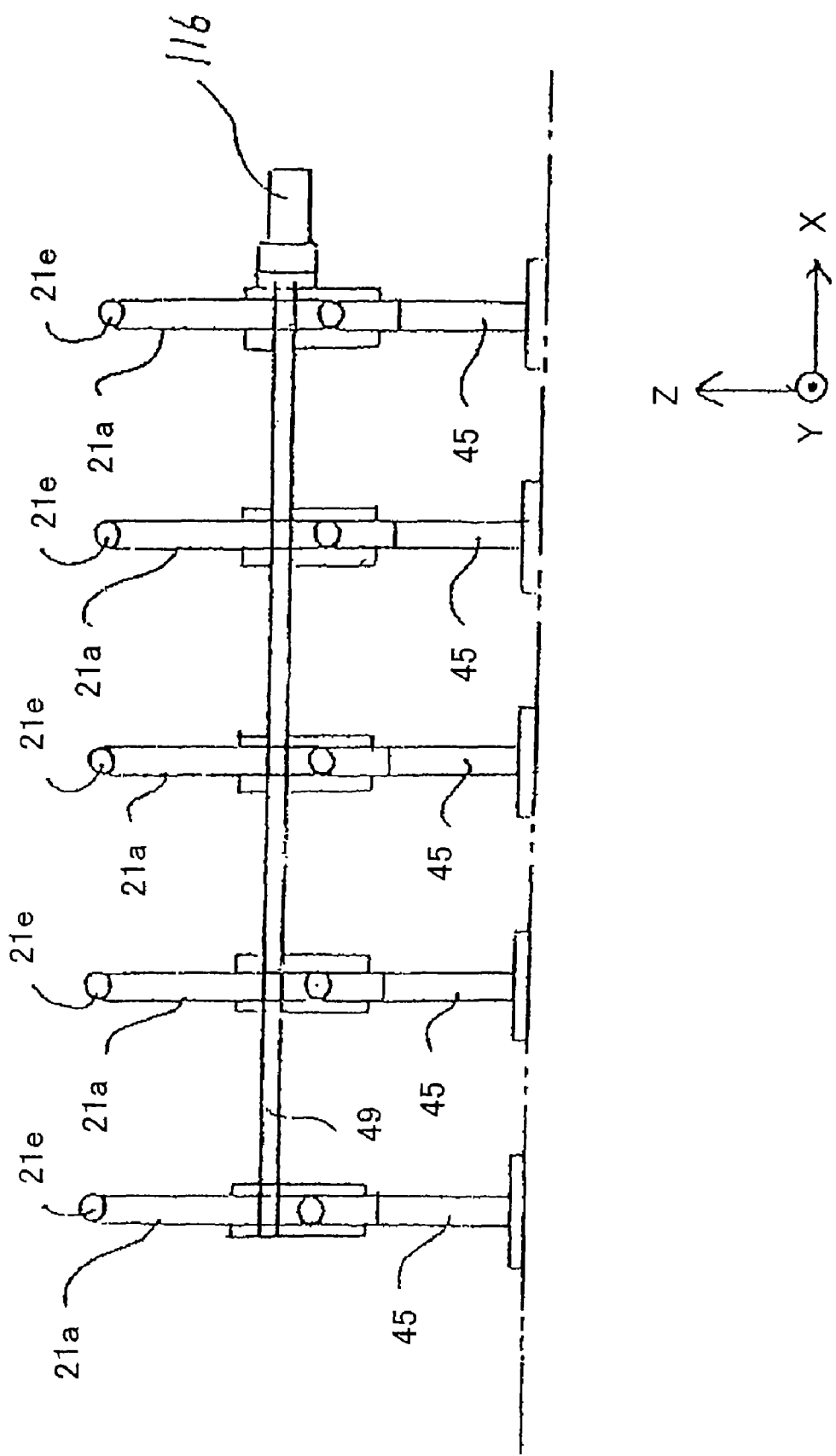
FIG. 7 is a front view showing a first substrate supporting section when viewed from a cutting device guide body's side of the substrate cutting system.

The mechanism having such a structure which moves the timing belt 21e of the first substrate supporting unit 21A will be described with reference to FIG. 7. FIG. 7 is a front view when a plurality (five) of first substrate supporting units 21A provided on the first substrate supporting section 20A when viewed from the cutting device guide body 30.

As shown in FIG. 7, each timing pulley 21b for driving provided on the supporting body section 21a of the first substrate supporting unit 21A is coupled to a rotating driving shaft 49 which is provided in parallel to the X direction perpendicular to the frames 11A and 11B in the longitudinal direction of the main frame 11. One end of the rotating driving shaft 49 is connected to the rotation axis of the motor 116 by using a coupling (not shown), and the timing pulley 21b for driving of the first substrate supporting unit 21A is rotated in accordance with the rotating direction of the rotation axis of the motor 116, and the rotation of the timing pulley 21b for driving causes the timing belt 21e to circle.

The rotation direction of the rotation axis of the motor 116 is selected by a control section (not shown) for controlling the substrate cutting system according to the present invention.

As shown in FIG. 1, the second substrate supporting section 20B of the substrate supporting device 20 include, for example, five second substrate supporting units 21B, respectively, which are provided, along the Y direction, on both sides of the Y direction with respect to the cutting device guide body 30, respectively. The structure of the second substrate supporting unit 21B is similar to that of the first substrate supporting unit 21A. The first substrate supporting units 21A and the second substrate supporting units 21B are fixed on the top surface of the mounting base 10, by holding plates 45, on the substrate carry-in side and the substrate carry-out side with respect to the cutting device guide body 30, respectively, in line along a direction (Y direction) parallel to the frames 11A and 11B of the main frame 11 such that the first substrate supporting units 21A and the second substrate supporting units 21B are attached on opposite sides with respect to the cutting device guide body 30 and attached in the opposite direction with respect to the Y direction.

As shown in FIG. 1, a steam unit section 160, which is a substrate drying means, is arranged between the substrate carry-out side of the second substrate supporting section 20B and the substrate carry-in side of the substrate carry-out device 80 above the substrate carry-out side of the mounting base 10. The steam unit section 160 is provided in order to completely cut the bonded mother substrate 90 which has not been completely cut after the scribing.

Figure 8:
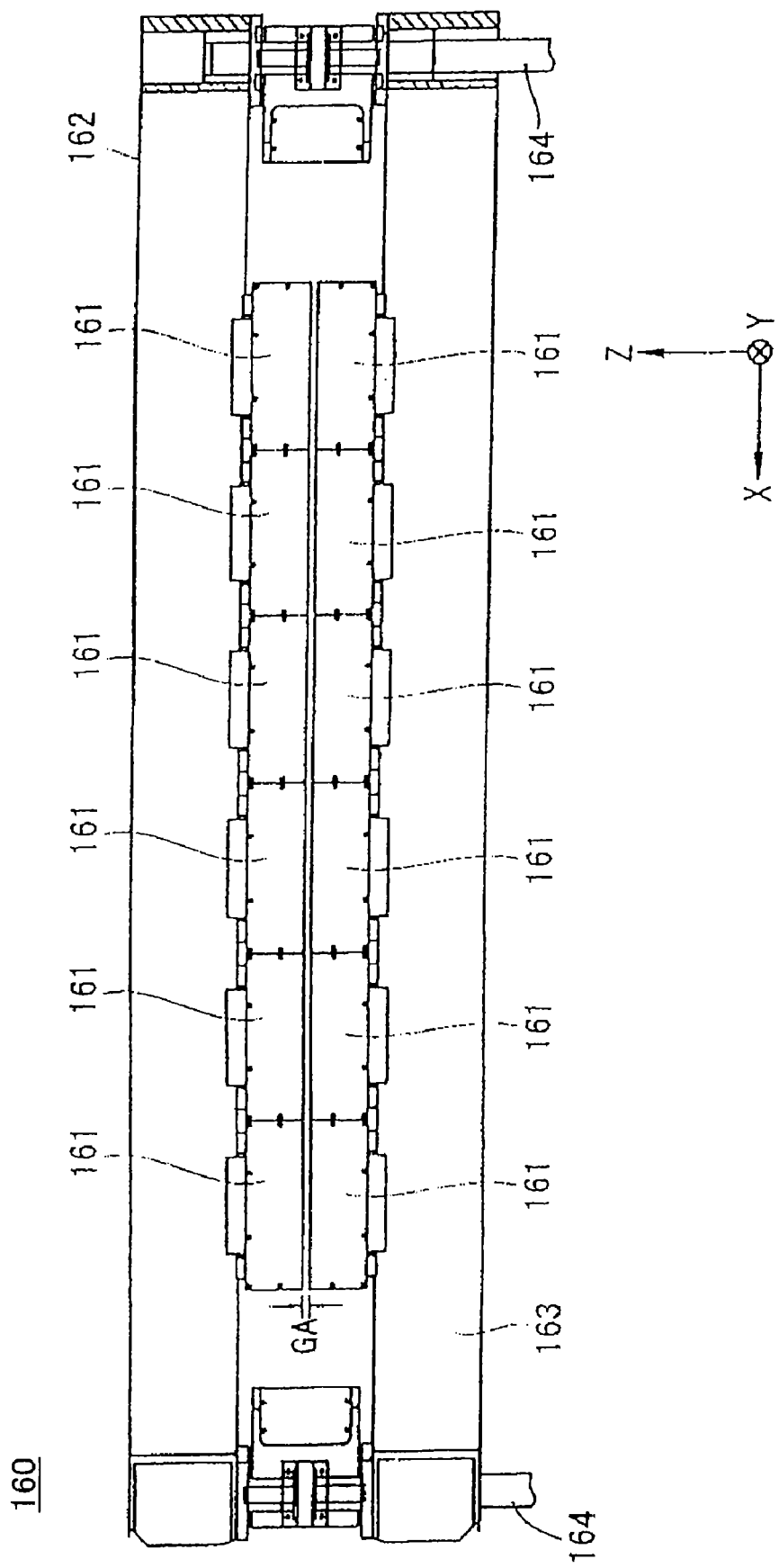
FIG. 8 is a front view of important constituents when a steam unit section of the substrate cutting system according to Embodiment 1 of the present invention is viewed from the substrate carry-in side.

FIG. 8 is a front view of important constituents when the steam unit section 160 is viewed from the substrate carry-in side. As shown in FIG. 8, in the steam unit section 160, an upper steam unit attachment bar 162 and lower steam unit attachment bar 163 are attached to a pillar 164 on the frame 11A side and a pillar 164 on the frame 11B side, respectively, along the X direction which is perpendicular to the frame 11A and the frame 11B. The upper steam unit attachment bar 162 attaches a plurality of steam units 161 for spraying steam onto the mother substrate on the upper side of the bonded mother substrate 90. The lower steam unit attachment bar 163 attaches a plurality of steam units 161 for spraying steam onto the mother substrate on the lower side of the bonded mother substrate 90.

The steam unit section 160 slides, by the linear motors, along the guide rails 13, respectively, provided on the upper surface of the mounting base 10.

As shown in FIG. 1, stators 12 for the linear motors are provided on the top surface of the mounting base 10 along the frames 11A and 11B in the longitudinal direction of the main frame 11. The linear motors having the stators 12 move the steam unit section 160. Each stator 12 is formed in a shape of a flat and hollow rectangular parallelepiped, the outside surface thereof being open. The cross section of each stator is formed in a shape of "ᄏ". Movers (not shown) for the linear motors is are inserted in each of the stators, respectively, the movers being provided on each of the guide bases 17 respectively holding the pillars 164 which support both ends of the steam unit section 160. The movers are slidable along the frames 11A and 11B in the longitudinal direction of the main frame 11.

A plurality of permanent magnets is arranged on each stator 12 along the longitudinal direction of the main frame 11. Magnetic poles of adjacent permanent magnets are in a state opposed to each other. Each mover is constructed with an electromagnet, respectively. When the magnetic pole of the electromagnet which constitutes each mover is sequentially changed, each mover slides along each stator 12.

As shown in FIG. 8, six steam units 161 are attached to the upper steam unit attachment bar 162. Six steam units 161 are attached to the lower steam unit attachment bar 163 with a gap GA with respect to the six steam units 161 on the upper steam unit attachment bar 162. The gap GA is adjusted such that the bonded mother substrate 90 passes through the gap GA when the steam unit section 160 moves to the substrate carry-in side.

Figure 9:
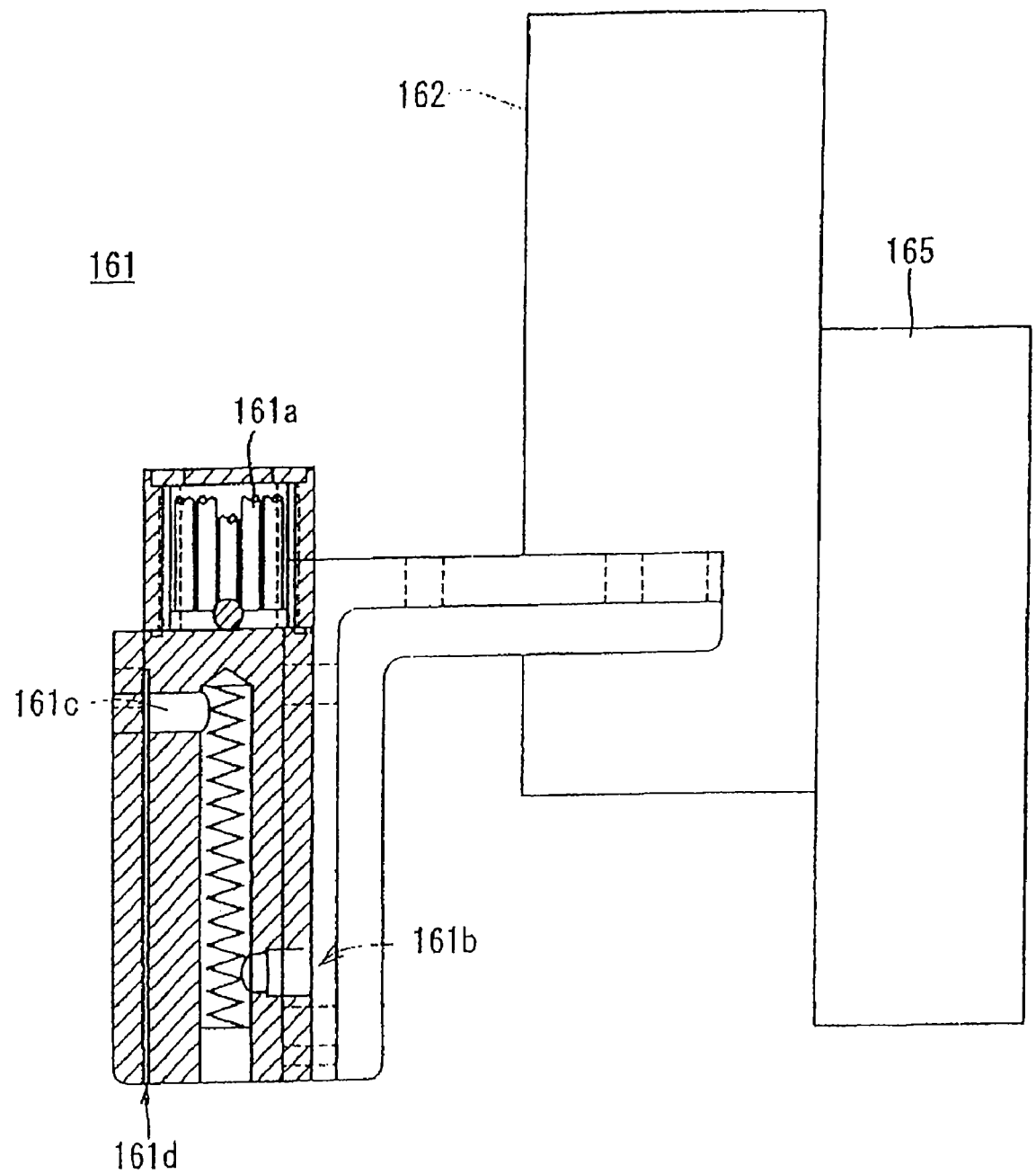
FIG. 9 is a side-sectional view partially showing the structure of a steam unit of the steam unit section.

FIG. 9 is a partial sectional view showing the structure of the steam unit 161. The steam unit 161 is mostly structured with aluminum material. A plurality of heaters 161a is imbedded in the steam unit 161 in a perpendicular direction. When an opening/closing valve (not shown) which automatically opens and closes is opened, water flows into the steam unit 161 from a water supplying opening 161b. Then, the supplied water is heated by the heaters 161a and evaporates into steam. The steam is sprayed onto the surface of the mother substrate from a gushing opening 161d through a duct hole 161c.

An air knife 165 is provided on the carry-out side of the upper steam unit attachment bar 162. The air knife 165 is provided for removing the moisture which remains on the surface of the bonded mother substrate 90 after the steam is sprayed onto the upper surface of the bonded mother substrate 90.

A steam unit 161 and an air knife 165 similar to those attached to the upper steam unit attachment bar 162 are provided on the lower steam unit attachment bar 163.

A positioning device (not shown) is provided on the mounting base 10. The positioning device is provided for positioning the bonded mother substrate 90 supported by the first substrate supporting section 20A. In the positioning device, for example, a plurality of positioning pins (not shown) are provided along the frame 11B of the main frame 11 and along the direction perpendicular to the frame 11B with a fixed interval therebetween, respectively. Pushers (not shown) are provided with respect to the positioning pins arranged along the frame 11B. The pushers are provided to push the side edges of the bonded mother substrate 90 which face each positioning pin. Pushers (not shown) are provided with respect to the positioning pins arranged along the direction perpendicular to the frame 11B. The pushers are provided to push the side edges of the bonded mother substrate 90 which face each positioning pin.

Alternatively, for example, when a positioning device for positioning the bonded mother substrate 90 is provided separately from the present substrate cutting system immediately before the bonded mother substrate 90 is transported to the substrate cutting system according to the present invention, the positioning device in the present substrate cutting system can be omitted.

The positioning device in the present substrate cutting system is not limited to the positioning pins and pushers described above. Any device can be used as a positioning device as long as the device can fix the position of the bonded mother substrate 90 in the substrate cutting system.

Furthermore, as shown in FIG. 1, a plurality of clamp devices 50 is provided above the mounting base 10 supported by the first substrate supporting section 20A. The plurality of clamp devices 50 are provided to clamp the bonded mother substrate 90 pushed and positioned by each positioning pin.

As shown in FIG. 2, in order to clamp the side edge of the positioned bonded mother substrate 90 on the substrate carry-in side, the plurality of clamp devices 50 is arranged with a fixed interval therebetween along a direction perpendicular to the frames 11A and 11B of the main frame 11 (in FIG. 2, two clamp devices are arranged as one example).

Each clamp device 50 includes a clamp member 51 for clamping the side edge of the mother substrate 90. The clamp members 51 are attached to holding members 58 joined to rods 56 of cylinders 55, which are attached to the movement base 57, and are moved upward and downward due to the driving of the cylinders 55.

Figure 10:
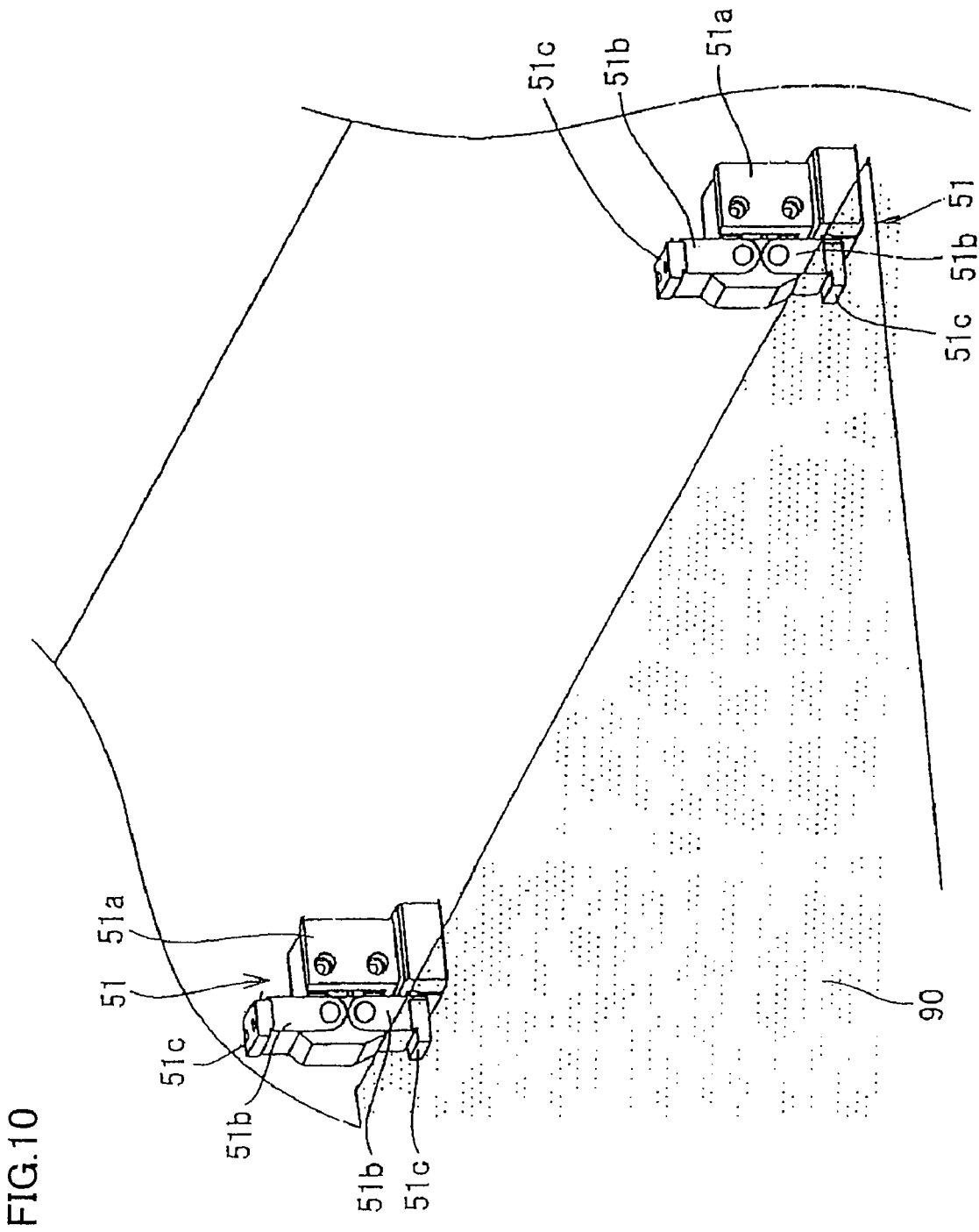
FIG. 10 is a perspective view showing the structure of a clamp device provided in the substrate cutting system according to Embodiment 1 of the present invention and explaining the operation thereof.
Figure 11:
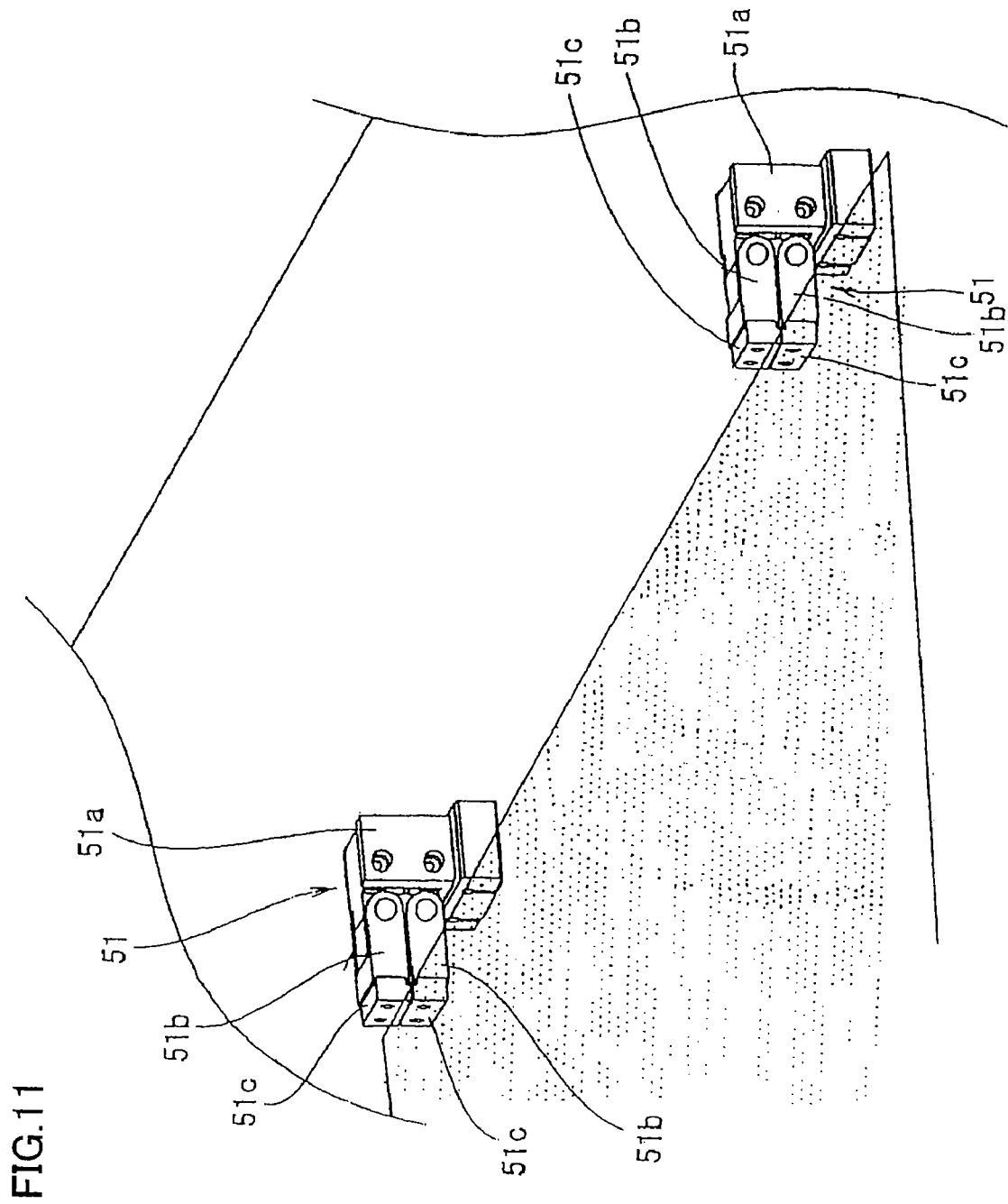
FIG. 11 is a perspective view showing the structure of a clamp device provided in the substrate cutting system according to Embodiment 1 of the present invention and explaining the operation thereof.

FIGS. 10 and 11 are perspective views for showing a plurality of clamp members 51 provided on each of the clamp devices and explaining the operation thereof.

Each clamp member 51 has a structure similar to each other. The clamp member 51 includes a casing 51a and a pair of upper and lower turning arm sections 51b. The turning arm section 51b is attached to the casing 51a so as to be turnable from the vertical state to the horizontal state. Each turning arm section 51b can turn with one of the ends being the center. The ends which are the center of each turning are adjacent to each other. In a vertical state, the tip of the turning arm section 51b positioned on the upper side is positioned above the center of the turning as shown in FIG. 10. In a vertical state, the tip of the turning arm section 51b positioned on the lower side is positioned below the center of the turning as shown in FIG. 10. When each turning arm section 51b turns by 90 degrees toward the bonded mother substrate 90 side, each turning arm section 51b is in a horizontal state facing each other.

A clamp section 51c is attached to the tip of each turning arm section 51b. The clamp sections 51c contact the top surface and the bottom surface of the bonded mother substrate 90, respectively. Each clamp section 51c is made of an elastic body. At the same time when each turning arm section 51b is integrally turned from the vertical state to the horizontal state, each clamp member 51c is turned from the horizontal state to the vertical state. When each turning arm section 51b is turned to the horizontal state, the bonded mother substrate 90 is clamped by the clamp section 51c attached to the tip of each turning arm section 51b as shown in FIG. 11.

The clamp members 51 are integrally driven. When each side edge of the bonded mother substrate 90 is in a state of being clamped by the plurality of clamp members 51, all of the clamp members 51 lower downward and then, the bonded mother substrate 90 is supported by the timing belts 21e of the first substrate supporting section 20A.

In the arrangement of the aforementioned clamp devices 50, if the clamp devices 50 for holding the bonded mother substrate 90 are structured so as to be provided along the frame 11A or the frame 11B of the main frame 11, the bonded mother substrate 90 can be supported without being damaged.

The structure of the aforementioned clamp devices 50 and the clamp members 51 only shows one example which is used in the substrate cutting system according to the present invention and is not limited to this. In other words, any structure can be used as long as the structure can grasp or hold the side edges of the bonded mother substrate 90. For example, when the size of the substrate is small, the substrate can be held by clamping one part of the side edges of the substrate, thereby the substrate being cut without causing any defect to the substrate.

Again, referring back to FIGS. 1 and 2, a pair of guide rails 28 is provided on the top surface of the mounting base 10 along the Y direction. Each of the clamp devices 50 is slid along the pair of guide rails 28, by using linear motors, between two first substrate supporting units 21A of the plurality of the first substrate supporting units 21A (five in the description of the Embodiment) which are arranged with a predetermined interval therebetween, each of the two first substrate supporting units 21A being arranged on either side of the plurality of the first substrate supporting units 21A.

As shown in FIG. 2, stators 28 for the linear motors are provided on the top surface of the mounting base 10 along the frames 11A and 11B in the longitudinal direction of the main frame 11. The linear motors having the stators 28 move a movement base 57 holding each of the clamp devices 50. Each stator 28 is formed in a shape of a flat and hollow rectangular parallelepiped, the inside surface thereof being open. The cross section of each stator 28 is formed in a shape of "コ". Movers (not shown) for the linear motors are inserted in each of the stators, respectively, the movers being provided in the movement base 57 which holds each of the clamp devices. The movers are slidable along the frames 11A and 11B in the longitudinal direction of the main frame 11.

A plurality of permanent magnets is arranged on each stator 28 along the longitudinal direction of the main frame 11. Magnetic poles of adjacent permanent magnets are in a state opposed to each other. Each mover is constructed with an electromagnet. When the magnetic pole of the electromagnet which constitutes each mover is sequentially changed, each mover slides along each stator 28.

The bonded mother substrate 90 is mounted on the first substrate supporting section 20A. When the bonded mother substrate 90 is positioned, the bonded mother substrate 90 thus positioned is held by the clamping device 50, and at the same time, is supported by each of the timing belts 21e of the first substrate supporting unit 21A.

In this state, cutting and scribing the bonded mother substrate 90 is started by the upper substrate cutting device 60 and the lower substrate cutting device 70 provided on the cutting device guide body 30. While the cutting or the scribing is being performed, simultaneous to when each of the clamp devices 50 starts moving to the substrate carry-out side, the timing belts 21e of the first substrate supporting units 21A of the first substrate supporting section 20A and the timing belts 21e of the second substrate supporting units 21B of the second substrate supporting section 20B are circled, clockwise in FIG. 1, at the same moving speed as that of each of the clamp devices 50; and simultaneous to when each of the clamp devices 50 starts moving to the substrate carry-in side, the timing belts 21e of the first substrate supporting units 21A of the first substrate supporting section 20A and the timing belts 21e of the second substrate supporting units 21B of the second substrate supporting section 20B are circled, anti-clockwise in FIG. 1, at the same moving speed as that of each of the clamp devices 50. The bonded mother substrate 90 being currently cut or scribed is supported, without being rubbed against the timing belts 21e, by the timing belts 21e of the first substrate supporting units 21A of the first substrate supporting section 20A and the timing belts 21e of the second substrate supporting units 21B of the second substrate supporting section 20B.

In this manner, while each of the clamp devices 50 is moving, the timing belts 21e of the first substrate supporting units 21A of the first substrate supporting section 20A and the timing belts 21e of the second substrate supporting units 21B of the second substrate supporting section 20B are circled at the same speed as the moving speed of each of the clamp devices 50, which holds the bonded mother substrate 90, in the same direction as the moving direction of each of the clamp devices 50. Thus, the bonded mother substrate 90 on the move is supported, without being rubbed against the timing belts 21e, by the timing belts 21e of the first substrate supporting units 21A of the first substrate supporting section 20A and the timing belts 21e of the second substrate supporting units 21B of the second substrate supporting section 20B.

In a state in which the cutting of the bonded mother substrate 90 is completed, the bonded mother substrate 90 is supported by each timing belt 21e of the second substrate supporting unit 21B of the second substrate supporting section 20B.

In a state in which the bonded mother substrate 90 is supported by each of timing belts 21e of each second substrate supporting unit 21B, the steam unit section 160 moves to the substrate carry-in side, sprays the steam onto the entire top and bottom surfaces of the bonded mother substrate 90 on which the scribing lines have been formed. As a result, the vertical cracks on the bonded mother substrate 90 are extended due to the thermal stress and the bonded mother substrate 90 is completely cut. At the same time, the moisture which remains on the top and bottom surfaces of the bonded mother substrate 90 is removed by the air knife 165 after the steam is sprayed on the bonded mother substrate 90.

Thereafter, all of the display panels cut from the bonded mother substrate 90 on the timing belts 21e of all the second substrate supporting units 21B of the second substrate supporting section 20B are carried out by the carry-out robot 140 of the substrate carry-out device 80, thereby the substrate 90' (portion to be discarded) being supported on the timing belts 21e of the second substrate supporting units 21B.

Next, the substrate carry-out device 80 and the steam unit section 160 move toward the end of the substrate carry-out side. Thereafter, the clamp member 51 of each clamp device 50 is open, and the state of the cut bonded mother substrate 90' changed from being gripped by the clamp members 51 to being only supported by the timing belt 21e of each of the second substrate supporting units 21B.

When the cut bonded mother substrate 90' is supported by the timing belt 21e of each of the second substrate supporting units 21B, each of the clamp devices 50 is caused to move toward the substrate carry-in side and the timing belts 21e of all the second substrate supporting units 21B of the second substrate supporting section 20B are circled. Thus, the cut bonded mother substrate 90' (portion to be discarded) falls down. In this case, the cut bonded mother substrate 90' (portion to be discarded or cullet) which has fallen is guided by a guide plate arranged in a slanted state so as to be accommodated into a cullet accommodation box.

An upper substrate cutting device 60, as shown in FIG. 3, is attached to the upper guide rail 31 of the cutting device guide body 30. A lower substrate cutting device 70, as shown in FIG. 4, is attached to the lower guide rail 32, the lower substrate cutting device 70 having a similar structure to the upper substrate cutting device 60 and being in a state of inversion to the upper substrate cutting device 60 in a vertical direction. As described above, the upper substrate cutting device 60 and the lower substrate cutting device 70 slide along the upper guide rail 31 and the lower guide rail 32, respectively, due to linear motors.

Figure 12:
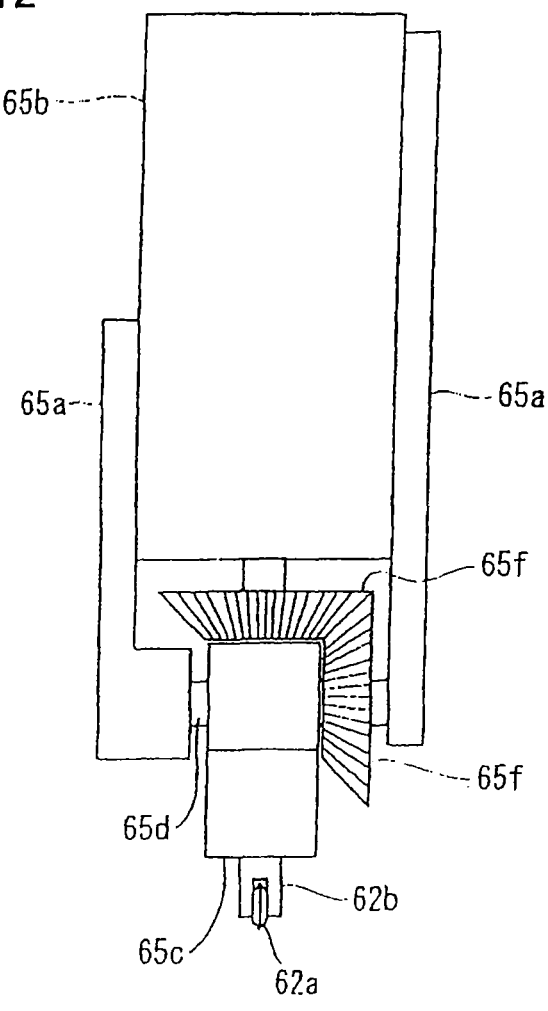
FIG. 12 is a side view showing an example of a cutter head provided in the substrate cutting device of the substrate cutting system according to Embodiment 1 of the present invention.
Figure 13:
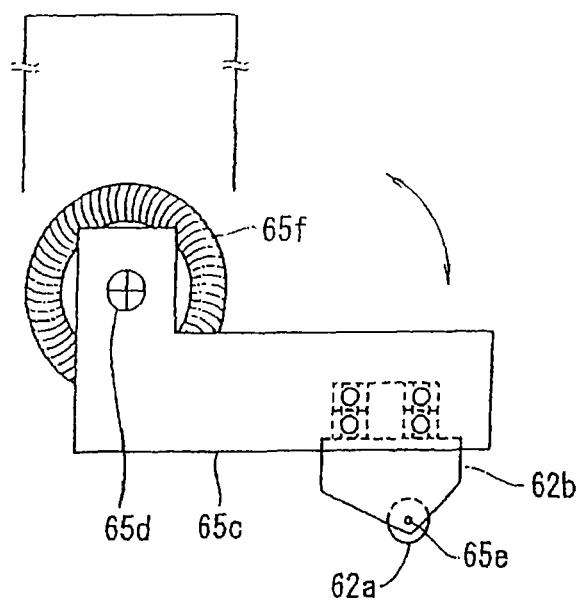
FIG. 13 is a front view showing important constituents of the cutter head.

A cutter head 65 using a servo motor is provided on the upper substrate cutting device 60 and the lower substrate cutting device 70, respectively. FIG. 12 shows a side view of the cutter head 65. FIG. 13 shows a front view of the important constituents of the cutter head 65. For example, as shown in FIG. 12 and FIG. 13, cutter wheels 62a for scribing a bonded mother substrate 90 are rotatably attached to tip holders 62b, respectively. Furthermore, the tip holders 62b are rotatably attached to respective cutter heads 62c with a direction vertical to top and bottom surfaces of the bonded mother substrate 90 held by the clamp devices 50 at its axis. The cutter heads 62c are movable along a direction vertical to top and bottom surfaces of the bonded mother substrate 90 by a driving means (not shown). A load is applied to the cutter wheels 62a, as appropriate, by an energizing means (not shown).

Regarding the cutter wheel 62a held by the tip holder 62b, a cutter wheel which has a blade edge with the center in the width direction protruded in an obtuse V shape is used as disclosed in Japanese Laid-Open Publication No. 9-188534. The protrusions with a predetermined height are formed on the blade edge with a predetermined pitch in the circumferential direction.

The lower substrate cutting device 70 provided on the lower guide rail 32 has a structure similar to the upper substrate cutting device 60, but is provided in an inverted state thereto. The cutter wheel 62a (see FIG. 4) of the lower substrate cutting device 70 is arranged so as to face the cutter wheel 62a of the upper substrate cutting device 60.

The cutter wheel 62a of the upper substrate cutting device 60 is pressed so as to make contact onto the top surface of the bonded mother substrate 90 by the aforementioned energizing means and the moving means of the cutter head 62c. The cutter wheel 62a of the lower substrate cutting device 70 is pressed so as to make contact onto the bottom surface of the bonded mother substrate 90 by the aforementioned energizing means and the moving means of the cutter head 62c. When the upper substrate cutting device 60 and the lower substrate cutting device 70 are simultaneously moved in the same direction, the bonded mother substrate 90 is cut.

It is preferred that the cutter wheel 62a is rotatably supported by the cutter head 65 using the servo motor disclosed in WO 03/011777.

As shown in FIGS. 12 and 13, the servo motor 65b is supported in an inverted manner between a pair of side walls 65a. A holder holding member 65c is provided below the pair of side walls 65a so as to be rotatable via a supporting axis 65d, the holder holding member 65c having an L shape when viewed from the side. A tip holder 62b is attached in front (on the right-hand side in FIG. 13) of the holder holding member 65c. The tip holder 62b is attached to rotatably support the cutter wheel 62a via an axis 65e. Flat bevel gears 65f are mounted on the rotation axis of the servo motor 65b and the supporting axis 65d so as to engage with each other. Thus, the holder holding member 65c performs a rotation operation in the up-and-down direction with the supporting axis 65d as its supporting point and the cutter wheel 62a moves upwards and downwards due to the forward and reverse rotation of the servo motor 65b. The cutter heads 65 themselves are provided on the upper substrate cutting device 60 and the lower substrate cutting device 70.

Figure 14:
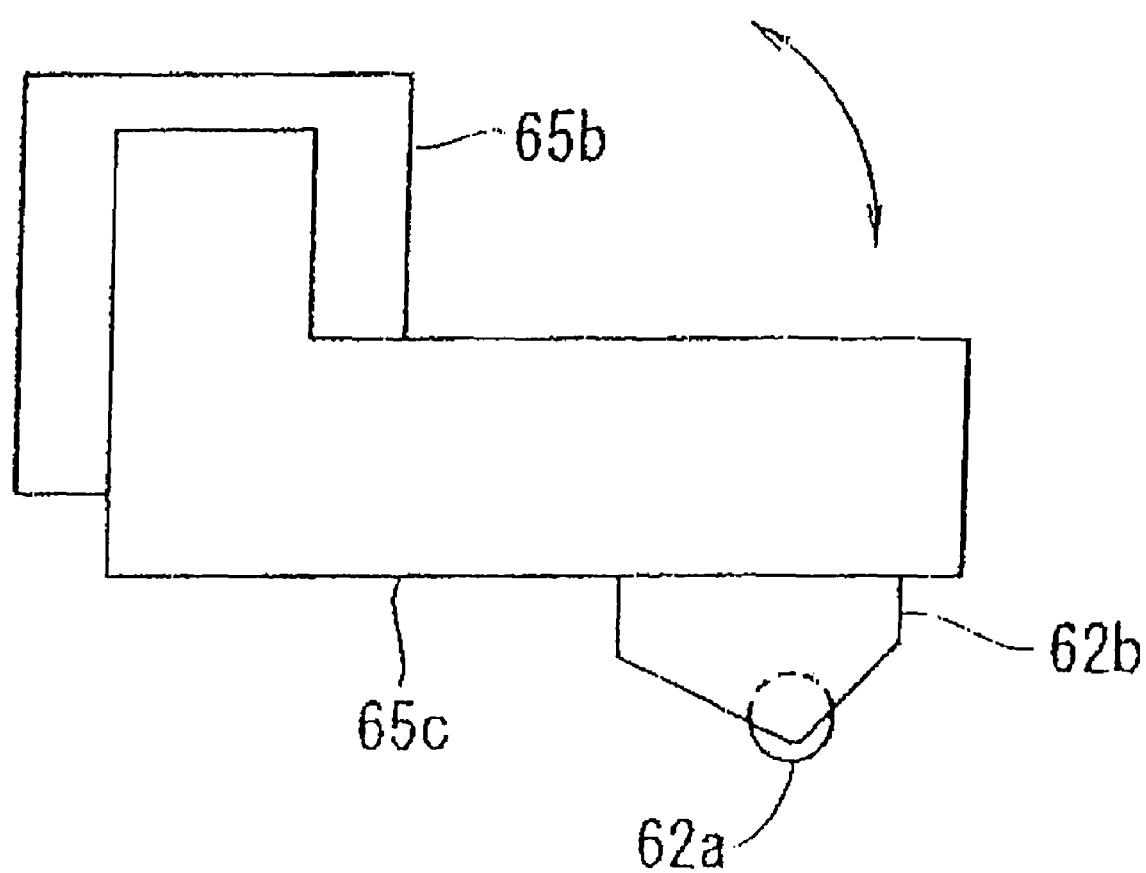
FIG. 14 is a front view showing another example of the cutter head provided in the substrate cutting device of the substrate cutting system according to Embodiment 1 of the present invention.

FIG. 14 is a front view showing another example of cutter head using a servo motor. The rotation axis of the servo motor 65b is directly connected to the holder member 65c.

The cutter heads shown in FIGS. 12 and 14 move the cutter wheels 62a upwards and downwards by rotating the servo motors using the position control so as to position the cutter wheel 62a. The cutter heads transmit the scribing pressure for the brittle material substrate to the cutter wheel 62a by controlling the rotation torque. The rotation torque acts to return the cutter wheel 62a to the set position when the position of the cutter wheel 62a is shifted from the positions previously set in the servo motors 65b during the scribing operation for forming a scribing line on the bonded mother substrate 90 by moving the cutter heads in a horizontal direction. In other words, the servo motor 65b controls the position in the perpendicular direction of the cutter wheel 62a, and at the same time, the servo motor 65b is an energizing means for the cutter wheel 62a.

By using the cutter head 65 including the aforementioned servo motor, when the bonded mother substrate 90 is being scribed, the rotation torque of the servo motor is corrected immediately in response to the change of the scribing pressure by the change in resistive force received by the cutter wheel 62a. Thus, scribing is stably performed and a scribing line with excellent quality can be formed.

A cutter head is effectively applied to cutting the mother substrate in the substrate cutting system according to the present invention. The cutter head includes a mechanism for vibrating a scribing cutter (e.g., a diamond point cutter or a cutter wheel) which scribes the bonded mother substrate 90 so as to periodically change the pressure force of the scribing cutter on the bonded mother substrate 90.

The structure of the upper substrate cutting device 60 and the lower substrate cutting device 70 is not limited to the aforementioned structure. In other words, any structure can be used, as long as the device has a structure for processing the top and bottom surfaces of the substrate so as to cut the substrate.

For example, the upper substrate cutting device 60 and the lower substrate cutting device 70 can be a device which cuts the mother substrate by using such as a laser light, a dicing saw, a cutting saw, or a diamond-studded blade cutter. When the mother substrate is made of a metal substrate (e.g., a steel plate), a wood plate, a plastic substrate or a brittle material substrate (e.g., a ceramic substrate, glass substrate or semiconductor substrate), a substrate cutting device for cutting the mother substrate by using, for example, a laser light, a dicing saw, a cutting saw, or a diamond-studded blade cutter is used.

Furthermore, when a bonded mother substrate for which a pair of mother substrate is bonded to each other, a bonded mother substrate for which different types of mother substrates are bonded to each other or a stacked substrate for which a plurality of mother substrates are stacked on each other is cut, a substrate cutting device similar to the one used for cutting the aforementioned mother substrate can be used.

The upper substrate cutting device 60 and the lower substrate cutting device 70 may include a cutting assistance means for assisting the cutting of the substrate. As a cutting assistance means, for example, a means for pressing (e.g., a roller on the substrate), a means for spraying compressed air onto the substrate, a means for irradiating a laser onto the substrate or a means for warming (heating) the substrate by spraying such as heated air onto the substrate is used.

Furthermore, in the description above, the upper substrate cutting device 60 and the lower substrate cutting device 70 have the same structure. However, the upper substrate cutting device 60 and the lower substrate cutting device 70 can have structures different from each other, depending on the cutter pattern of the substrate or the cutting condition of the substrate.

The operation of the substrate cutting system, having such a structure will be described, mainly using a case in which a bonded substrate for which large-sized glass substrates are bonded to each other is cut.

Figure 15:
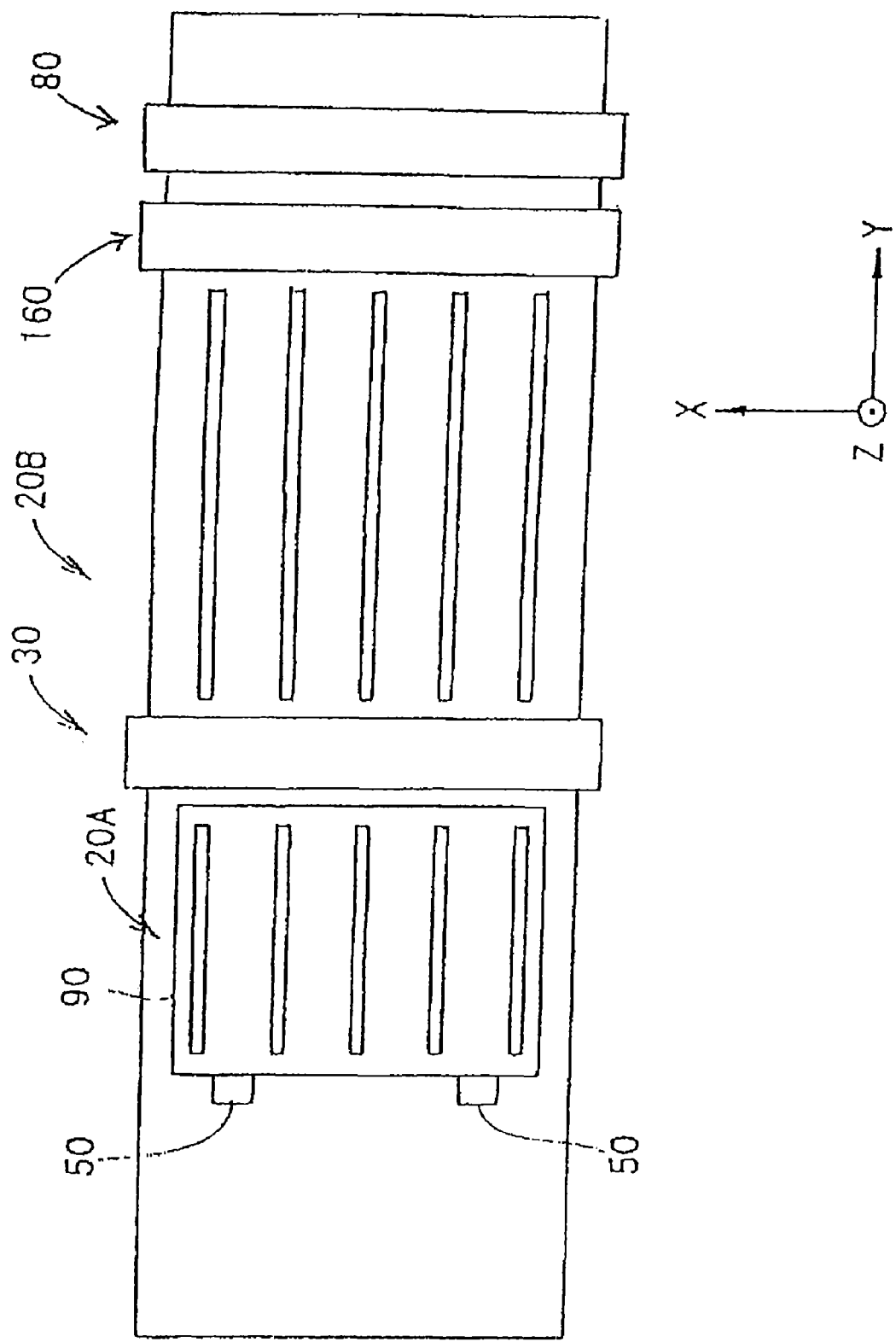
FIG. 15 is a schematic plan view for explaining the operation of the substrate cutting system according to Embodiment 1 of the present invention.

When the bonded mother substrate 90 for which large-sized glass substrates are bonded to each other is cut into a plurality of panel substrates 90a (see FIG. 16), first, as shown in FIG. 15, the bonded mother substrate 90 is carried in, by a transportation robot, etc., from the end of the substrate carry-in side to the substrate cutting system 1 according to the present invention. Thereafter, the bonded mother substrate 90 is mounted, in a horizontal state, on the timing belts 21e of all the first substrate supporting units 21A of the first substrate supporting section 20A.

In this state, the bonded mother substrate 90 is pushed by pushers (not shown) so as to contact positioning pins (not shown) arranged along the frame 11B of the main frame 11, and at the same time, the bonded mother substrate 90 is pushed by pushers (not shown) so as to contact positioning pins (not shown) arranged along the direction perpendicular to the frame 11B. Thereby, the bonded mother substrate 90 is positioned at a predetermined position in the mounting base 10 in the substrate cutting system.

Thereafter, as shown in FIG. 15, the side edge of the bonded mother substrate 90, which is positioned on the substrate carry-in side, is clamped by the clamp member 51 of each of the clamp devices 50 arranged in the substrate carry-in side so as to be perpendicular to the frame 11B.

The clamp member 51 of each of the clamp devices 50 waits at a predetermined position where the rod 56 is shorted due to the cylinder 55 such that it does not block the carry-in of the bonded mother substrate 90 at the time of carry-in thereof. Then, after the bonded mother substrate 90 is positioned, the rod 56 is lengthened, and the clamp member 51 of each of the clamp devices 50 grips the side edge of the bonded mother substrate 90 on the substrate carry-in side.

When the side edge of the bonded mother substrate 90 on the substrate carry-in side is clamped by each of the clamp devices 50, each clamp member 51, which clamps the side edge of the bonded mother substrate 90, lowers at approximately the same time due to the weight of the bonded mother substrate 90. Therefore, the bonded mother substrate 90 is additionally supported by the timing belts 21e of all the first substrate supporting units 21A.

In this state, each clamp device 50 is slid to the substrate carry-in side such that the cutting device guide body 30 is located at a predetermined position above an adjacent side edge of the bonded mother substrate 90, the bonded mother substrate 90 being clamped by each of the clamp devices 50 in a horizontal state. A first optical device 38 and a second optical device 39 provided on the cutting device guide body 30, move along the cutting device guide body 30 from respective waiting positions and capture a first alignment mark and a second alignment mark, respectively, provided on the bonded mother substrate 90.

Simultaneous to when each clamp device 50 starts moving toward the substrate carry-out side, the timing belts 21e of the first substrate supporting units 21A of the first substrate supporting section 20A and the timing belts 21e of the second substrate supporting units 21B of the second substrate supporting section 20B are circled, by the driving of the motor, at the same speed as that of the bonded mother substrate 90 moving toward the carry-out side in the same direction, the bonded mother substrate 90 being clamped by each of the clamp devices 50. The bonded mother substrate 90 clamped by the clamp devices 50 on the move is supported, without being rubbed against the respective timing belts 21e, by the timing belts 21e of the first substrate supporting units 21A of the first substrate supporting section 20A and the timing belts 21e of the second substrate supporting units 21B of the second substrate supporting section 20B.

Next, based on the result of the captured first alignment mark and second alignment mark, the inclination of the bonded mother substrate 90 with respect to the cutting device guide body 30, the starting position of cutting the bonded mother substrate 90 and the ending position of cutting the bonded mother substrate 90 are calculated by an operational processing device (not shown), the bonded mother substrate 90 being supported by each of the clamp devices 50 in a horizontal state. Based on the result of the calculation, each of the clamp devices 50 holding the bonded mother substrate 90 as well as the upper substrate cutting device 60 and the lower substrate cutting device 70 are moved so as to cut the bonded mother substrate 90 (which is referred to as "scribing by linear interpolation" or "cutting" by linear interpolation).

Figure 16:
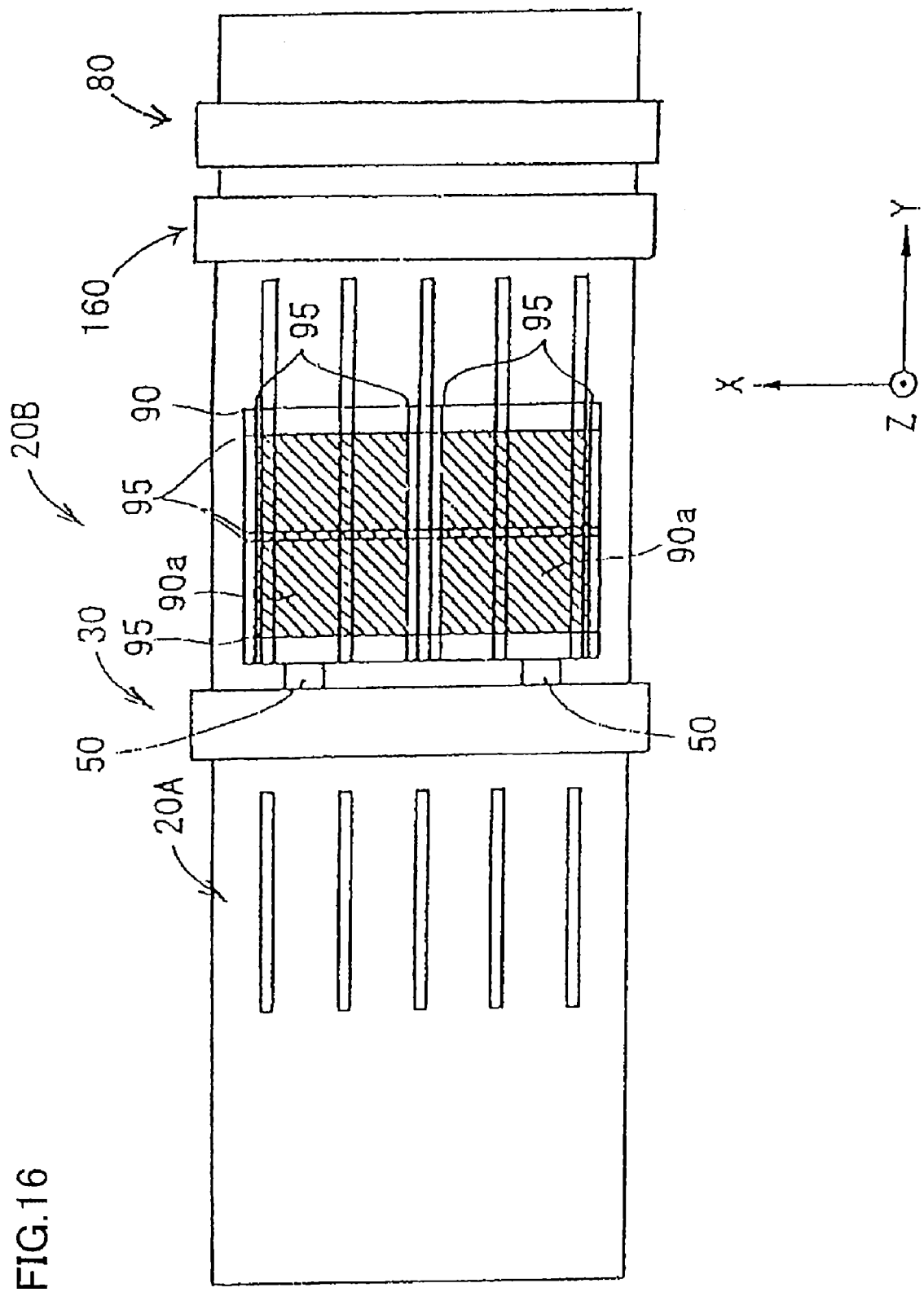
FIG. 16 is a schematic plan view for explaining the operation of the substrate cutting system according to Embodiment 1 of the present invention.

In this case, as shown in FIG. 16, each cutter wheel 62a facing each other is pressed so as to make contact onto the top surface and the bottom surface of the bonded mother substrate 90 and rolled on the top surface and the bottom surface of the bonded mother substrate 90, respectively, so as to form scribing lines on the top surface and the bottom surface of the bonded mother substrate 90.

The bonded mother substrate 90 is, for example, as shown in FIG. 16, cut so that two panel substrates 90a are cut into two lines in a direction along the upper guide rail 31 and the lower guide rail 32. The cutter wheel 62a of the upper substrate cutting device 60 and the cutter wheel 62a of the lower substrate cutting device 70 are pressed so as to make contact and rolled along the side edge of the panel substrates 90a in order to cut four panel substrates 90a from the bonded mother substrate 90.

In this case, vertical cracks are created, by the cutter wheel 62a of the upper substrate cutting device 60 and the cutter wheel 62a of the lower substrate cutting device 70 on the part of the glass substrate where each cutter wheel 62a is pressed so as to make contact and rolled. As a result, scribing lines 95 are formed thereon. Protrusions are formed, with a predetermined pitch, on the outer circumferential ridge of the blade edge of each cutter wheel 62a. Thus, a vertical crack having about 90% of the thickness of the glass substrate in the thickness direction is formed on each glass substrate.

A cutter head is effectively applied to cutting the mother substrate in the substrate cutting system according to the present invention, the cutter head including a mechanism for vibrating a scribing cutter (e.g., a diamond point cutter or a cutter wheel) which scribes the bonded mother substrate 90 so as to periodically change (vibrate) the pressure force of the scribing cutter on the bonded mother substrate 90.

Figure 17:
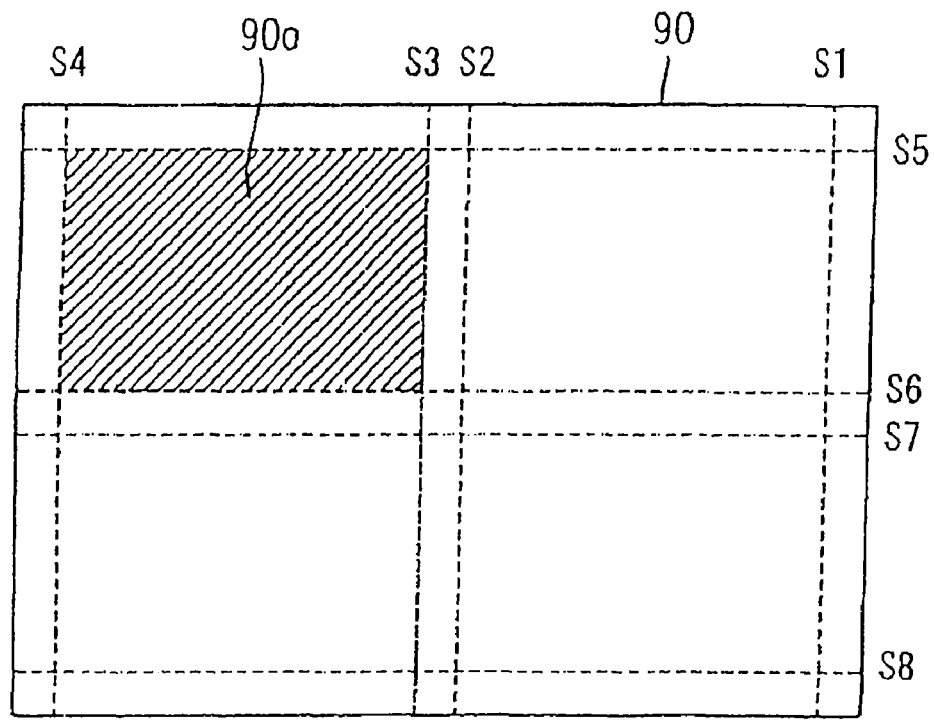
FIG. 17 is a view showing a scribing pattern when a substrate is scribed in the substrate cutting system according to Embodiment 1 of the present invention.

Regarding the method for scribing the front and back surfaces of the bonded mother substrate 90, a conventional method as shown in FIG. 17, in which scribing lines are formed in turn along lines to be scribed S1 to S4 along a vertical direction, which is a narrow side direction of the bonded mother substrate 90, and then scribing lines are formed in turn along lines to be scribed S5 to S8 along the horizontal direction, which is wide side direction, can be used in general.

Figure 18:
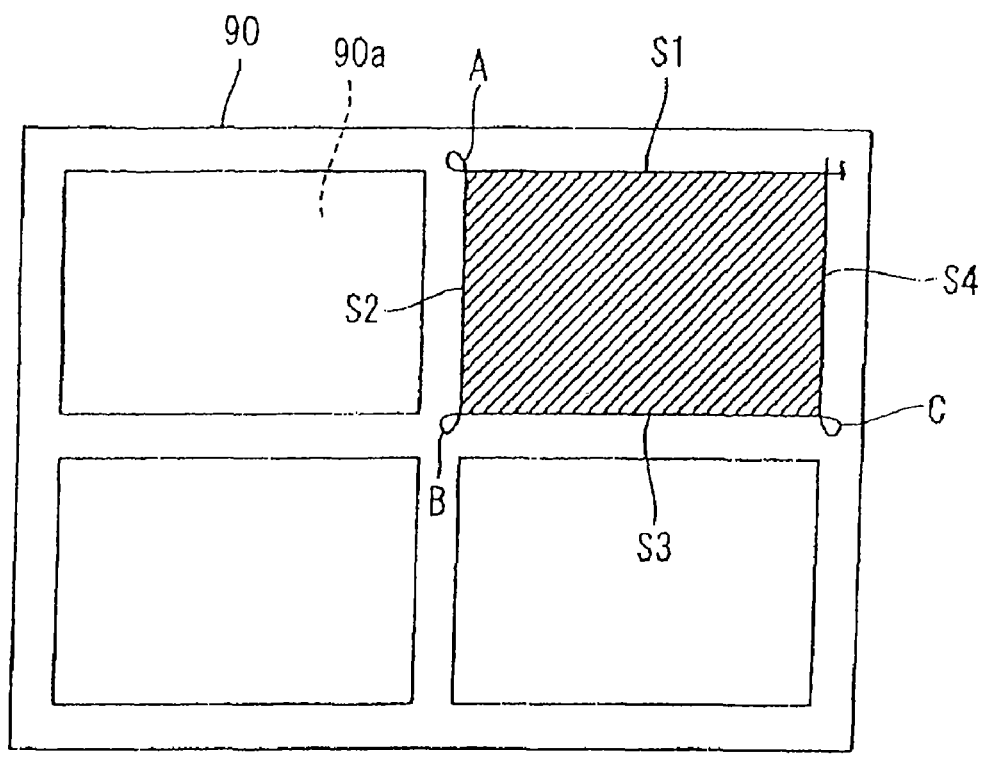
FIG. 18 is a view showing another scribing pattern when the substrate is scribed in the substrate cutting system according to Embodiment 1 of the present invention.

Besides the above-described scribing method, a scribing method as shown in FIG. 18 can be preferably used for the substrate cutting system of the present invention. In FIG. 18, four panel substrates 90a are formed from one bonded mother substrate 90.

The bonded mother substrate 90 has a rectangular shape. Four panel substrates 90a are obtained by forming two panel substrates 90a along the longitudinal direction of the bonded mother substrate 90 and forming two panel substrates 90a along the width direction which is orthogonal to the longitudinal direction. Each of the panel substrates 90a is formed with an appropriate space apart from the adjacent panel substrate 90a and from side edges along the longitudinal direction and side edges of the width direction of the bonded mother substrate 90.

By having the cutter wheel 62a of the upper substrate cutting device 60 and the cutter wheel 62a of the lower substrate cutting device 70 oppose each other and being pressed and rolled at the same time, scribing lines across the entire circumference are formed on the front and back surface of the bonded mother substrate 90 for each of the panel substrates 90a one by one in turn.

In this case, first, scribing line is formed along one linear line to be scribed S1 along the side edges parallel to the longitudinal direction of the bonded mother substrate 90 for the panel substrate 90a to be scribed. More specifically, the cutter wheels 62a of the cutter heads 62c are pressed and rolled on the bonded mother substrate 90 along the line to be scribed S1.

Figure 19:
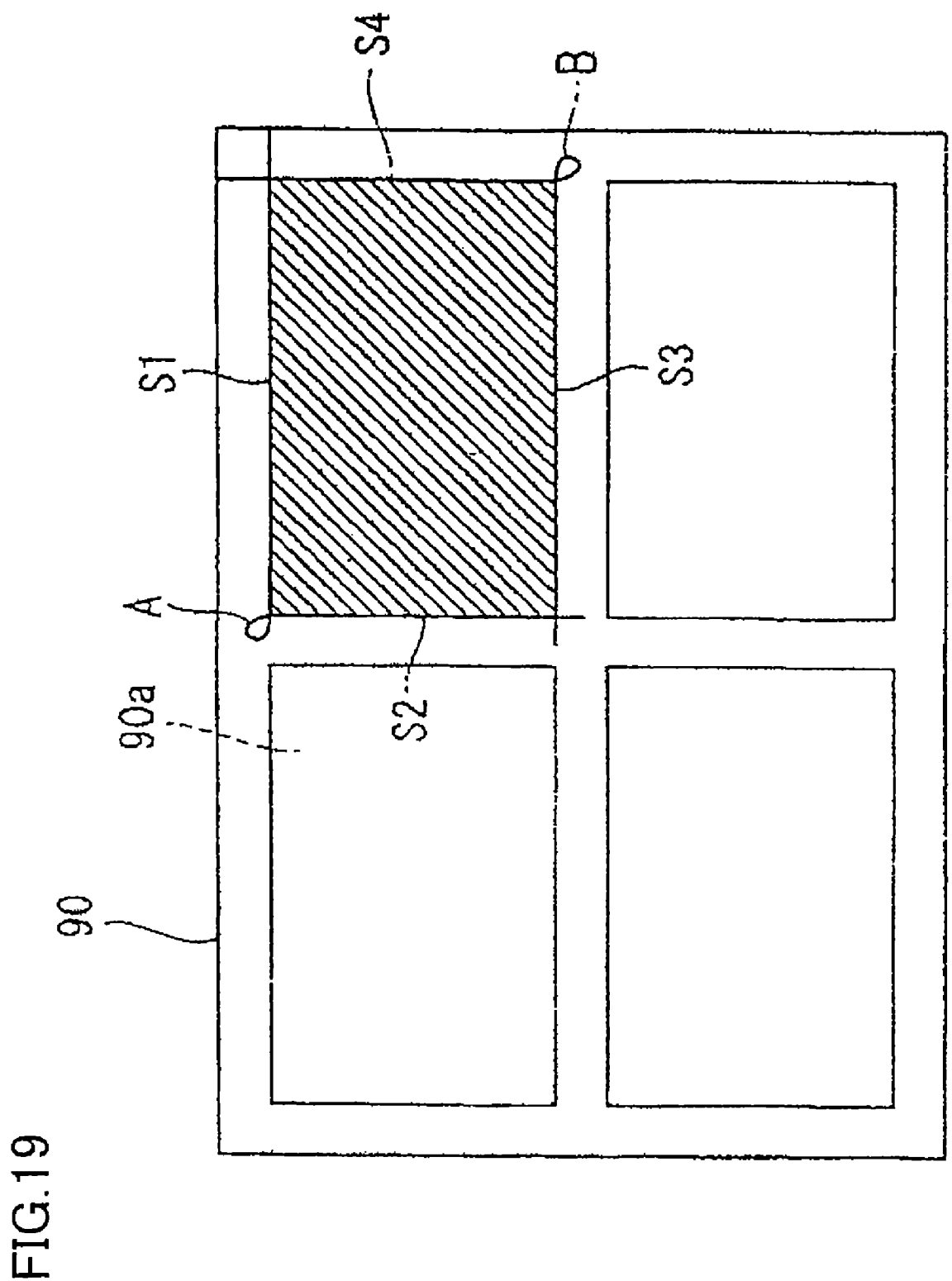
FIG. 19 is a view showing yet another scribing pattern when the substrate is scribed in the substrate cutting system according to Embodiment 1 of the present invention.

In FIG. 19, it is shown that the scribing start point by the cutter wheels 62a is a position on the bonded mother substrate 90 (a position for internal cut). However, it may be a position near the outside of the end surface of the bonded mother substrate 90 along the line to be scribed S1 (a position for external cut).

When the scribing line is formed along the line to be scribed S1 by a vertical crack which extends across the entirety of the thickness direction, each of the clamp devices 50 holding the bonded mother substrate 90 is moved in the Y direction and the upper substrate cutting device 60 and the lower substrate cutting device 70 are moved in the X direction at the same time such that the cutter wheels 62a revolves around the vertical axis by 270 degrees to form a circular trace having a radius of about 1 mm (a corner portion A in FIG. 19).

When the cutter wheels 62a are revolving, the pressure of the cutter wheels 62a to the bonded mother substrate 90 is reduced so that there is no deep vertical crack formed on the bonded mother substrate 90. When the thickness of the bonded substrate 90 is 0.7 mm, the depth of the vertical crack formed in the bonded mother substrate 90 when the cutter wheels 62a is revolving is about 100 μm to 200 μm.

When the cross-scribing is performed by the cutter wheels 62a as shown in FIG. 17, a chip tends to be generated in the bonded mother substrate 90 at cross points of the scribing lines formed when scribing to performed in a first direction and scribing is performed in a second direction.

Since a vertical crack which almost extends to the thickness of the bonded mother substrate 90 has been already formed when scribing is performed in the first direction, the mother glass substrate 90 sinks in front of the first scribing line when the cutter wheels 62a reach near the scribing line in the first direction while scribing in the second direction and such a chip may be generated when the cutter wheels 62a run on the glass substrates along the scribing line in the first direction at a crossing portion of the scribing line in the first direction and a scribing line in the second direction.

In the scribing method as shown in FIG. 18, the cutter wheels 62a revolve and cross the scribing line which has been already formed along the line to be scribed S1 with the pressure to the bonded mother substrate 90 being reduced. Thus, a part of the bonded mother substrate 90 does not sink before the scribing lines cross each other, and thus, it is possible to prevent a chip from occurring in the bonded mother substrate 90 when the scribing lines cross each other.

When travel direction of the cutter wheels 62a revolve by 270 degrees and the cutter wheels 62a are along the linear line to be scribed S2 along the width direction of the panel substrates 90a which are orthogonal to the line to be scribed S1, the cutter wheels 62a are pressed and rolled along the line to be scribed S2. Thus, the scribing line is formed by a vertical crack which extends across the entirety of the thickness direction along the line to be scribed S2.

Then, in a similar manner, the cutter wheels 62a revolve by 270 degrees to a direction orthogonal to the line to be scribed S2 while forming a circular trace having a radius of about 1 mm in corner portion B without separating the cutter wheels 62a from the front and back surfaces of the bonded mother substrate 90. Thus, the cutter wheels 62a are along the line to be scribed S3 and form the scribing line by a vertical crack which extends across the entirety of the thickness direction along the line to be scribed S3. Furthermore, again, the cutter wheels 62a revolve by 270 degrees to a direction orthogonal to the line to be scribed S3 while forming a circular trace having a radius of about 1 mm in corner portion C without separating the cutter wheels 62a from the front and back surfaces of the bonded mother substrate 90. Thus, the cutter wheels 62a are along the line to be scribed S4 and form the scribing line on the top and bottom surfaces of the bonded mother substrate 90 by a vertical crack which extends across the entirety of the thickness direction along the line to be scribed S4.

In this way, a closed curve including four linear scribing lines is formed around a panel substrate 90a. Then, for example, in order to form the panel substrate 90a adjacent in the longitudinal direction of the bonded mother substrate 90, a closed area with four linear scribing lines is similarly formed around the panel substrate 90a. Then, closed areas with four linear scribing lines are formed across the entire circumference for each of the remaining pair of the panel substrates 90a in turn.

Furthermore, besides the above-described scribing method, a scribing method as shown in FIG. 19 can be preferably used in the substrate cutting system of the present invention. In FIG. 19, four panel substrates 90a are formed from one bonded mother substrate 90.

In the scribing method shown in FIG. 19, scribing lines along lines to be scribed S1 and S2 which are orthogonal to each other on the panel substrates 90a are formed in the method as described above. For forming the scribing line along the line to be scribed S1, the cutter wheels 62a is positioned in the vicinity of outside the end surface of the bonded mother substrate 90 and the scribing line along the line to be scribed S1 is continuously formed therefrom.

A chip which may be generated when the cutter wheels 62a run on the front and back surfaces of the bonded mother substrate 90 at the start of scribing does not affect the panel substrates 90a to become products.

Then, the cutter wheels 62a revolve by 270 degrees to a direction orthogonal to the line to be scribed S1 while forming a circular trace in the corner portion A. Thus, the cutter wheels 62a are along the line to be scribed S2 and form the scribing line by a vertical crack which extends across most of the entirety of the thickness direction along the line to be scribed S2.

Then, the cutter wheels 62a are temporarily separated from the surface of the bonded mother substrate 90, and the scribing lines along the lines to be scribed S3 and S4 in a direction orthogonal to the line to be scribed S1 are formed in this order. In this case, a chip, which may be generated when the cutter wheels 62a run on the front and back surfaces of the bonded mother substrate 90 at the start of scribing, does not affect the panel substrates 90a to become products.

In this way, four linear scribing lines are formed around the panel substrate 90a. Then, for example, for forming the panel substrate 90a adjacent in the longitudinal direction of the bonded mother substrate 90, four linear scribing lines are similarly formed across the entire circumference of the panel substrate 90a. Then, closed areas with four linear scribing lines are formed across the entire circumferences for each of the remaining pair of the panel substrates 90a in turn.

Figure 20:
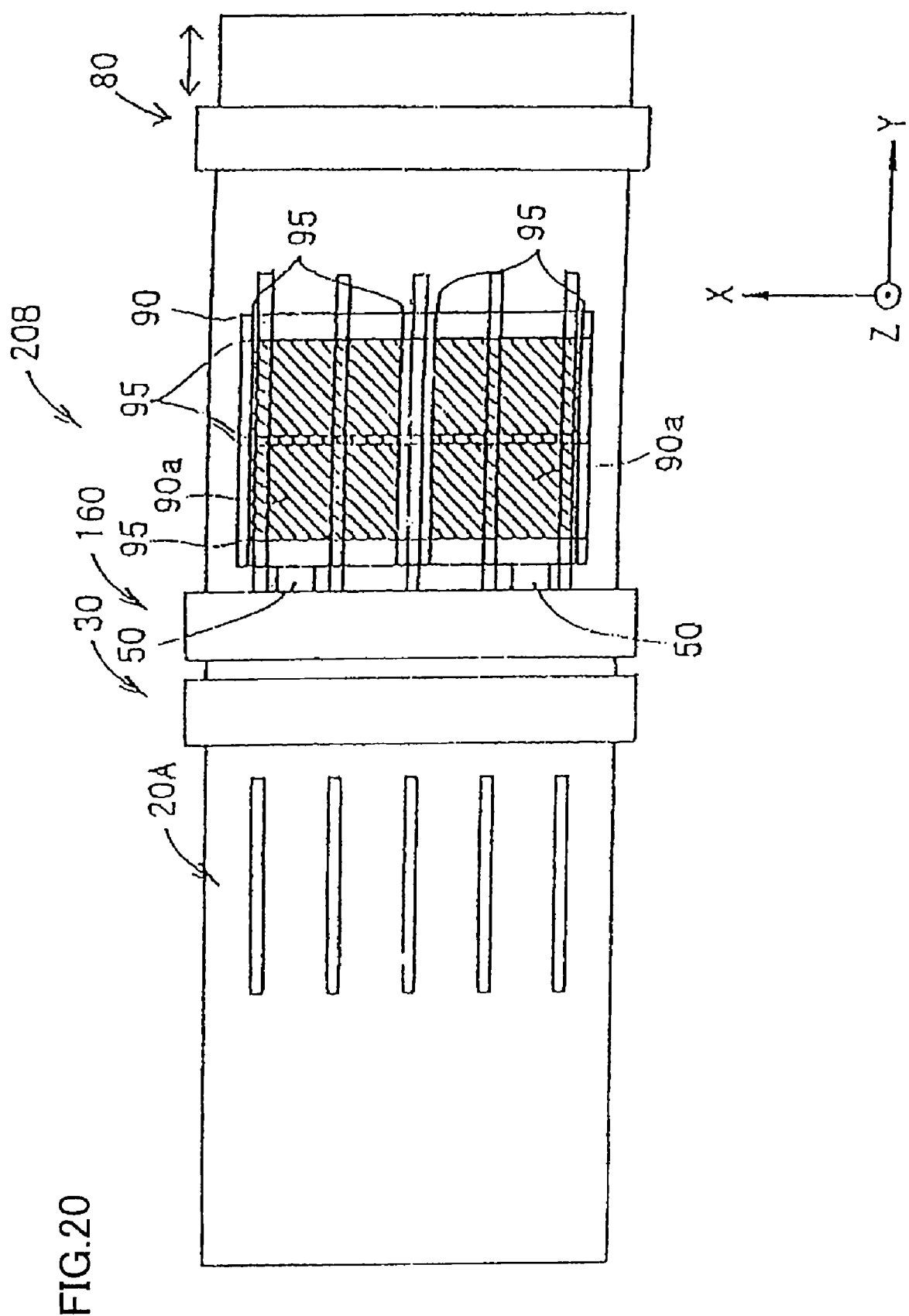
FIG. 20 is a schematic plan view for explaining the operation of the substrate cutting system according to Embodiment 1 of the present invention.

After the scribing lines are formed on the bonded mother substrate by the above-described scribing method, as shown in FIG. 20, with the bonded mother substrate 90 on which the scribing line 95 is formed being supported by the timing belts 21e of the second substrate supporting units 21B, the steam unit section 160 moves toward the substrate carry-in side and blows the steam entirely on the front and back surfaces of the bonded mother substrate 90 on which the scribing lines are carved to completely cut the bonded mother substrate 90. At the same time, the water remaining on the front and back surfaces of the bonded mother substrate 90 after the steam is blown thereto is removed by the air knife 165.

By blowing the steam onto the entire front and back surface of the bonded mother substrate 90 having the scribing lines carved thereon, the scribing lines formed by the cutter wheels 62a experience volume expansion since the front and back surface portions of the bonded mother substrate 90 are heated. In this way, vertical cracks extend from the surface of the upper and lower mother substrates of the bonded mother substrate 90 toward the bonded surface, and the bonded mother substrate 90 is completely cut.

Thereafter, as shown in FIG. 20, all the panel substrates 90a cut from the bonded mother substrate 90 on the timing belts 21e of all the second substrate supporting units 21B of the second substrate supporting section 20B are carried out by the carrying robot 140 of the substrate carry-out device 80, and thus, a cut bonded mother substrate 90' (portion to be discarded) is supported by the timing belts 21e of the second substrate supporting units 21B.

Then, the substrate carry-out device 80 and the steam unit section 160 moves toward the end portion on the substrate carry-out side.

After the substrate carry-out device 80 and the steam unit section 160 are moved to the end of the substrate carry-out side, the clamp member 51 of each of the clamp devices 50 is open, and the state of the cut bonded mother substrate 90' is changed from being gripped by the clamp members 51 to being only supported by the timing belt 21e of each of the second substrate supporting units 21B.

Figure 21:
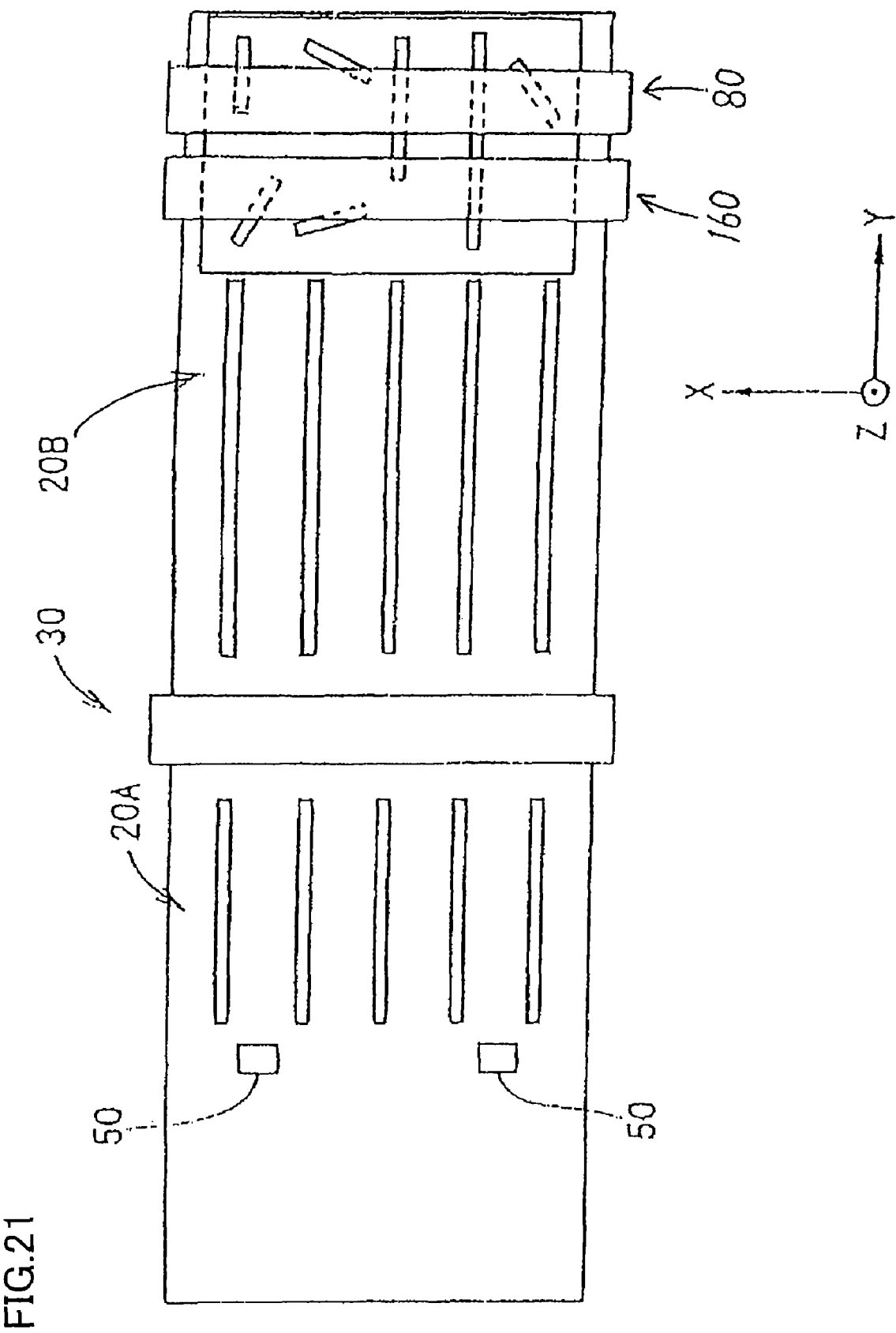
FIG. 21 is a schematic plan view for explaining the operation of the substrate cutting system according to Embodiment 1 of the present invention.

When the cut bonded mother substrate 90' is supported by the timing belt 21e of each of the second substrate supporting units 21B, as shown in FIG. 21, each of the clamp devices 50 is caused to move toward the substrate carry-in side and the timing belts 21e of all the second substrate supporting units 21B of the second substrate supporting section 20B are circled. Therefore, the cut bonded mother substrate 90' (portion to be discarded or cullet) falls down. In this case, the cut bonded mother substrate 90 (portion to be discarded) which has fallen is guided by a guide plate arranged in a slanted state so as to be accommodated into a cullet accommodation box.

By employing the scribing method which will be described below as the scribing method by the upper substrate cutting device 60 and the lower substrate cutting device 70 of the cutting device guide body 30, a cutting process of the bonded substrate by the steam unit section 160 can be omitted.

Figure 22:
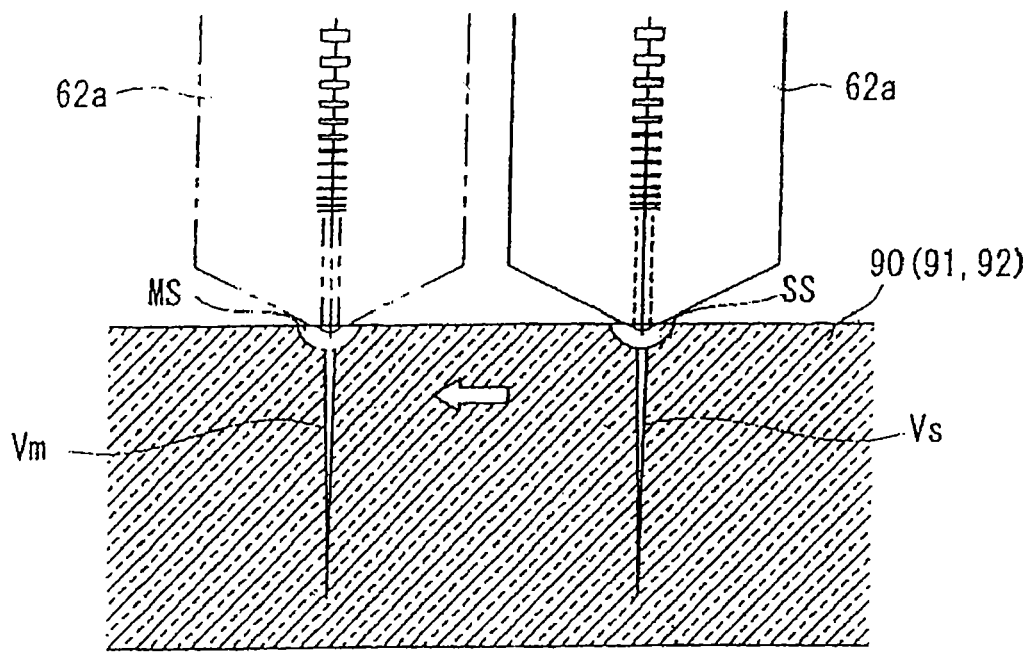
FIG. 22 is a sectional view of the substrate for explaining the principle of a substrate cutting method according to the present invention.

In this case, as shown in FIG. 22, the cutter wheels 62a are pressed and rolled on an upper mother substrate 91 and a lower mother substrate 92 of the bonded mother substrate 90 along lines to be cut on the mother substrates 91 and 92 for scribing the mother substrates 91 and 92. Thus, vertical cracks Vm along thickness directions of the mother substrates 91 and 92 are sequentially formed along the lines to be cut, and main scribing lines MS are formed. The vertical cracks Vm are formed such that they extend by 80% or more of the thickness of the mother substrates 91 and 92, and more preferably, 90% or more from surfaces of the mother substrates 91 and 92.

Thereafter, in the area outside the panel substrates obtained by cutting the mother substrates 91 and 92, the mother substrates 91 and 92 are scribed by pressing and rotating the cutter wheels 62a along the main scribing lines MS on the mother substrates 91 and 92 with spaces of about 0.5 to 1.0 mm apart from the main scribing lines MS. In this way, vertical cracks Vs along the thickness directions of the mother substrates 91 and 92 are sequentially formed along the main scribing lines MS to form supplementary scribing lines SS.

At this time, the cutter wheels 62a press and roll on the surfaces of the mother substrates 91 and 92, and the blades thereof cut into the surfaces of the mother substrates 91 and 92. Thus, a compressed force is applied to the surfaces of the mother substrates 91 and 92 and the compressed force has influence on the surface portions of the vertical cracks Vm in the main scribing lines MS which have been already formed. In this example, the vertical cracks Vm forming the main scribing lines MS are formed to extend by 80% or more of the thickness of the mother substrates 91 and 92. Thus, when the surface portion of the mother substrates 91 and 92 are compressed, the vertical cracks Vm of the main scribing lines MS have gaps on the surface portions of the mother substrates 91 and 92 are compressed and gaps on bottom portions are widened. Therefore, the vertical cracks Vm are elongated toward the bonded surface of the mother substrates 91 and 92. When the vertical cracks Vm reach the bonded surface of the mother substrates 91 and 92 and the vertical cracks Vm reach the bonded surface of the mother substrates 91 and 92 across the entirety of the main scribing lines MS, the bonded mother substrate 90 is cut along the main scribing lines MS.

It is preferable that the supplementary scribing lines SS are formed with spaces of about 0.5 to 1.0 mm apart from the main scribing lines MS. When the spaces between the supplementary scribing lines SS and the main scribing lines MS are smaller than 0.5 mm, a large compression force is applied to the surface portion of the vertical cracks Vm forming the main scribing lines MS, and damage such as chips may occur in the surface side end portions of the vertical cracks Vm. On the other hand, when the space to larger than 1.0 mm, the compression force applied to the vertical cracks Vm on the main scribing lines MS is not enough, and the vertical cracks Vm may not reach the bonded surface of the mother substrates 91 and 92.

As described above, by forming double scribing lines of the main scribing lines MS and the supplementary scribing lines SS with predetermined spaces, a plurality of panel substrates 90a are cut out of the bonded mother substrate 90.

Figure 23:
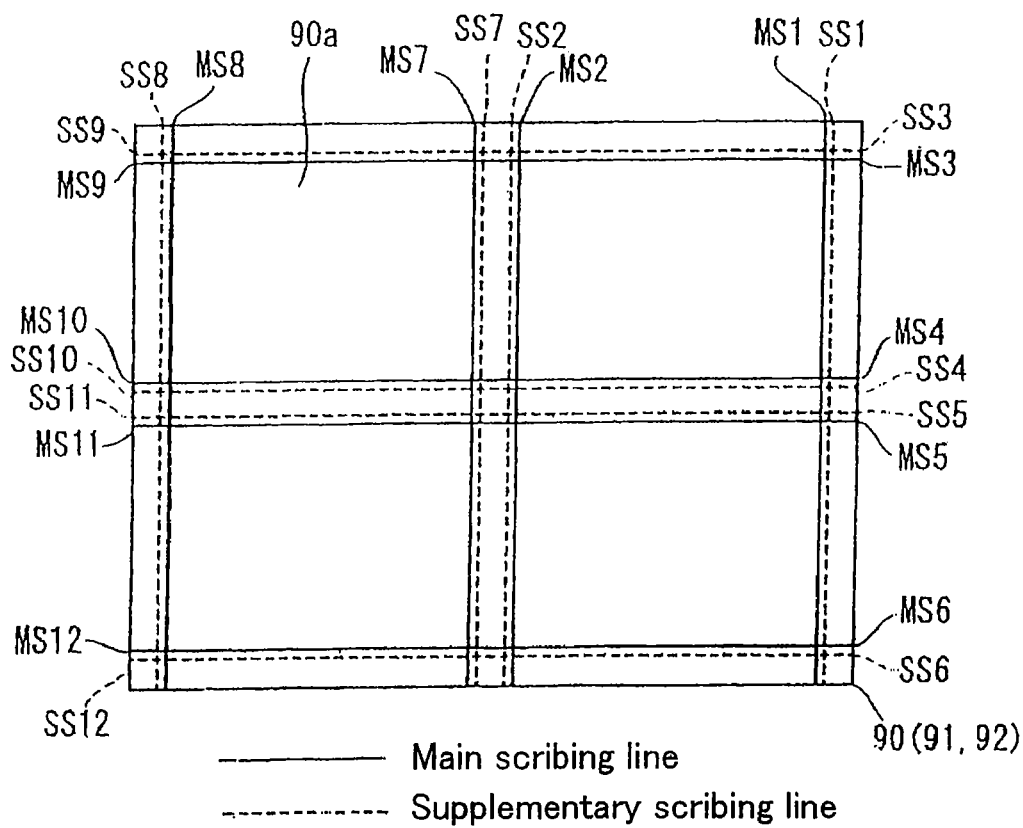
FIG. 23 is a plan view of the substrate showing a scribing pattern of the substrate for explaining an example of the substrate cutting method according to the present invention.

FIG. 23 is a diagram for illustrating a scribing pattern for cutting panel substrates 90a out of the bonded mother substrate 90 by using such double scribing lines of the main scribing lines MS and the supplementary scribing lines SS. The cutter wheels 62a of the upper substrate cutting device 60 and the lower substrate cutting device 70 run along side edges of the substrate carry-out side of two panel substrates 90a on the substrate carry-out side of the bonded mother substrate 90, and a double scribing line (main scribing line MS1 and supplementary scribing line SS1) is formed on the side edges of the substrate carry-out side of the two panel substrates 90a.

Thereafter, main scribing line MS2 and supplementary scribing line SS2 are formed along the side edges of the substrate carry-in side of the two panel substrates 90a on the substrate carry-out side of the bonded mother substrate 90. When the side edges of the substrate carry-out side and the substrate carry-in side of the two panel substrates 90a on the substrate carry-out side of the bonded mother substrate 90 are cut, the clamp devices 50 holding the bonded mother substrate 90 is slid toward the substrate carry-out side so that the cutter wheels 62a locate on the side edge portion located on the substrate carry-out side of the bonded mother substrate 90. Then, the upper substrate cutting device 60 and the lower substrate cutting device 70 slide along the upper guide rail 31 and the lower guide rail 32 so that the cutter wheels 62a of the upper substrate cutting device 60 and the lower substrate cutting device 70 are on an extension of the side edge of the panel substrate 90a on the substrate carry-out side and close to the frame 11A of the main frame 11, which is close to the main frame 11. Along the extension of the side edge, a double scribing line (main scribing line MS3 and supplementary scribing line SS3) is formed, and the side edge close to the frame 11A of the panel substrate 90a on the substrate carry-out side and close to the frame 11A of the main frame 11 is cut.

Thereafter, double scribing lines (main scribing lines MS4 to MS6 and supplementary scribing lines SS4 to SS6) are formed in parallel with the frame 11A in a similar manner. Thus, side edges of the panel substrates 90a located on the substrate carry-out side in a direction along the frame 11A are respectively cut.

Thereafter, regarding two other panel substrates 90a along the upper guide rail 31 and the lower guide rail 32, side edges of the panel substrates 90a are cut by forming double scribing lines (main scribing lines MS7 to MS12 and supplementary scribing lines SS7 to SS12) along side edges of the panel substrates 90a.

In the above description, an example where double scribing lines are individually formed has been explained. However, the present invention is not limited to such a method. As long as the double scribing lines are formed along the side edges of the panel substrates 90a, any method can be used. For example, double scribing lines can be formed on the side edges of the panel substrates 90a by using one scribing line.

Figure 24:
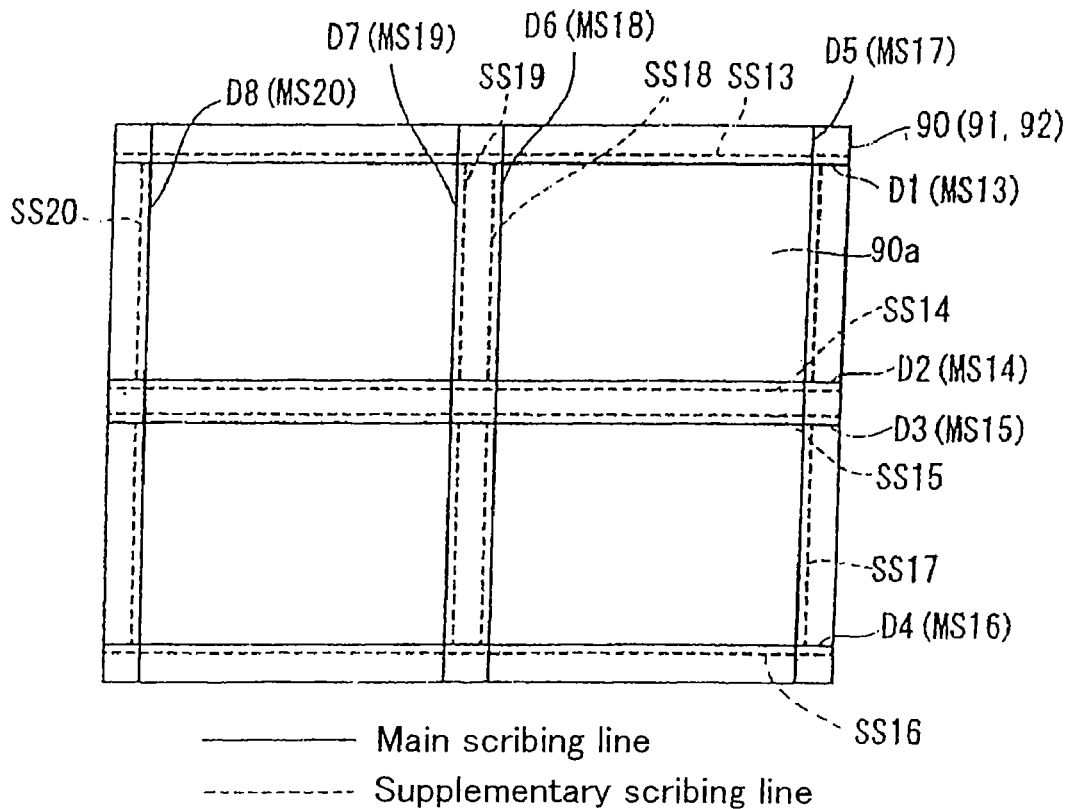
FIG. 24 is a plan view of the substrate showing a scribing pattern of the substrate for explaining another example of the substrate cutting method according to the present invention.

FIG. 24 is a plan view for illustrating a scribing pattern for cutting panel substrates 90a out of the bonded mother substrate 90 by using double scribing lines of the main scribing lines MS and the supplementary scribing lines SS. In this example, the mother substrates 91 and 92 of the bonded mother substrate 90 are cut along first to eighth lines to be cut D1 through D8 in this order to become four panel substrates 90a arranged in two rows and two columns.

The first line to be cut D1 corresponds to side edges of two panel substrates 90a in a first row along a row direction (horizontal direction in the figure), and is spaced apart from a side edge of the bonded mother substrate 90 along the row direction by a predetermined space. The second line to be cut D2 corresponds to side edges of the two panel substrates 90*a* in the first row, which are close to the panel substrate 90*a* in a second row. The third line to be cut D3 corresponds to side edges of two panel substrates 90*a* in the second row which are close to the panel substrates 90*a* in the first row, and is spaced apart from the second line to be cut D2 by 2 to 4 mm. The fourth line to be cut D4 corresponds to side edges of the two panel substrates 90*a* in the second row in a row direction (horizontal direction in the figure), and is spaced apart from the other side edges of the bonded mother substrate 90 along the row direction by a predetermined space.

The fifth line to be cut D5 corresponds to side edges of two panel substrates 90*a* in a first column along the column direction (vertical direction in the figure), and is spaced apart from one side edge of the bonded mother substrate 90 along the column direction. The sixth line to be cut D6 corresponds to the side edges of the two panel substrates 90*a* in the first column, which are close to panel substrates 90*a* in a second column. The seventh line to be cut D7 corresponds to side edges of the two panel substrates 90*a* in the second column, which are close to the panel substrates 90*a* in the first column, and is spaced apart from the sixth line to be cut D6 by 2 to 4 mm. The eighth line to be cut D8 corresponds to the side edges of the two panel substrates 90*a* in the second column along the column direction (vertical direction in the figure), and is spaced apart from the other side edges of the bonded mother substrate 90 along the column direction by a predetermined space.

In cutting such a bonded mother substrate 90, first, the cutter wheels 62*a* are pressed and rolled along, for example, the first to fourth lines to be cut D1 to D4 in this order. Thus, first to fourth main scribing lines MS13 to MS16 are formed by vertical cracks having depths of 90% or more of the thicknesses of the mother substrates 91 and 92 from the surface of the upper and lower mother substrates 91 and 92 of the bonded mother substrate 90.

In this state, the cutter wheels 62*a* are pressed and rolled along the fifth line to be cut D5. Thus, fifth main scribing line MS17 is formed along the fifth line to be cut D5.

Thereafter, sixth to eighth main scribing lines MS18 to MS20 are formed along the sixth through eighth lines to be cut D6 to D8 in this order by pressing and rotating the cutter wheels 62*a* along the sixth through eighth lines to be cut D6 to D8 in turn in a similar manner.

In this manner, after the first through eighth main scribing lines MS13 to MS 20 are formed as such, first supplementary scribing line SS13 to formed along the first main scribing line MS13 by pressing and rotating the cutter wheels 62*a* in a side edge portion of the bonded mother substrate 90, which is on the opposite side of the panel substrates 90*a* with respect to the first main scribing line MS13, with a space of about 0.5 to 1.0 mm from the first main scribing line MS13. Thus, vertical cracks on the first main scribing line MS13 extend toward the bonded surface of the mother substrates 91 and 92 of the bonded mother substrate 90 and reach the bonded surface of the mother substrates 91 and 92. Such a phenomenon occurs across entirety of the first main scribing line MS13, and the bonded mother substrate 90 is cut along the first main scribing line MS13.

Next, a second supplementary scribing line SS14 is formed along the second main scribing line MS14 by the cutter wheels 62*a* in an area opposite to the panel substrates 90*a* with respect to the second main scribing line MS14, with a space of about 0.5 to 1.0 mm from the second main scribing line MS14. Thus, vertical cracks on the second main scribing line MS14 extend toward the bonded surface of the mother substrates 91 and 92 of the bonded mother substrate 90 from the surfaces of the mother substrates 91 and 92 of the bonded mother substrate 90, and the vertical cracks reach the bonded surface of the mother substrates 91 and 92 across the entirety of the second main scribing line MS14. In this way, the bonded mother substrate 90 is cut along the second main scribing line MS14.

Along the third main scribing line MS15 and the fourth main scribing line MS16, third supplementary scribing line SS15 and a fourth supplementary scribing line SS16 are respectively formed on the side opposite to the panel substrates 90*a*. Thus, the bonded mother substrate 90 is sequentially cut along the third main scribing line MS15 and the fourth main scribing line MS16.

Thereafter, along the fifth to eighth main scribing lines MS17 to MS20, fifth to eighth supplementary scribing lines SS17 to SS20 are formed on the side opposite to the panel substrates 90*a* respectively between the first main scribing line MS13 and the second main scribing line MS14, and between the third main scribing line MS15 and the fourth main scribing line MS16. Thus, the bonded mother substrate 90 are cut along the fifth to eighth main scribing lines MS17 to MS20 and unnecessary portions are removed. As a result, four panel displays 90*a* can be obtained.

In this case, the first to eighth main scribing lines MS13 to MS20 are formed between end surfaces of the bonded mother substrate 90, more specifically, formed across the entirety of the lines to be cut D1 to D8 formed across one end surface of the bonded mother substrate 90 to the opposing other end surface. Further, the first to eighth supplementary scribing lines SS13 to SS20 are respectively formed across the end surface or one cut surface which has been cut to the opposing other end surface or the other cut surface.

Figure 25:
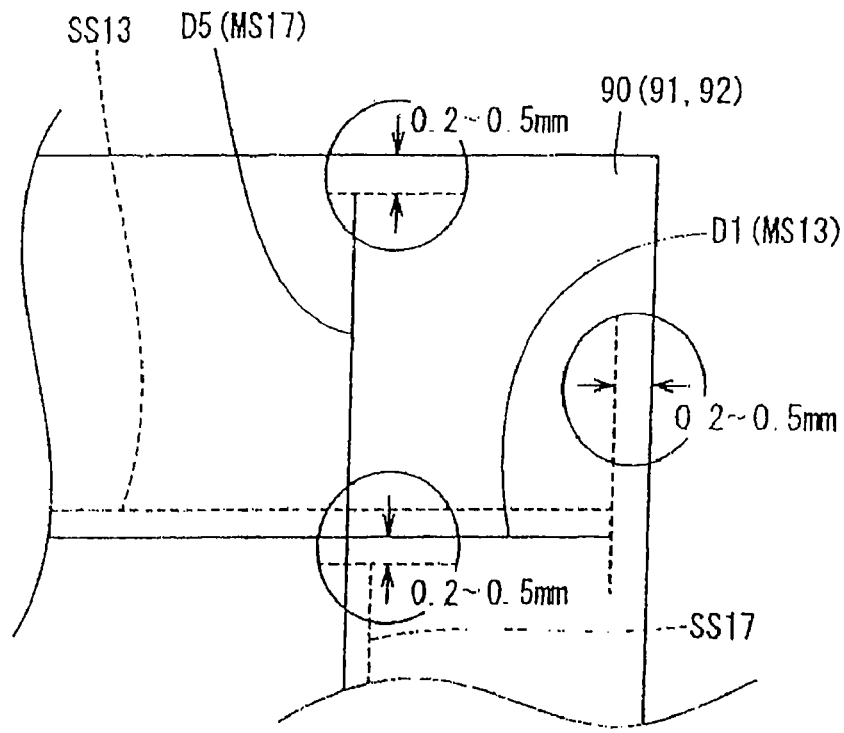
FIG. 25 is a partial plan view of the substrate showing a scribing pattern of the substrate for explaining yet another example of the substrate cutting method according to the present invention.

The present invention is not limited to the method in which the first to eighth main scribing lines MS13 to MS20 are formed across the entirety of the lines to be cut D1 to D8 formed between the end surfaces of the bonded mother substrate 90, the first to fourth supplementary scribing lines SS13 to SS16 across the one end surface of the bonded mother substrate 90 and the opposing other end surface, and the fifth to the eighth supplementary scribing lines SS17 to the SS20 are formed across one cut surface of the bonded mother substrate 90 to the opposing other cut surface. As shown in FIG. 25, positions spaced apart from the one end surface of the mother glass substrate 90 by about 0.2 to 0.5 mm may be the start positions of the first to eighth main scribing lines MS13 to MS 20, and similarly, positions in front of is the other end surfaces by about 0.2 to 0.5 mm may be end portions of the first to eighth main scribing lines MS13 to MS20.

In this case, when the cutter wheels 62*a* are pressed and rolled on the mother substrates 91 and 92 of the bonded mother substrate 90 to perform scribing for forming the first to eighth main scribing lines MS13 to MS20, vertical cracks extend in back and front directions of the scribing direction with respect to the scribing start positions. Thus, the first to eighth main scribing lines MS13 to MS20 to be formed reach one end surface of the mother substrates 91 and 92 of the bonded mother substrate 90.

Similarly, even though the scribing end positions of the first to eighth main scribing lines MS13 to MS20 are in front of the other end surface of the mother substrates 91 and 92 of the bonded mother substrate 90, since the vertical cracks in the mother substrates 91 and 92 extend in the scribing direction, the first to eighth main scribing lines MS13 to MS20 to be formed reach the other end surface of the mother substrates 91 and 92.

This shows that it is not necessary to form first to eighth supplementary scribing lines SS13 to SS20 across one end surface or one cut surface which has been cut of the mother substrates 90 and 91 to the opposing other end surface or the opposing other cut surface. As shown in FIG. 25, positions appropriately spaced apart from one end surface or the one cut surface which has been cut of the mother substrates 91 and 92 of the bonded mother substrate 90 by 0.2 to 0.5 mm may be start positions of the first to eighth supplementary scribing lines SS13 to SS20. Similarly, positions in front of the other end surface or cut surface by about 0.2 to 0.5 mm may be end positions of the first to eighth supplementary scribing lines SS13 to SS20.

Furthermore, one of the first to eighth main scribing lines MS13 to MS20 and the first to eighth supplementary scribing lines SS13 to SS20 may be formed across the one end surface or one cut surface which has been cut of the mother substrates 91 and 92 of the bonded mother substrate to the other end surface or the other cut surface of the mother substrates 91 and 92, and the other of the first to eighth main scribing lines MS13 to MS20 and the first to eighth supplementary scribing lines SS13 to SS20 may be formed across the position appropriately space apart from the one end surface or one cut surface which has been cut of the mother substrates 91 and 92 of the bonded mother substrate 90 to positions in front of the other end surface or the other cut surface of the mother substrates 91 and 92.

FIG. 26 is a plan view for illustrating another scribing pattern for cutting the panel substrates 90a out of the bonded mother substrate 90. In this scribing method, first and second main scribing lines MS13 and MS14 are formed by the cutter wheels 62a, along first and second lines to be cut D1 and D2 on the bonded mother substrate 90 along the horizontal direction are respectively formed by vertical cracks which extend to 90% or more of the thicknesses of the mother substrates 91 and 92 from the surfaces of the mother substrates 91 and 92 of the bonded mother substrate 90. Thereafter, in the area between the first and second main scribing lines MS13 and MS14, fifth main scribing line MS17 along the fifth line to be cut D5 along the vertical direction is formed by the cutter wheels 62a, and fifth supplementary scribing lines SS17 is formed on the side opposite to the panel substrates 90a being spaced apart from the fifth main scribing line MS17 by about 0.5 to 1.0 mm.

In this case, the fifth main scribing line MS17 and the fifth supplementary scribing line SS17 respectively cross the first and second main scribing lines MS13 and MS14. The fifth main scribing line MS17 runs over the second main scribing line MS14 and then is inverted by 180 degrees to form the fifth supplementary scribing line SS17 so that the fifth main scribing line MS17 and the fifth supplementary scribing line SS17 are formed continuously with one scribing.

Thereafter, similarly, in the area between the first and second main scribing lines MS13 and MS14, sixth scribing line MS18 is formed by the cutter wheals 62a along sixth line to be cut D8, and then is inverted to form sixth supplementary scribing line SS18 on the side opposite to the panel substrates 90a in a continuous manner. Further, seventh main scribing line MS19 and seventh supplementary scribing lines SS19, and eight main scribing line MS20 and eighth supplementary scribing lines SS20 are formed similarly in turn. Since the fifth to eighth main scribing lines MS17 to MS20 and the fifth to eighth supplementary scribing lines SS17 to SS20 pass across the first and second main scribing lines MS13 and MS14, it is ensured that vertical cracks forming the first and second main scribing lines MS13 and MS14 reach the bonded surface of the mother substrates 91 and 92 of the bonded mother substrate 90 across the entirety of the first and second main scribing lines MS13 and MS14, and a pair of the panel substrates 90a are obtained.

Before the substrate is cut into the pair of the panel substrates 90a at this point, an area of the bonded mother substrate 90 which has not been cut is referred to a second substrate portion 90c.

Next, as shown in FIG. 26(b), on the second substrate portion 90c cut by the second main scribing line MS14, the cutter wheels 62a are pressed and rolled along the third and fourth lines to be cut D3 and D4 on the bonded mother substrate 90 along the vertical direction, and third and fourth main scribing lines MS15 and MS16 are formed by vertical cracks extended to 90% or more of the thicknesses of the mother substrates 91 and 92 from the surfaces of the mother substrates 91 and 92 of the bonded mother substrate 90. Thereafter, in the area between the third and fourth main scribing lines MS15 and MS16, ninth main scribing line MS21 and fifth supplementary scribing line SS21 along ninth line to be cut D9 along the vertical direction, tenth main scribing line MS22 and tenth supplementary scribing line SS22 along the tenth line to be cut D10, eleventh main scribing line MS23 and eleventh supplementary scribing line SS23 along the eleventh line to be cut D11, and twelfth main scribing line MS24 and twelfth supplementary scribing line SS24 along the twelfth line to be cut D12 are sequentially formed outside the panel substrates 90a so as to cross the third and fourth main scribing lines MS15 and MS16. Thus, the second substrate portion 90c is cut, and a pair of panel substrates 90a is cut.

Figure 27:
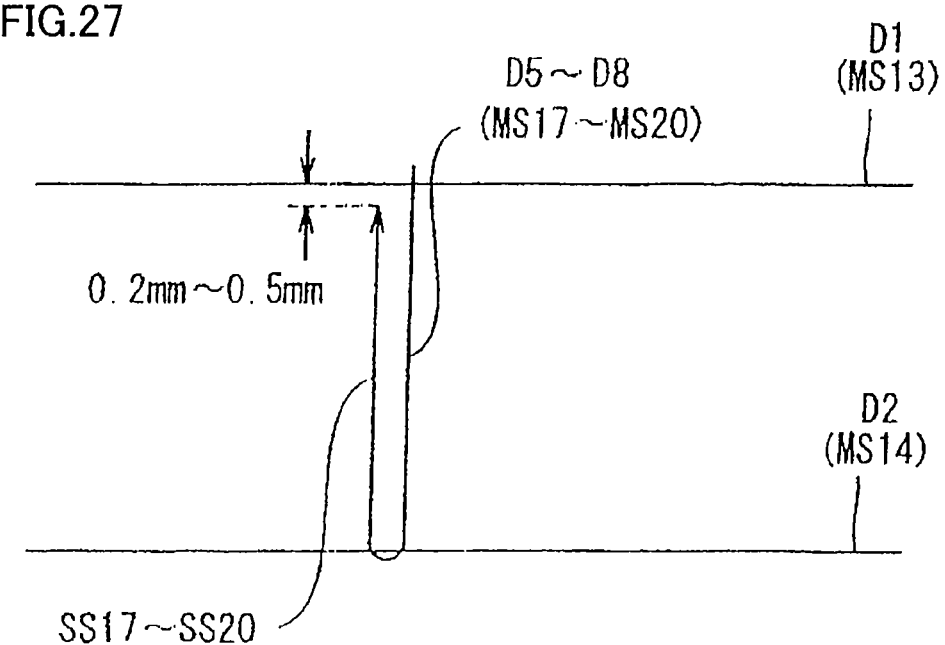
FIG. 27 is a plan view of the substrate showing a scribing pattern of the substrate for explaining yet another example of the substrate cutting method according to the present invention.

It is not necessary that the fifth to twelfth supplementary scribing lines SS21 to SS24 cross the first and third main scribing lines MS13 and MS15. For example, as shown in FIG. 27, positions in front of the first and third main scribing lines MS13 and MS15 by about 0.2 to 0.5 mm may be end portions of the fifth to twelfth supplementary scribing lines SS17 to SS24. In such a case, vertical cracks forming the fifth to twelfth supplementary scribing lines SS17 to SS24 also extend in the scribing direction. The fifth to twelfth main scribing lines MS17 to MS24 are cut across the entirety of the main scribing lines MS17 to MS24.

Figure 28:
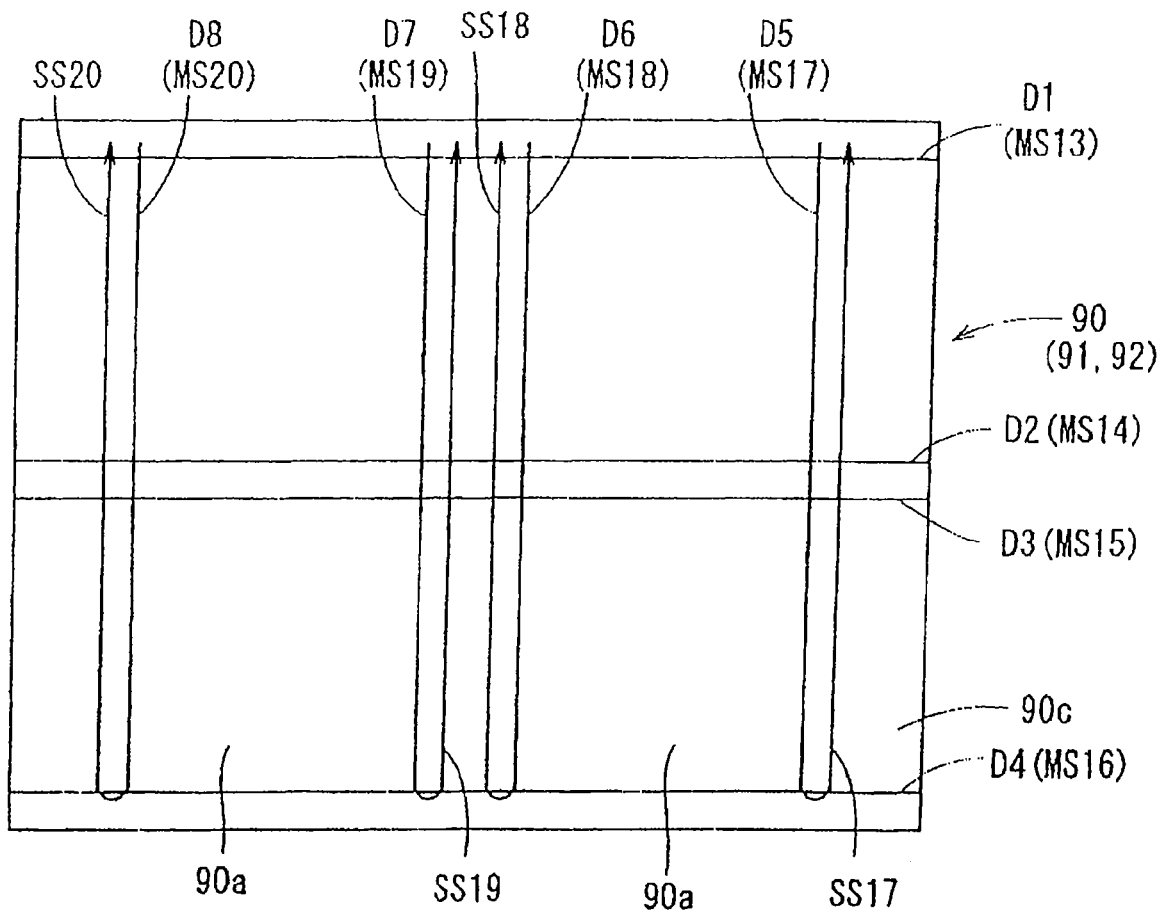
FIG. 28 is a partial plan view of the substrate showing a scribing pattern of the substrate for explaining yet another example of the substrate cutting method according to the present invention.

In the case where the scribing lines are formed to cross each other for cutting the substrate as described above, as shown in FIG. 28, first, the main scribing lines MS13 to MS16 are formed on the mother substrate 90 along the first to fourth lines to be cut D1 to D4, and then, the fifth main scribing line MS17 and the fifth supplementary scribing line SS17, the sixth main scribing line MS18 and the sixth supplementary scribing line SS18, the seventh main scribing line MS19 and the seventh supplementary scribing line SS19, and the eighth main scribing line MS20 and the eighth supplementary scribing line SS20 are formed to respectively cross the first main scribing line MS13 and fourth main scribing line MS16 such that the main scribing lines and the supplementary scribing lines are formed continuously with one scribing by inverting the line by 180 degrees after they cross over the fourth main scribing line MS16.

Figure 29:
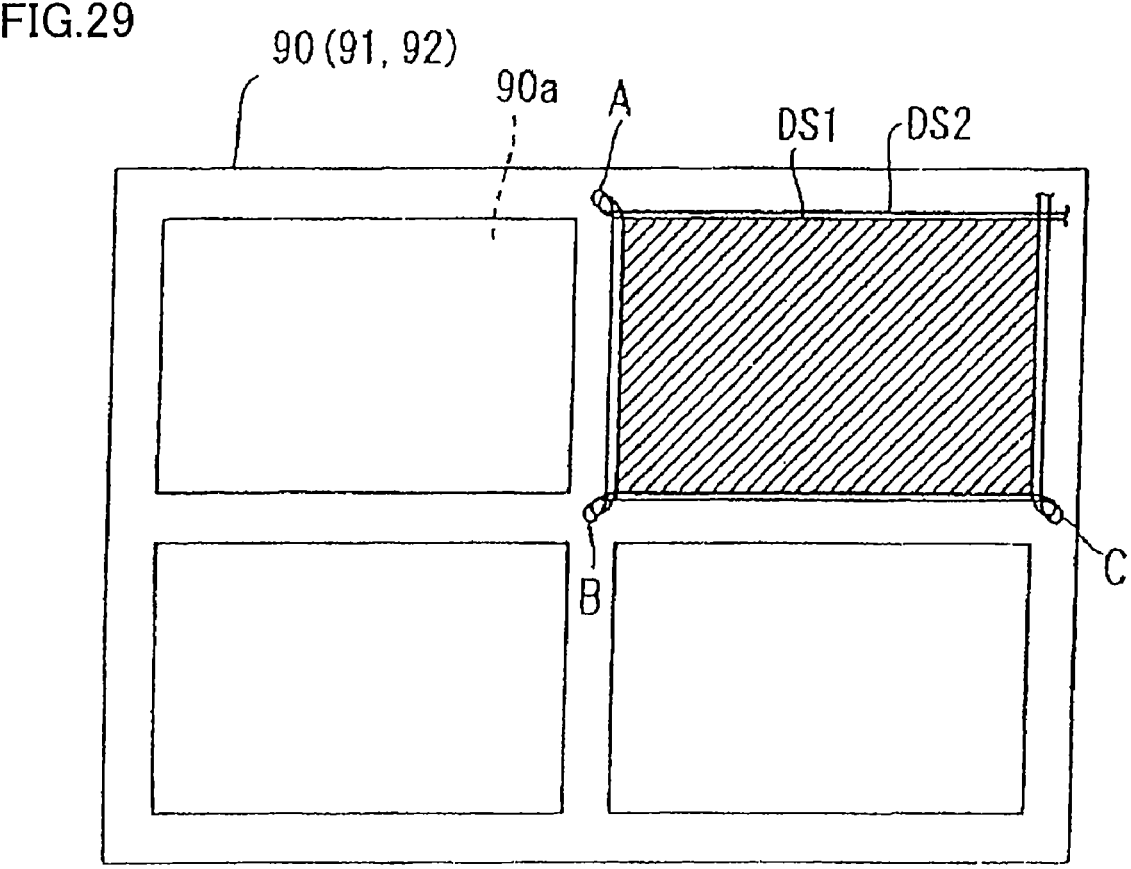
FIG. 29 is a plan view of the substrate showing a scribing pattern of the substrate for explaining yet another example of the substrate cutting method according to the present invention.

FIG. 29 is a schematic plan view for illustrating a scribing pattern for cutting the display panels 90a out of the bonded mother substrate 90 by using double scribing lines of main scribing lines MS and supplementary scribing lines SS. First, with the scribing method shown in FIG. 18, four scribing lines along lines to be scribed S1 to S4 with respect to the panel substrates 90a (hereinafter, four linear scribing lines across the entire circumferences of the panel substrates 90a will be referred to as main scribing line DS1) are formed. Then, outside the panel substrates 90a with respect to the main scribing line DS1, four linear sub-scribing line DS2 in parallel to the main scribing line DS1 spaced apart from the main scribing line DS1 by about 0.5 to 1 mm.

As described above, when the sub-scribing line DS2 is formed with a space of about 0.5 to 1 mm apart from the main scribing line DS1, a stress applied to a horizontal direction which is orthogonal to the formation direction of the scribing lines on a surface of the bonded mother substrate 90 when the sub-scribing line DS2 is formed. Thus, a compression force is applied to surface portions of the vertical cracks which form the main scribing line DS1 which has been already formed. When the compression force is applied to the surface portion of the vertical cracks forming the main scribing line DS1 as such, a reaction force is applied in a direction to widen the width of the vertical cracks forming the main scribing line DS1. In this way, the vertical cracks extend in the thickness direction of the bonded mother substrate 90 and the vertical cracks reach the bonded surface of the mother substrates 91 and 92 of the bonded mother substrate.

Figure 30:
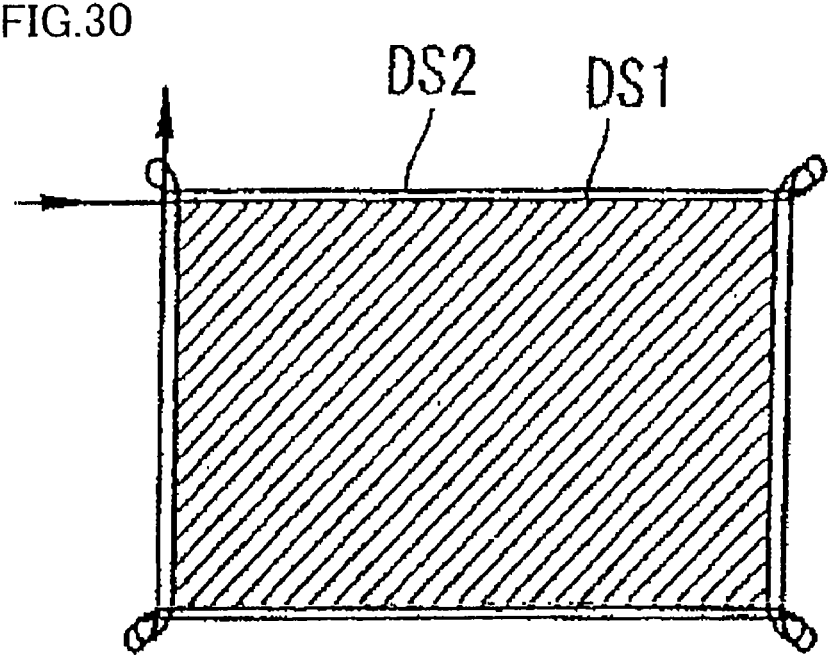
FIG. 30 is a plan view for explaining yet another example of the substrate cutting method according to the present invention.

In this case, as shown in FIG. 30, sub-scribing line DS2 may be formed continuously after the main scribing line DS1 without separating the cutter wheels 62a from the front and back surfaces of the bonded mother substrate 90 after the main scribing line DS1 is formed.

Figure 31:
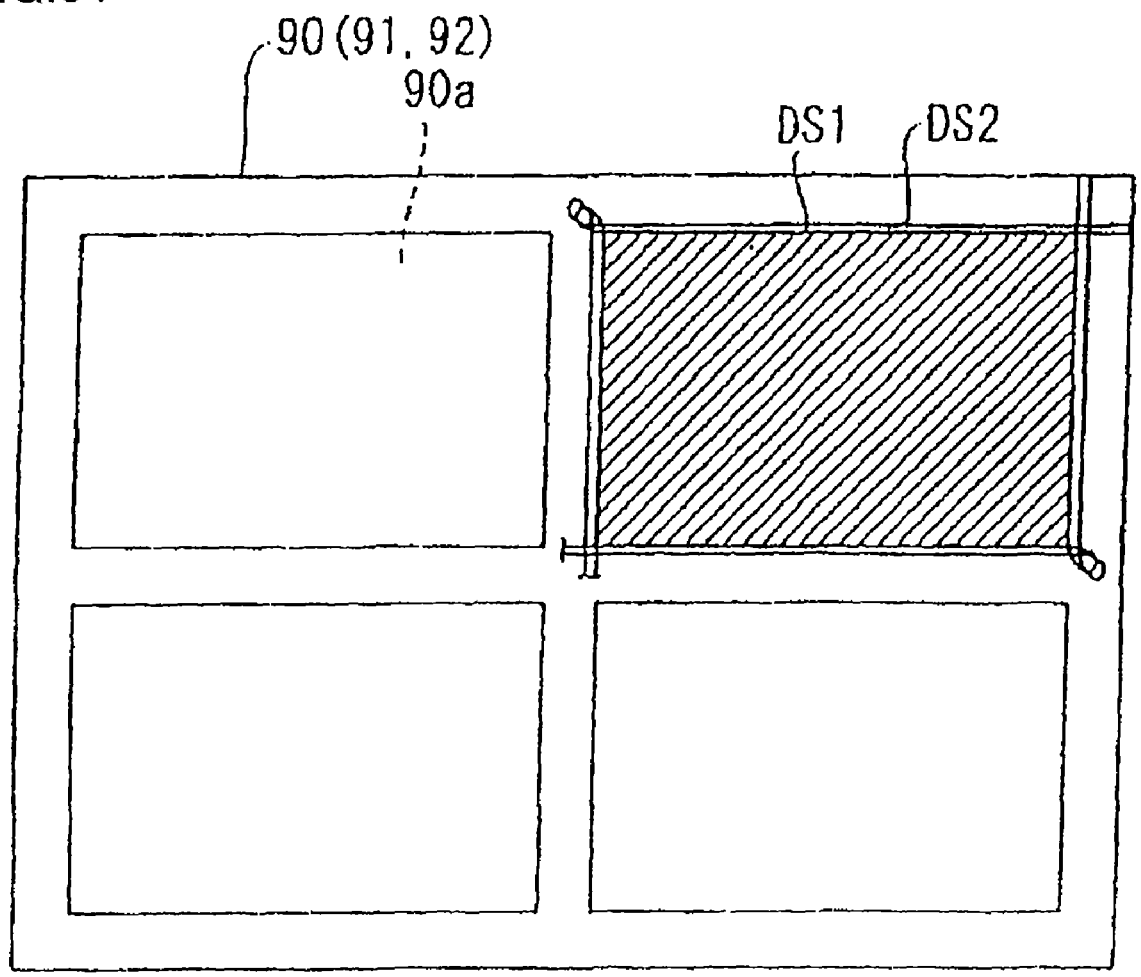
FIG. 31 is a plan view of the substrate showing a scribing pattern of the substrate for explaining yet another example of the substrate cutting method according to the present invention.

Furthermore, as shown in FIG. 19, when scribing lines are first formed along lines to be scribed S1 and S2, and then scribing lines are continuously formed along lines to be scribed S4 and S2, as shown in FIG. 31, the sub-scribing line DS2 may be formed after the main scribing line DS1 is formed.

Further, as a method for cutting the substrate, a method in which double scribing lines are formed on the bonded mother substrates where the glass substrates, which is a type of brittle material substrate, are bonded as mother substrates has been described. However, the present invention is not limited to this. When the substrate is a metal substrate such as steel sheet, wood plate, a plastic substrate, and a brittle material substrate such as ceramics substrate, glass substrate, semi-conductor substrate or the like, a method for cutting the substrate by using, for example, laser light, a dicing saw, a diamond-studded blade cutter, or the like can be used.

Furthermore, the substrates include, besides mother substrate, a bonded substrate formed by bonding the same type of mother substrates, a bonded mother substrate for which different types of mother substrates are bonded, and a substrate for which a pair of mother substrates is stacked on each other.

Embodiment 2

Figure 32:
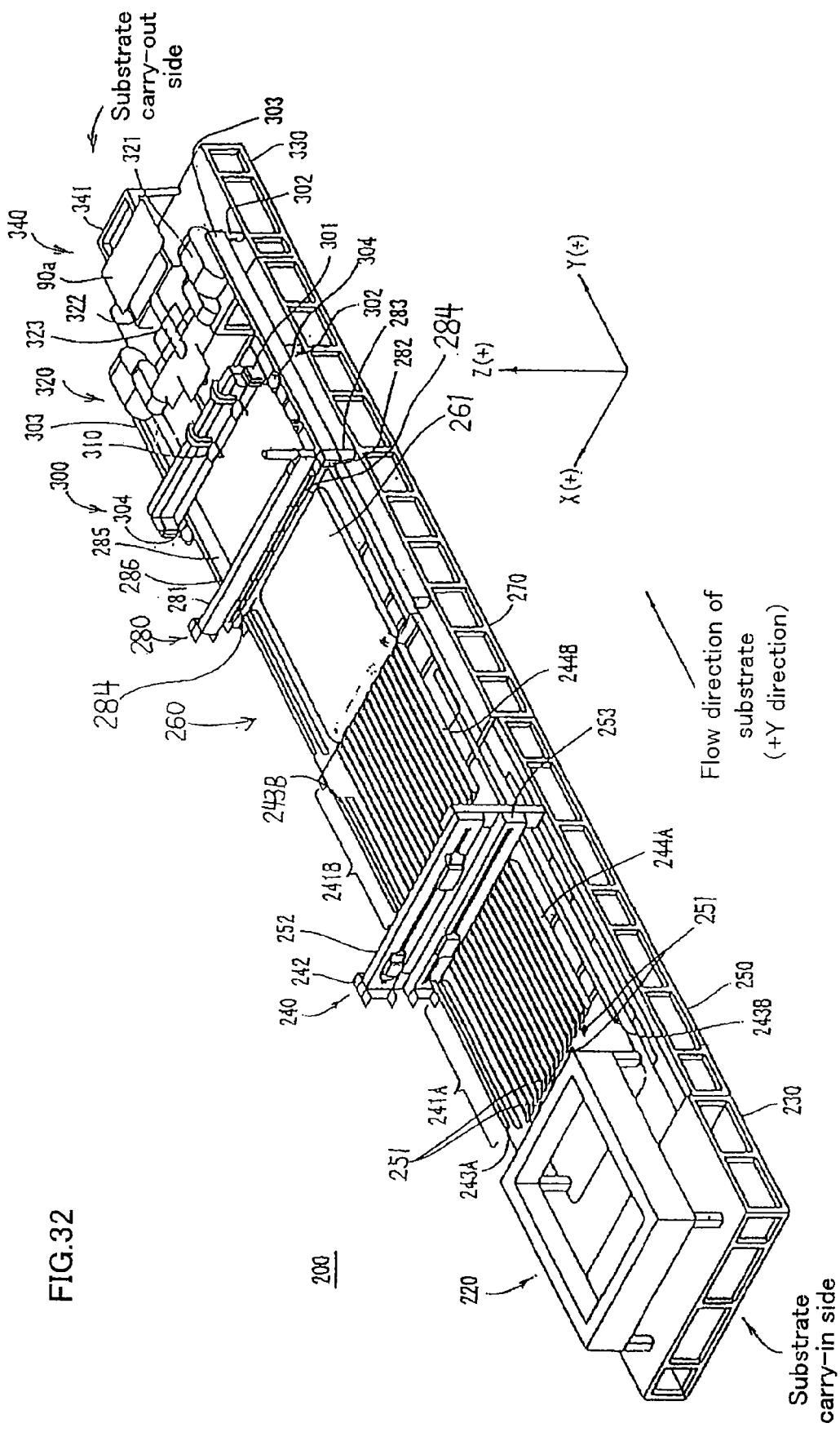
FIG. 32 is a perspective view schematically showing an example of an entire substrate cutting system according to Embodiment 2 of the present invention in whole.
Figure 33:
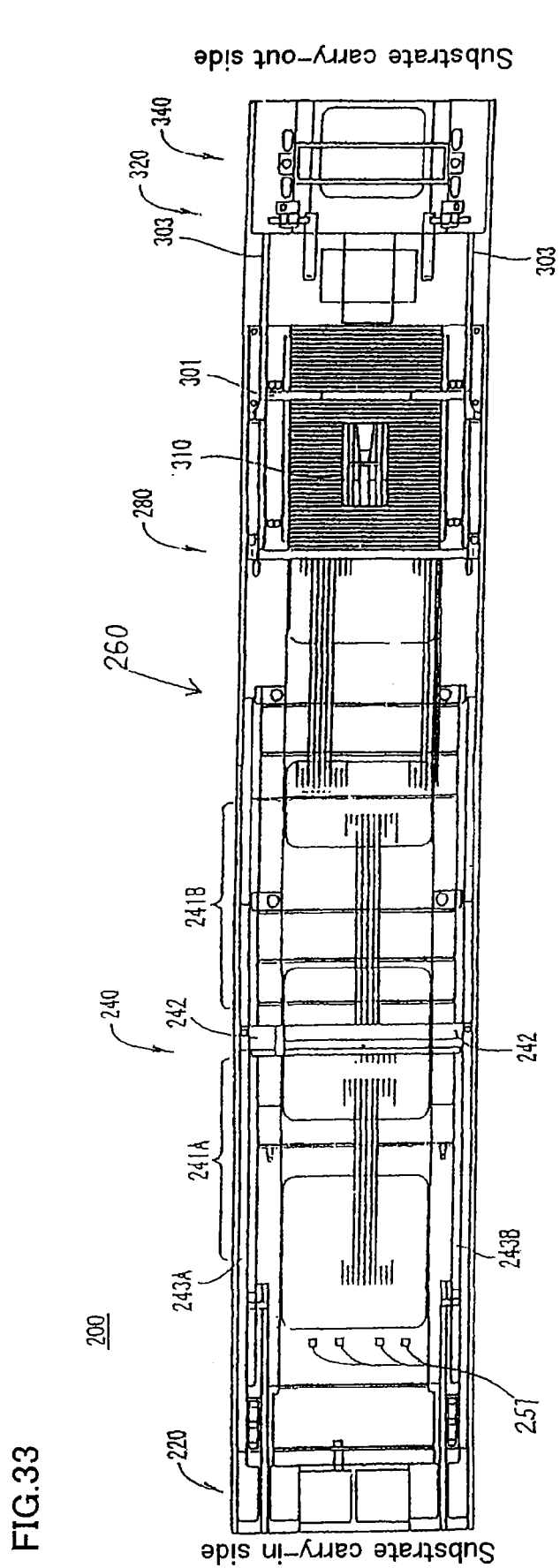
FIG. 33 is a plan view schematically showing the substrate cutting system.
Figure 34:
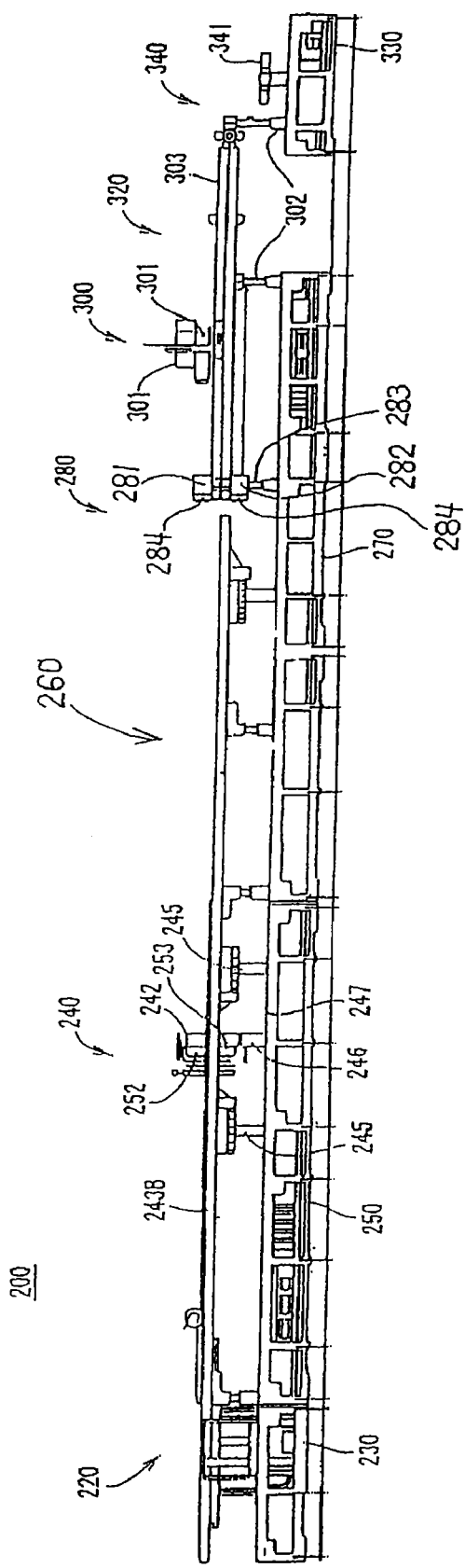
FIG. 34 is a side view schematically showing the substrate cutting system.

FIG. 32 is a schematic perspective view showing an example of another embodiment of the entire substrate cutting system according to the present invention. FIG. 33 is a plan view of the substrate cutting system. FIG. 34 is a side view of the substrate cutting system. In the present invention, the term "substrate" includes a single plate, such as a mother substrate cut into a plurality of substrates, a metal substrate (e.g., a steel plate), a wood plate, a plastic plate and a brittle material substrate (e.g., a ceramic substrate, a semiconductor substrate and a glass substrate). However, the substrate according to the present invention is not limited to such a single plate. Furthermore, the substrate according to the present invention includes a bonded substrate for which a pair of substrates is bonded to each other and a stacked substrate for which a pair of substrates is stacked on each other.

In the substrate cutting system in the present invention, for example, when a panel substrate (bonded substrate for display panel) for a liquid crystal device is manufactured from a pair of glass substrates bonded to each other, a plurality of panel substrates (bonded substrate for display panel) are cut, by the substrate cutting system according to the present invention, from the bonded mother substrate 90 for which a pair of mother glass substrates is bonded to each other.

The substrate cutting system 200 according to Embodiment 2 includes a positioning unit section 220, a scribing unit section 240, a buffer conveyor section 260, a steam break unit section 280, a substrate transportation unit section 300, a panel inversion unit section 320 and a panel terminal separation section 340.

In a substrate cutting system 200 according to Embodiment 2 of the present invention, description will be made by referring to the side where a positioning unit section 220 is arranged as a "substrate carry-in side" and to the side where a panel terminal separation section 340 is arranged as a "substrate carry-out side", respectively. In the substrate cutting system 200 according to the present invention, the direction in which a substrate is transported (flow direction of the substrate) is +Y direction from the substrate carry-in side to the substrate carry-out side. The direction in which the substrate is transported is a direction perpendicular to a cutting device guide body 242 of the scribing unit section 240 in a horizontal state. The cutting device guide body 242 is provided along the X direction.

A case in which a bonded mother substrate 90 used as a substrate is cut will be described as an example. The bonded mother substrate 90 is carried in the positioning unit section 220 by a transportation device (not shown), which is used for the previous step. Thereafter, the positioning unit section 220 positions the bonded mother substrate 90 on belts 221e provided on a plurality of substrate supporting units 221.

Figure 35:
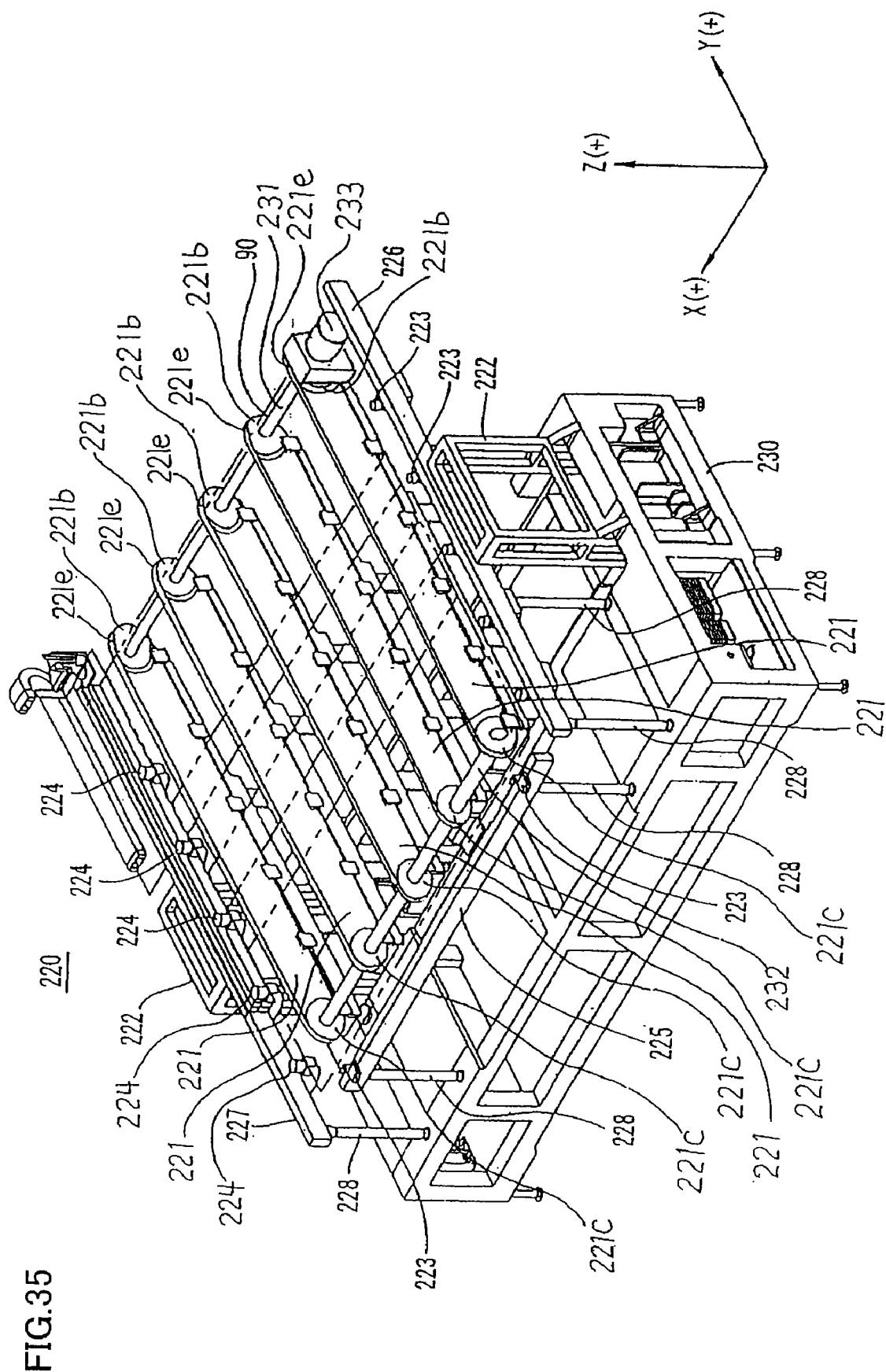
FIG. 35 is a perspective view schematically showing a positioning unit section of the substrate cutting system according to Embodiment 2 of the present invention.

As shown in FIG. 35, the positioning unit section 220 includes a guide bar 226 and a guide bar 227 above a mounting base 230. The guide bar 226 extends along one side edge of the mounting base 230 along a Y direction via a pillar 228. The guide bar 227 extends along one side edge of the mounting base 230 in parallel to the guide bar 226. The positioning unit section 220 includes a guide bar 225 above the mounting base 230 between the guide bar 226 and the guide bar 227 on the substrate carry-in side of the mounting base 230. The guide bar 225 extends along an X direction via the pillar 228.

A plurality of reference rollers 223 are provided on the guide bar 225 and the guide bar 226, respectively, the plurality of reference rollers 223 are used as a reference when the bonded mother substrate 90 is positioned. The guide bar 227 includes a plurality of pushers 224. The plurality of pushers 224 push the bonded mother substrate 90 toward the reference rollers 223 provided on the guide bar 226 when the bonded mother substrate 90 is positioned.

Above the mounting base 230, a plurality of substrate supporting bases 221 is provided, along the Y direction, between the guide bar 226 and the guide bar 227 with a predetermined interval. The substrate supporting bases 221 are held by an up-and-down moving device 222 provided on the top surface of the guide bar 226 side of the mounting base 230 and an up-and-down moving device 222 provided on the top surface of the guide bar 227 side of the mounting base 230.

Each of the substrate supporting units 221 includes a belt 221e which circles along the Y direction, a driving pulley 221b and a coupled driving pulley 221c. The driving pulleys 221b each are connected to a driving axis 231. The driving axis 231 is connected to the rotation axis of a motor 233 via a coupling (not shown). The motor 233 is driven due to an instruction from a control section (not shown) for controlling the substrate cutting system 200 according to the present invention. The driving axis 231 rotates at a predetermined speed clockwise and anticlockwise. The rotating speed of the driving axis 231 varies depending on the instruction from the control section. When the driving axis 231 rotates at the predetermined speed, the driving pulley 221*b* of each of the substrate supporting bases 221 rotates. Thus, the belt 221*e* circles along the Y direction. The coupled driving pulleys 221*c* each are rotatably held to a coupled driving axis 232 and rotated in accordance with the circling of the belts 221*e*.

The bonded mother substrate 90 positioned by the positioning unit section 220 is transported to a predetermined position of the first substrate supporting section 241A of the scribing unit section 240 when the belt 221*e* of each of the substrate supporting units 221 of the positioning unit section 220 and the timing belt of each of the plurality of the first substrate supporting units 244A of the first substrate supporting section 241A of the scribing unit section 240 are synchronized and circled at the same circling speed in the substrate carry-out direction. Concurrently, the clamp devices 251 of the scribing unit section 240 are lowered to a predetermined position such that the bonded mother substrate 90 moves to the scribing unit section, the predetermined position being below the timing belts of the plurality of the first substrate supporting units 244A of the first substrate supporting section 241A.

The scribing unit section 240 has a similar structure to the substrate cutting system 1 in Embodiment 1 except that the substrate carry-out device 80 and the steam unit section 160 are removed from the substrate cutting system in Embodiment 1.

The cutting device guide body 242 of the scribing unit section 240 is fixed so as to be located above the mounting base 250 along a direction perpendicular to the Y direction in a horizontal state. The first substrate supporting section 241A and the second substrate supporting section 241B are fixed to the mounting base 250 via two pillars 246, respectively, so as to be located on both sides of the cutting device guide body 242 with respect to the cutting device guide body 242.

The first substrate supporting section 241A and the second substrate supporting section 241B includes the plurality of substrate supporting units 244A and the plurality of second substrate supporting units 244B, respectively. Each of the plurality of first substrate supporting units 244A and each of the plurality of second substrate supporting units 244B are structured so as to be linear along a direction (Y direction) parallel to a frame 243A and a frame 243B, respectively.

The first substrate supporting section 241A includes the plurality of first substrate supporting units 244A. Each of the first substrate supporting units 244A is held by a holding plate 245. The holding plates 245 are attached to the top surface of the mounting base 250. The first substrate supporting units 244A are arranged above the mounting base 250.

Each one of the first substrate supporting units 244A provided on the first substrate supporting section 241A is similar to the first substrate supporting unit 21A shown in FIG. 6 according to Embodiment 1. The timing belt of each of the first substrate supporting units 244A is circled when the motor included in the first substrate supporting section 241A rotates about the rotation axis.

The plurality of first substrate supporting units 244A is arranged with a predetermined interval therebetween. The timing belt included in each of the first substrate supporting units 244A is circled clockwise or anti-clockwise at a predetermined circling speed when a control section (not shown) for controlling the substrate cutting system 200 according to the present invention instructs and controls the rotation speed and the rotation direction of the rotation axis of the motor. The circling speed of the timing belt varies.

The second substrate supporting section 241B includes the plurality of second substrate supporting units 244B. The structure of the second substrate supporting unit 244B is similar to that of the first substrate supporting unit 244A. The second substrate supporting units 244B are held by the holding plates 245 such that the first substrate supporting units 244A and the second substrate supporting units 244B are attached on opposite sides with respect to the cutting device guide body 242 and attached in the opposite direction with respect to the Y direction. The holding plates 245 are attached to the top surface of the mounting base 250. The second substrate supporting units 244B are arranged above the mounting base 250.

Above the mounting base 250, clamp devices 251 are provided for clamping the bonded mother substrate 90 supported on the first substrate supporting section 241A. For example, as shown in FIG. 32, the clamp devices 251 are arranged with a predetermined interval therebetween along a direction perpendicular to the frame 243B in order to clamp the side edge of the bonded mother substrate 90 on the substrate carry-in side.

The structure of each clamp device 251 is similar to that of the clamp device 50 shown in FIG. 2 according to Embodiment 1. Each of the clamp devices 251 includes a clamp member 51 for clamping a side edge of the bonded mother substrate 90. The clamp members 51 are attached to holding members 58 joined to rods 56 of cylinders 55, which are attached to the movement base 57, and are moved upward and downward due to the driving of the cylinders 55.

When the bonded mother substrate 90 is transported from the positioning unit section 220 to the scribing unit section 240, the clamp members 51 of the clamp devices 251 are lowered to a predetermined position due to the cylinders 55, the predetermined position being below the timing belts of the plurality of first substrate supporting units 244A of the first substrate supporting section 241A.

Each of the clamp devices 251 is slid along the Y direction, by a movement mechanism similar to that according to Embodiment 1, between two first substrate supporting units 244A of the plurality of first substrate supporting units 244A which are arranged with a predetermined interval therebetween, each of the two first substrate supporting units 244A being arranged on either side of the remaining plurality of first substrate supporting units 244A.

The operation of the clamp member of each of the clamp devices members 251 is as described with reference to FIGS. 10 and 11 according to Embodiment 1, and thus, the description thereof is omitted herein.

The arrangement of the clamp devices 251 is not limited to a case when the clamp devices 251 for holding the bonded mother substrate 90 are provided on the frame 243B and on the substrate carry-in side in a direction perpendicular to the frame 243B. However, even when the clamp devices 251 are only provided on the frame 243B, the bonded mother substrate 90 is held without sustaining any damage.

The clamp device 251 described above only shows one example used in a substrate cutting system according to the present invention. Thus, the clamp devices 251 are not limited to these. In other words, a clamp device can be arbitrary, as long as the clamp device has a structure for gripping or holding the side edge of the bonded mother substrate 90. For example, when the size of the substrate is small, the substrate is held by clamping one part of the side edge of the substrate, thereby the substrate being cut without causing any defect to the substrate.

An upper substrate cutting device 60 in Embodiment 1 shown in FIG. 3 is attached to the upper guide rail 252 of the cutting device guide body 242. A lower substrate cutting device 70 is attached to the lower guide rail 253, the lower substrate cutting device 70 having a similar structure to the upper substrate cutting device 60 in Embodiment 1 shown in FIG. 4 and being in a state of inversion to the upper substrate cutting device 60 in a vertical direction. The upper substrate cutting device 60 and the lower substrate cutting device 70 slide along the upper guide rail 252 and the lower guide rail 253, respectively, due to linear motors.

For example, in the upper substrate cutting device 60 and the lower substrate cutting device 70, cutter wheels 62a for scribing a bonded mother substrate 90 are rotatably attached to tip holders 62b, respectively, the cutter wheels being similar to those shown in Embodiment 1 in FIGS. 3 and 4. Furthermore, the tip holders 62b are rotatably attached to respective cutter heads 62c with a direction vertical to top and bottom surfaces of the bonded mother substrate 90 held by the clamp devices 251 at its axis. The cutter heads 62c are movable along a direction vertical to top and bottom surfaces of the bonded mother substrate 90 by a driving means (not shown). A load is applied to the cutter wheels 62a, as appropriate, by an energizing means (not shown).

As the cutter wheel 62a held by the tip holder 62b, a cutter wheel which has a blade edge with the center in the width direction protruded in an obtuse V shape is used as disclosed in Japanese Laid-Open Publication No. 9-188534. The protrusions with a predetermined height are formed on the blade edge with a predetermined pitch in the circumferential direction.

The lower substrate cutting device 70 provided on the lower side guide rail 253 has a structure similar to the upper substrate cutting device 60, but is provided in an inverted state thereto. The cutter wheel 62a (see FIG. 4) of the lower substrate cutting device 70 is arranged so as to face the cutter wheel 62a of the upper substrate cutting device 60.

The cutter wheel 62a of the upper substrate cutting device 60 is pressed so as to make contact onto the top surface of the bonded mother substrate 90 by the aforementioned energizing means and the moving means of the cutter head 62c. The cutter wheel 62a of the lower substrate cutting device 70 is pressed so as to make contact onto the bottom surface of the bonded mother substrate 90 by the aforementioned energizing means and the moving means of the cutter head 62c. When the upper substrate cutting device 60 and the lower substrate cutting device 70 are simultaneously moved in the same direction, the bonded mother substrate 90 is cut.

It is preferred that the cutter wheel 62a is rotatably supported by the cutter head 65 using the servo motor disclosed in WO 03/011777.

FIG. 12 shows a side view of the cutter head 65 and FIG. 13 shows a front view of the important constituents thereof as one example of the cutter head 65 using the servo motor. The servo motor 65b is supported in an inverted manner between a pair of side walls 65a. A holder holding member 65c is provided below the pair of side walls 65a so as to be rotatable via a supporting axis 65d, the holder holding member 65c having an L shape when viewed from the side. A tip holder 62b is attached in front (on the right-hand side in FIG. 13) of the holder holding member 65c. The tip holder 62b is attached to rotatably support the cutter wheel 62a via an axis 65e. Flat bevel gears 65f are mounted on the rotation axis of the servo motor 65b and the supporting axis 65d so as to engage with each other. Thus, the holder holding member 65c performs an upwards and downwards tilt operation with the supporting axis 65d as its supporting point and the cutter wheel 62a moves upwards and downwards due to the forward and reverse rotation of the servo motor 65b. The cutter heads 65 themselves are provided on the upper substrate cutting device 60 and the lower substrate cutting device 70.

FIG. 14 is a front view showing another example of cutter head using a servo motor. The rotation axis of the servo motor 65b is directly connected to the holder member 65c.

The cutter heads shown in FIGS. 12 and 14 move the cutter wheels 62a upwards and downwards by rotating the servo motors using the position control so as to position the cutter wheel 62a. The cutter heads transmit the scribing pressure for the brittle material substrate to the cutter wheel 62a by controlling the rotation torque. The rotation torque acts to return the cutter wheel 62a to the set position when the position of the cutter wheel 62a is shifted from the positions previously set in the servo motors 65b during the scribing operation for forming a scribing line on the bonded mother substrate 90 by moving the cutter heads in a horizontal direction. In other words, the servo motor 65b controls the position in the perpendicular direction of the cutter wheel 62a, and at the same time, the servo motor 65b is an energizing means for the cutter wheel 62a.

By using the cutter head including the aforementioned servo motor, when the bonded mother substrate 90 is being scribed, the rotation torque of the servo motor is corrected immediately in response to the change of the scribing pressure by the change in resistive force received by the cutter wheel 62a. Thus, scribing is stably performed and a scribing line with excellent quality can be formed.

A cutter head is effectively applied to cutting the mother substrate in the substrate cutting system according to the present invention. The cutter head includes a mechanism for vibrating a scribing cutter (e.g., a diamond point cutter or a cutter wheel) which scribes the bonded mother substrate 90 so as to periodically change the pressure force of the scribing cutter on the bonded mother substrate 90.

The structure of the upper substrate cutting device 60 and the lower substrate cutting device 70 is not limited to the aforementioned structure. In other words, any structure can be used, as long as the device has a structure for processing the top and bottom surfaces of the substrate so as to cut the substrate.

For example, the upper substrate cutting device 60 and the lower substrate cutting device 70 can be a device which cuts the mother substrate by using such as a laser light, a dicing saw, a cutting saw or a diamond-studded blade cutter. When the mother substrate is made of a metal substrate (e.g., a steel plate), a wood plate, a plastic substrate or a brittle material substrate (e.g., a ceramic substrate, glass substrate or semiconductor substrate), a substrate cutting device for cutting the mother substrate by using, for example, a laser light, a dicing saw, a cutting saw, or a diamond-studded blade cutter is used.

Furthermore, when a bonded mother substrate for which a pair of mother substrate is bonded to each other, a bonded mother substrate for which different types of mother substrates are bonded to each other or a stacked substrate for which a plurality of mother substrates are stacked on each other is cut, a substrate cutting device similar to the one used for cutting the aforementioned mother substrate can be used.

The upper substrate cutting device 60 and the lower substrate cutting device 70 may include a cutting assistance means for assisting the cutting of the substrate. As a cutting assistance means, for example, a means for pressing (e.g., a roller on the substrate), a means for spraying compressed air onto the substrate, a means for irradiating a laser onto the substrate or a means for warming (heating) the substrate by spraying such as heated air onto the substrate is used.

Furthermore, in the description above, the upper substrate cutting device 60 and the lower substrate cutting device 70 have the same structure. However, the upper substrate cutting device 60 and the lower substrate cutting device 70 can have structures different from each other, depending on the cutter pattern of the substrate or the cutting condition of the substrate.

The buffer conveyor section 260 transports the processed bonded mother substrate 90 to the steam break unit section 280, the bonded mother substrate 90 being mounted on the plurality of second substrate supporting units 244B of the second substrate supporting section 241B after the bonded mother substrate 90 is scribed by the upper substrate cutting device 60 and the lower substrate cutting device 70 of the cutting device guide body 242 of the scribing unit section 240 and the clamping (holding) of the bonded mother substrate 90 by the clamp devices 251 are released.

The buffer conveyor section 260 has a similar structure to that of the first substrate supporting section 241A of the scribing unit section 240. Alternatively, the buffer conveyor section 260, which is a flat-belt made of woven cloth, metal or rubber, is structured so as to be circle along the Y direction due to the motor driven by the control section in the substrate cutting system 200 according to the present invention (flat belt in FIG. 32).

The scribed bonded mother substrate 90 mounted on the timing belts of the plurality of second substrate supporting units 244B of the second substrate support section 241B is transported onto a belt 261 of the buffer conveyor section 260 when the timing belt of each of the plurality of second substrate supporting units 244B of the second substrate supporting section 241B of the scribing unit section 240 and the belt 261 of the buffer conveyor section 260 are synchronized and circled at the same circling speed in the substrate carry-out direction.

The scribed bonded mother substrate 90 transported onto the belt 261 of the buffer conveyor section 260 is transported to a steam break unit section 280 when the belt 261 of the buffer conveyor section 260 and a belt of a belt conveyor 285, which is provided on the substrate carry-out side of the steam break unit section 280, are synchronized and circled at the same circling speed in the substrate carry-out direction.

The steam break unit section 280 has a structure similar to the steam unit section 160 in Embodiment 1 shown in FIG. 8 except that the steam break unit section 280 does not move along the Y direction and is fixed.

In the steam break unit section 280, an upper steam unit attachment bar 281 and a lower steam unit attachment bar 282 are attached to pillars 283, respectively, along the X direction, parallel to the cutting device guide body 242. The upper steam unit attachment bar 281 attaches a plurality of steam units 284 for spraying steam onto the mother substrate 91 on the upper side of the bonded mother substrate 90. The lower steam unit attachment bar 282 attaches a plurality of steam units 284 for spraying steam onto the mother substrate 92 on the lower side of the bonded mother substrate 90.

Each pillar 283 on the respective frame 243A and 243B sides of the scribing unit section 240 is joined to the upper surface of the mounting base 270, respectively. A belt conveyor 285 is provided on the substrate carry-out side of the steam break unit section 280 after the steam is sprayed onto top and bottom surfaces of the bonded mother substrate 90 from the steam unit 284. The belt conveyor is provided with, for example, a sheet belt which circles, and supports and transports the completely cut bonded mother substrate 90.

The circling speed of the belt conveyor 285 provided on the substrate carry-out side of the steam break unit section 280 is set at approximately the same circling speed of the buffer conveyor section 260 and moves in synchronization therewith.

The steam break unit section 280 has a structure similar to the steam unit section 160 in Embodiment 1 shown in FIG. 8. A plurality of steam units 284 is attached to the upper steam unit attachment bar 281. The plurality of steam units 284 is attached to the lower steam unit attachment bar 282 with a gap GA with respect to the plurality of steam units 284 on the upper side. The gap GA is adjusted such that the bonded mother substrate 90 passes through the gap GA.

The structure of the steam unit 284 is similar to that of the steam unit section 160 in Embodiment 1 shown in FIG. 9. The steam unit 284 is almost entirely constructed by an aluminum material. A plurality of heaters 161a is embedded in the steam unit 284 in a perpendicular direction. When an open/close valve, which automatically opens and closes, is opened, water flows into the steam unit 284 from a water supplying opening 161b. The water is heated by the heater 161a and the supplied water vaporizes into steam. The steam is sprayed toward the surface of the mother substrate from a gushing opening 161d through a duct hole 161c.

An air knife 286 is provided on the carry-out side of the upper steam unit attachment bar 281. The air knife 286 is provided for removing the moisture that remains on the surface of the mother substrate 90 after the steam is sprayed onto the upper surface of the mother substrate 90.

A steam unit 284 and the air knife 286 similar to those attached to the upper steam unit attachment bar 281 are provided in the lower steam unit attachment bar 282.

After the scribed bonded mother substrate 90 mounted on the second substrate supporting units is transported onto the belt 261 of the buffer conveyor section 260, the belt 261 of the buffer conveyor section 260 and the belt of the belt conveyor 285, which is provided on the substrate carry-out side of the steam break unit section 280, are synchronized and circled at the same circling speed in the substrate carry-out direction. Thus, the scribed bonded mother substrate 90 passes through the steam break unit section 280 and is cut into panel substrates 90a and the panel substrates 90a are suspended on the belt conveyor 285.

The substrate transportation unit section 300 lifts the panel substrates 90a, which is moving or stopped, supported by the belt conveyor 285, and mounts the panel substrates 90a on a panel supporting section 322 of an inversion transportation robot 321 of a panel inversion unit section 320, when the bonded mother substrate 90 passes through the steam break unit section 280 and is cut.

Above the mounting base 270 and the mounting base 330 of the substrate transportation unit section, a substrate carry-out device guide 301 is constructed. The substrate transportation device guide 301 is capable of moving the transportation robot 310, which transports the panel substrates cut from the bonded mother substrate 90, in the X direction in parallel to the steam break unit section 280 and the cutting device guide body 242, perpendicular to the flow direction of the substrate in the Y direction. In the substrate carry-out unit section 300, along guides 303 on the frame 243A side and on the frame 243B side provided on each respective top surface of the mounting base 270 and the mounting base 330 via pillars 302, both ends of the substrate carry-out device guide 301 slide due to linear motors via respective supporting members 304. In this case of the linear motors, movers (not shown) of the linear motors are inserted in the stators for the linear motors, provided on the respective guides 303. The movers for the linear motors are attached to the supporting members 304.

An adsorption section (not shown) is provided on the carry-out robot 310. The adsorption section adsorbs, by suction, each panel substrate 90a that is cut from the bonded mother substrate 90. While the panel substrate 90a is in a state of being adsorbed by the adsorption section, when the transportation robot 310 is slid to the substrate carry-out side, each panel substrate 90a is mounted on the panel supporting section 322 of the inversion transportation robot 321 in the panel inversion unit section 320.

The structure of the carry-out robot 310 in the substrate transportation unit section 300 is similar to that of the carry-out robot 140 in Embodiment 1 shown in FIG. 5. Thus, the detailed description thereof will be omitted herein. The carry-out robot 310 is attached to the substrate carry-out device guide 301. The carry-out robot 310 is movable by a moving mechanism in a direction (X direction) along the substrate carry-out device guide 301, the moving mechanism combining a driving means due to a linear motor or a servo motor and a straight-line guide.

In the transportation of each of the panel substrates 90a that is cut from the bonded mother substrate 90 by the transportation robot 310, the cut panel substrate 90a is held by the adsorption pads on the carry-out robot 310 due to the suction of a suction mechanism (not shown). After the entire carry-out robot 310 is moved upward by an up-and-down moving mechanism (not shown) once, each of the panel substrates 90a is transported to the inversion transportation robot 321 in the panel inversion unit section 320 for the next step. Thereafter, the carry-out robot 310 is moved downward by the up-and-down moving mechanism (not shown) again and then, each of the panel substrates 90a is mounted on a predetermined position of the panel holding section 322 of the inversion transportation robot 321 in the panel inversion unit section 320 in a predetermined state in the next step.

An inversion panel robot 321 is provided in the panel inversion unit section 320. The inversion panel robot 321 receives the panel substrate 90a from the carry-out robot 310 of the substrate transportation unit section 300, inverts the sides (top and bottom) of the panel substrates 90a and mounts the panel substrate 90a on a separation table 341 of a panel terminal separation section 340.

The panel holding section 322 of the inversion transportation robot 321 includes, for example, a plurality of adsorption pads. The panel holding section 322 is rotatably supported with respect to a robot body section 323 of the inversion transportation robot 321.

Figure 36:
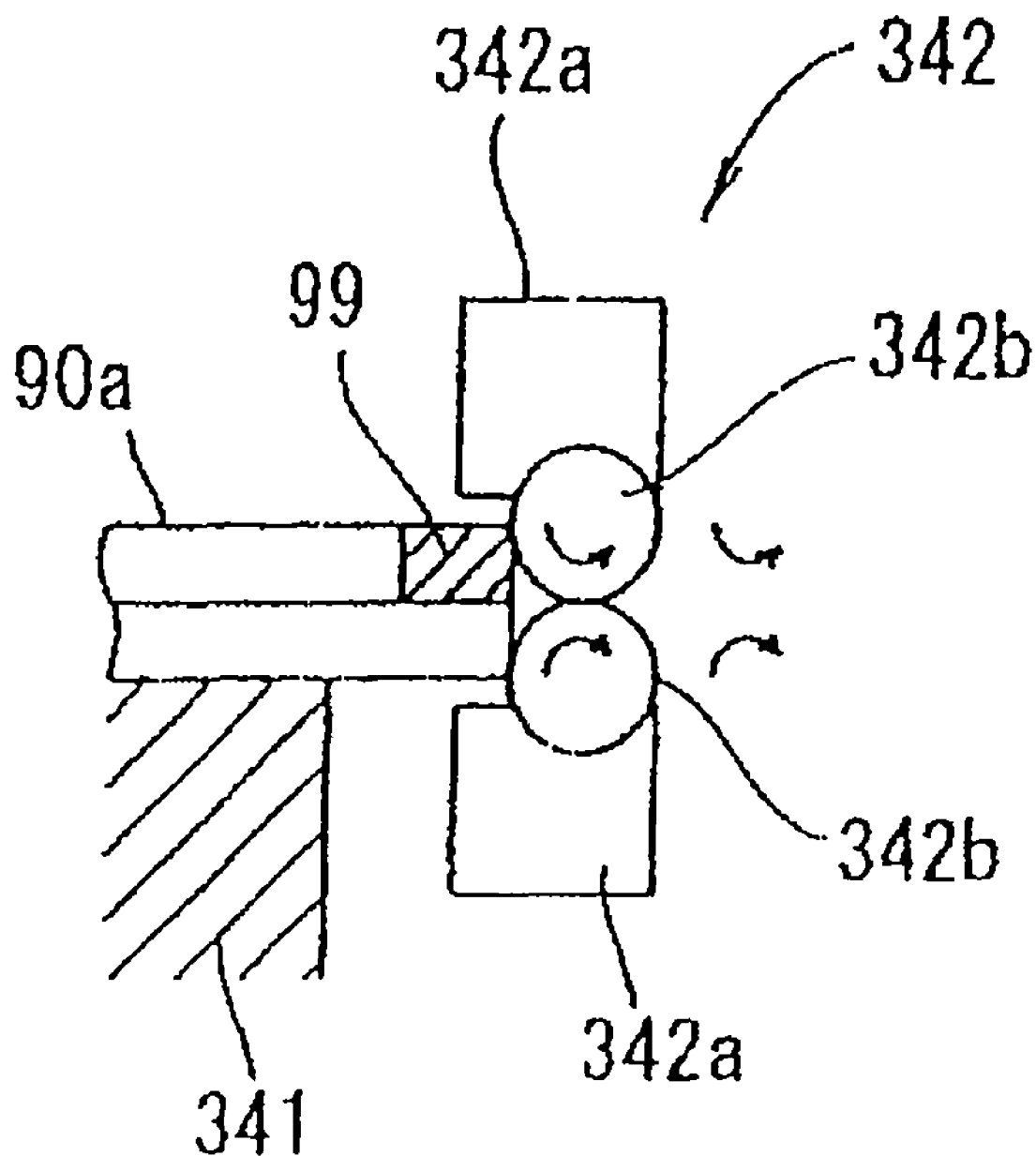
FIG. 36 is a schematic view for explaining a panel terminal separation section of the substrate cutting system according to Embodiment 2 of the present invention.

Referring to the panel substrates 90a mounted, by the inversion transportation robot 321, on the separation table 341 of the panel terminal separation section 340, for example, an undesired portion 99 of the panel substrates 90a is separated from the panel substrate 90a by an undesired portion removal mechanism 342 which is provided in the vicinity of each side edge of the separation table 341, as shown in FIG. 36, whereby the undesired portion removal mechanism 342 is provided by an insertion robot (not shown).

In the undesired portion removal mechanism 342, as shown in FIG. 36, a plurality of removal roller sections 342a is arranged with a predetermined pitch along each side edge of the separation table 341, each of the plurality of removal roller sections 342a having a pair of rollers 342b facing each other. Each roller 342b, facing each other, provided on each removal roller section 342a is energized in a direction so as to approach each other. The undesired portion 99 on the upper side of the panel substrate 90a of the substrate and the side edge on the lower side of the panel substrate 90a are inserted between each roller 342b by the insertion robot (not shown). Each roller 342b rotates only in one direction in which the panel substrate 90a is inserted between each roller 342b. The pair of rollers 342b facing each other is set such that the rotating directions thereof are opposite with respect to each other.

Figure 37:
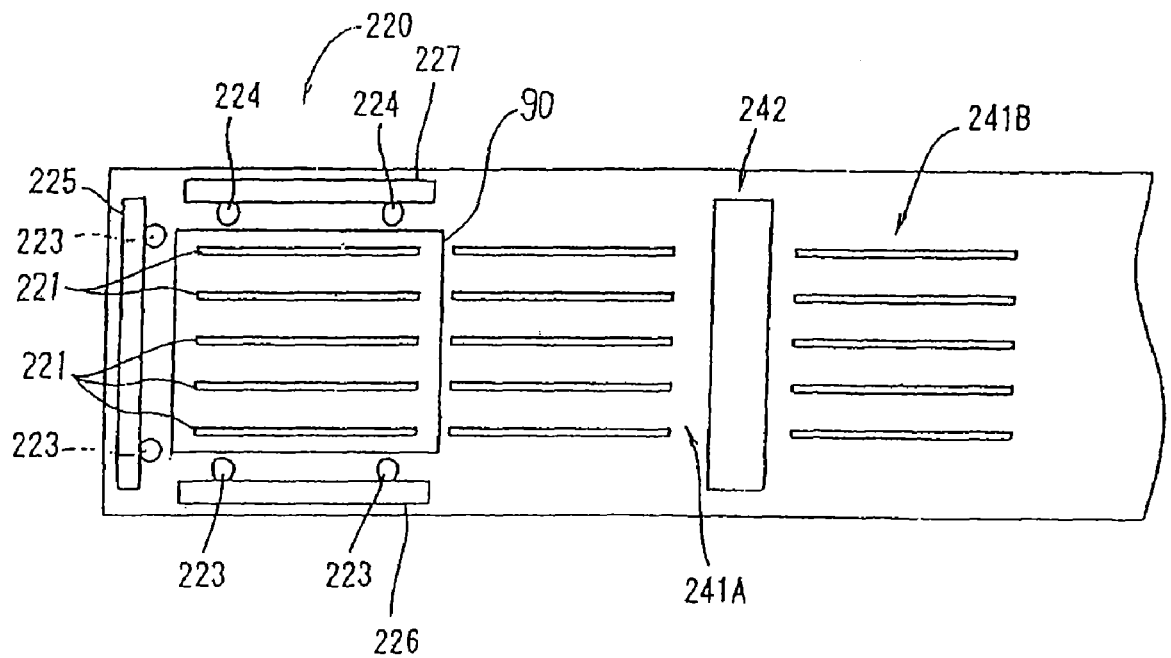
FIG. 37 is a partial schematic plan view for explaining the operation of the substrate cutting system according to Embodiment 2 of the present invention.

The operation of the substrate cutting system, having such a structure, according to Embodiment 2 will be described, mainly using a case in which a bonded substrate for which large-sized glass substrates are bonded to each other is cut. When a bonded mother substrate 90 for which large-sized glass substrates are bonded to each other is cut into a plurality of panel substrates 90a (see FIG. 16), as shown in FIG. 37, a transportation device (not shown) in the previous step mounts the bonded mother substrate 90 on the belt 221e of each of the plurality of substrate supporting bases 221 of the positioning unit section 220 according to Embodiment 2.

Thereafter, a plurality of supporting bases 221, which supports the bonded mother substrate 90, lowers, by up-and-down moving device 222, to a height, from which the substrate of the substrate cutting system according to the present invention is transported by a conveyor.

Figure 38:
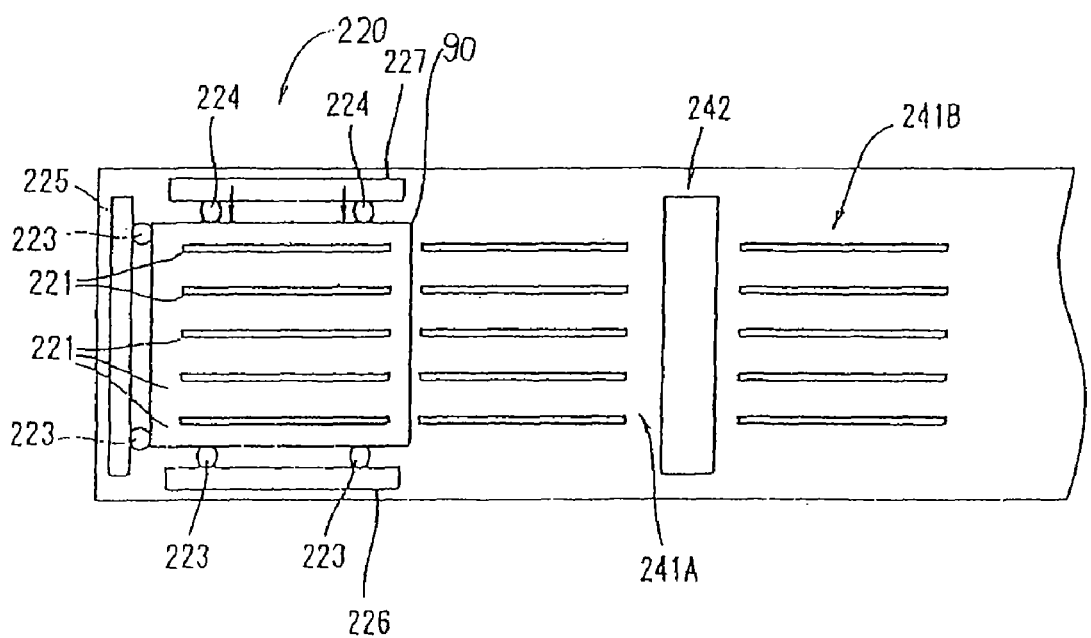
FIG. 38 is a partial schematic plan view for explaining the operation of the substrate cutting system according to Embodiment 2 of the present invention.

As shown in FIG. 38, while the bonded mother substrate 90 is mounted on the belt 221e of each of the substrate supporting bases 221, the belt 221e of each of the substrate supporting bases 221 is circled toward the substrate carry-in side, and the side edge of the bonded mother substrate 90 on the substrate carry-in side is contacted to a plurality of reference rollers 223 provided in a guide bar 225 of the positioning unit section 220.

After the side edge of the bonded mother substrate 90 on the substrate carry-in side is contacted to a plurality of reference rollers 223 provided in the guide bar 225 of the positioning unit section 220, the bonded mother substrate 90 is pushed toward reference rollers 223 of a guide bar 226 by pushers 224 of a guide bar 227 of the positioning unit section 220, and the side edge of the bonded mother substrate 90 on the guide bar 226 is contacted to the reference roller 223 provided on the guide bar 226. Thus, the bonded mother substrate 90 is positioned on the belts 221e of the substrate supporting bases 221.

Thereafter, the push of the bonded mother substrate 90 toward the reference rollers 223 of the guide bar 226 by the pushers 224 of the guide bar 227 of the positioning unit section 220 is stopped. The bonded mother substrate 90 positioned by the positioning unit section 220 is moved toward a position where the bonded mother substrate 90 on the first substrate supporting section 241A of the scribing unit section 240 is clamped by the clamp devices 251 when the belt 221e of each of the substrate supporting bases 221 of the positioning unit section 220 and the timing belt of each of the plurality of first substrate supporting units 244A of the first substrate supporting section 241A of the scribing unit section 240 are synchronized and circled at the same circling speed in the substrate carry-out direction. Thereafter, the side edge of the bonded mother substrate 90 on the substrate carry-in side is clamped by the clamp devices 251.

When the bonded mother substrate 90 is transported from the positioning unit section 220 to the scribing unit section 240, the clamp members 51 of the clamp devices 251 wait at a predetermined position which is below the timing belts of the plurality of first substrate supporting units 244A of the first substrate supporting section 241A. After the bonded mother substrate 90 is transported to a position where it is held by the clamp devices 251, the clamp members 51 move upward and grip the side edge of the bonded mother substrate 90.

Figure 39:
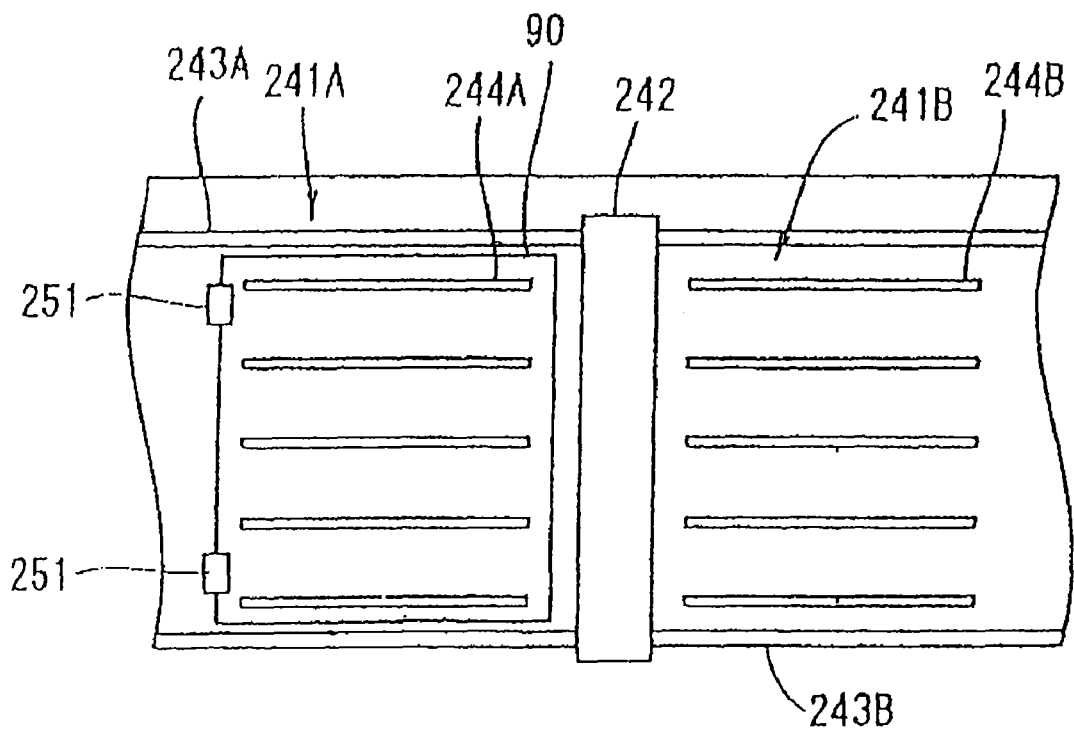
FIG. 39 is a partial schematic plan view for explaining the operation of the substrate cutting system according to Embodiment 2 of the present invention.

As shown in FIG. 39, when the side edge of the bonded mother substrate 90 on the mother substrate carry-in side is clamped by the clamp devices 251, each clamp member, which clamps the side edge of the bonded mother substrate 90, lowers at approximately the same time due to the weight of the bonded mother substrate 90. Therefore, the bonded mother substrate 90 is additionally supported by the timing belts of all the first substrate supporting units 244A.

Each of the clamp devices 251 holding the bonded mother substrate 90 is moved toward the substrate carry-out side such that the cutting device guide body 242 is located at a predetermined position above the side edge of the bonded mother substrate 90 on the substrate carry-out side, the bonded mother substrate 90 being clamp in a horizontal state by the clamp devices 251. Simultaneous to when each of the clamp devices 251 starts moving toward the substrate carry-out side, the timing belt of each of the first substrate supporting units 244A and the timing belt of each of the second substrate supporting units 244B are circled in the substrate carry-out direction at the same circling speed as the moving speed of each of the clamp devices 251. After each of the clamp devices 251 completed the movement to the substrate carry-out side, the circling of the timing belt of each of the first substrate supporting units 244A and the timing belt of each of the second substrate supporting units 244B is stopped.

A first optical device and a second optical device provided on the cutting device guide body 242 move along the cutting device guide body 242A from respective waiting positions and capture a first alignment mark and a second alignment mark, respectively, provided on the bonded mother substrate 90.

When each of clamp devices holding the bonded mother substrate 90 slides, the timing belts 21*e* of the first substrate supporting units 244A of the first substrate supporting section 241A and the timing belts 21*e* of the second substrate supporting units 244B of the second substrate supporting section 241B are rotated at the same circling speed of each of the clamp devices 251 in the same direction as the moving direction of each of the clamp devices 251. Thus, the bonded mother substrate 90 held by the clamp devices 251 is supported, without being rubbed against the timing belts, by the timing belts of the first substrate supporting units 244A of the first substrate supporting section 241A and the timing belts of the second substrate supporting units 244B of the second substrate supporting section 241B.

Next, based on the result of the captured first alignment mark and second alignment mark, the inclination of the bonded mother substrate 90 with respect to the cutting device guide body 242, the starting position of cutting the bonded mother substrate 90 and the ending position of cutting the bonded mother substrate 90 are calculated by an operational processing device (not shown), the bonded mother substrate 90 being supported by the clamp devices 251 in a horizontal state. Based on the result of the calculation, each of the clamp devices 251 as well as the upper substrate cutting device 60 and the lower substrate cutting device 70 are moved so as to cut the bonded mother substrate 90 (which is referred to as "scribing by linear interpolation" or "cutting" by linear interpolation).

In this case, each cutter wheel 62*a* facing each other is pressed so as to make contact onto the top surface and the bottom surface of the bonded mother substrate 90 and rolled on the top surface and the bottom surface of the bonded mother substrate 90, respectively, so as to form scribing lines 95 on the top surface and the bottom surface of the bonded mother substrate 90.

Figure 40:
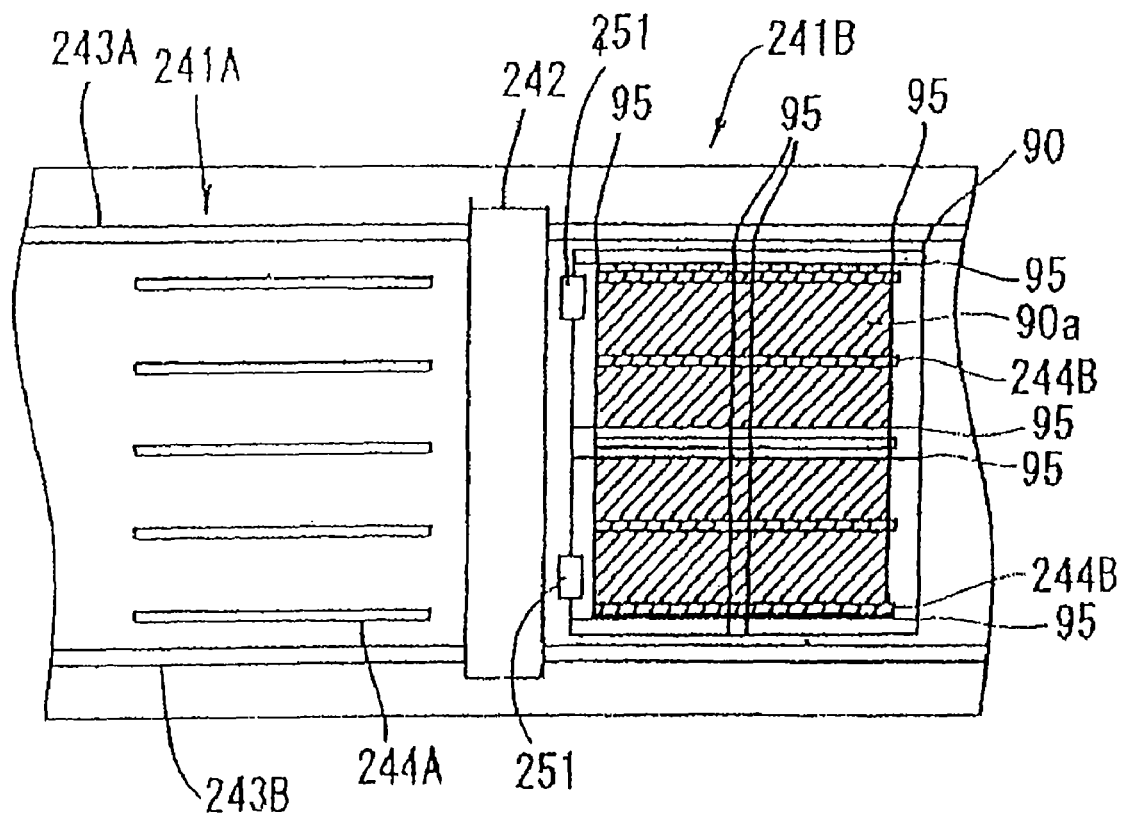
FIG. 40 is a partial schematic plan view for explaining the operation of the substrate cutting system according to Embodiment 2 of the present invention.

FIG. 40 is a view showing a state in which each of the second substrate supporting section 241B supports the bonded mother substrate after the scribing lines 95 are formed at the side edge of four panel substrates 90*a* in order to cut four panel substrates from the bonded mother substrate 90 by pressing and rolling the cutter wheel 62*a* of the upper substrate cutting device 60 and the cutter wheel 62*a* of the lower substrate cutting device 70.

The bonded mother substrate 90 is, for example, as shown in FIG. 40, cut so that two panel substrates 90*a* are cut into two lines in a direction along the upper guide rail 252 and the lower guide rail 253. The cutter wheel 62*a* of the upper substrate cutting device 60 and the cutter wheel 62*a* of the lower substrate cutting device 70 are pressed so as to make contact and rolled along the side edge of the display panels 90*a* in order to cut four panel substrates 90*a* from the bonded mother substrate 90.

In this case, vertical cracks are created, by the cutter wheel 62*a* of the upper substrate cutting device 60 and the cutter wheel 62*a* of the lower substrate cutting device 70 on the part where each cutter wheel 62*a* is respectively pressed so as to make contact each glass substrate and rolled on each glass substrate. As a result, scribing lines 95 are formed thereon. Protrusions are formed, with a predetermined pitch, on the blade edge of each cutter wheel 62*a* in a circumferential direction. Thus, a vertical crack having about 90% of thickness of the glass substrate in the thickness direction is formed on each glass substrate.

A scribing method is effectively applied to cutting the bonded mother substrate 90 in the substrate cutting system according to the present invention, the scribing method using the cutter head including a mechanism for vibrating a scribing cutter (e.g., a diamond point cutter or a cutter wheel), which scribes the bonded mother substrate 90 so as to periodically change the pressure force of the scribing cutter on the bonded mother substrate 90.

When scribing the top and bottom surfaces of the bonded mother substrate 90 is completed and the state shown in FIG. 40 is formed, then the clamping (holding) of the bonded mother substrate 90 by the clamp devices 251 are released, and the bonded mother substrate 90 is mounted on the second substrate supporting section 241B.

Regarding a scribing method for forming a scribing line on a side edge of each of four panel substrates 90*a* in order to cut the four panel substrates 90*a* from the bonded mother substrate 90 by pressing and rolling the cutter wheel 62*a* of the upper substrate cutting device 60 and the cutter wheel 62*a* of the lower substrate cutting device 70, respectively, the scribing method according to Embodiment 1 shown in FIGS. 17 to 19 is effectively applied to the substrate cutting system according to Embodiment 2, other than the substrate cutting system shown in FIG. 40.

After the bonded mother substrate 90 is scribed by the upper substrate cutting device 60 and the lower substrate cutting device 70 of the cutting device guide body 242 of the scribing unit section 240, the clamping (holding) of the bonded mother substrate by the clamp devices 251 is released, the scribed bonded mother substrate 90 is placed into a state where it is only supported by the plurality of second substrate supporting units 244B of the second substrate supporting section 241B.

The scribed bonded mother substrate 90 supported on the timing belts of the plurality of second substrate supporting units 244B of the second substrate supporting section 241B is transported onto the belt 261 of the buffer conveyor section 260 when the timing belt of each of the plurality of second substrate supporting units 244B of the second substrate supporting section 241B of the scribing unit 240 and the belt 261 of the buffer conveyor section 260 are synchronized and circled at the same circling speed in the substrate carry-out direction.

The scribed bonded mother substrate 90 transported onto the belt 261 of the buffer conveyor section 260 is transported to the steam break unit section 280 when the belt 261 of the buffer conveyor section 260 and the belt of the belt conveyor 285, which is provided on the substrate carry-out side of the steam break unit section 280, are synchronized and circled at the same circling speed in the substrate carry-out direction.

In the steam break unit section 280, an upper steam unit attachment bar 281 and a lower steam unit attachment bar 282 are attached to pillars 283 along the X direction in parallel to the cutting device guide body 242. The upper steam unit attachment bar 281 attaches a plurality of steam units 284 for spraying steam onto the mother substrate 91 on the upper side of the bonded mother substrate 90. The lower steam unit attachment bar 282 attaches a plurality of steam units 284 for spraying steam onto the mother substrate 92 on the lower side of the bonded mother substrate 90.

The circling speed of the belt conveyor 285 provided on the substrate carry-out side of the steam break unit section 280 is set at approximately the same circling speed of the timing belt 261e of the buffer conveyor section 260. When the belt conveyor 285 circles in synchronization with the timing belt 261e of the buffer conveyor section 260, the scribed bonded mother substrate 90 passes through the steam break unit section 280.

An air knife 286 is provided on the upper steam unit attachment bar 281 on the substrate carry-out side. A steam unit 284 and an air knife 286 that are similar to the air knife attached to the upper steam unit attachment bar 281 are provided on the lower steam unit attachment bar 282. Thus, after steam is sprayed on the top and bottom surfaces of the bonded mother substrate 90, the moisture remaining on the top and bottom surfaces of the bonded mother substrate 90 is completely removed.

After the scribed bonded mother substrate 90 mounted on the second substrate supporting units is transported onto the belt of the buffer conveyor section 260, the belt of the buffer conveyor section 260 and the belt of the belt conveyor 285, which is provided on the substrate carry-out side of the steam break unit section 280, are synchronized and circled at the same circling speed in the substrate carry-out direction. Thus, the scribed bonded mother substrate 90 passes through the steam break unit section 280 and are cut into panel substrates 90a and the panel substrates 90a are suspended on the belt conveyor 285.

The bonded mother substrate 90 is cut into a plurality of panel substrates 90a when it passes through the steam break unit section 280. The panel substrates 90a which is moving or stopped, supported by the belt conveyor 285 are lifted by the carry-out robot 310 and mounted on the panel supporting section 322 of the inversion transportation robot 321 of the panel inversion unit section 320.

The inversion panel robot 321 of the panel inversion unit section 320 receives the panel substrates 90a from the carry-out robot 310 of the substrate transportation unit section 300, inverts the sides (top and bottom) of the panel substrates 90a and mounts the panel substrates 90a on the separation table 341 of the panel terminal separation section 340.

Referring to the panel substrates 90a mounted, by the inversion transportation robot 321, on the separation table 341 of the panel terminal separation section 340, for example, an undesired portion 99 of the panel substrates 90a is separated from the panel substrate 90a by an undesired portion removal mechanism 342 which is provided in the vicinity of each side edge of the separation table 341, as shown in FIG. 40, whereby the undesired portion removal mechanism 342 is, for example, provided by an insertion robot (not shown).

By employing the scribing method according to Embodiment 1 shown in FIG. 22 to FIG. 31 as the scribing method by the upper substrate cutting device 60 and the lower substrate cutting device 70 of the cutting device guide body 242, a cutting step of the bonded substrate 90 by the steam unit section 280 can be omitted.

Further, as a method for cutting the substrate, a method in which double scribing lines are formed on the bonded mother substrates, for which glass substrates which are one type of brittle material substrate are bonded as mother substrates, has been described as an example. However, the present invention is not limited to this. When the mother substrate is made of a metal substrate (e.g., a steel plate), a wood plate, a plastic substrate or a brittle material substrate (e.g., a ceramic substrate, glass substrate or semiconductor substrate), a substrate cutting method for cutting the mother substrate by using, for example, a laser light, a dicing saw, a cutting saw, or a diamond-studded blade cutter is used.

Furthermore, the substrate according to the present invention includes, other than mother substrate, a bonded substrate for which mother substrates are bonded to each other, a bonded substrate for which different mother substrates are combined and bonded to each other, and a stacked substrate for which mother substrates are combined and stacked on each other.

Embodiment 3

Figure 41:
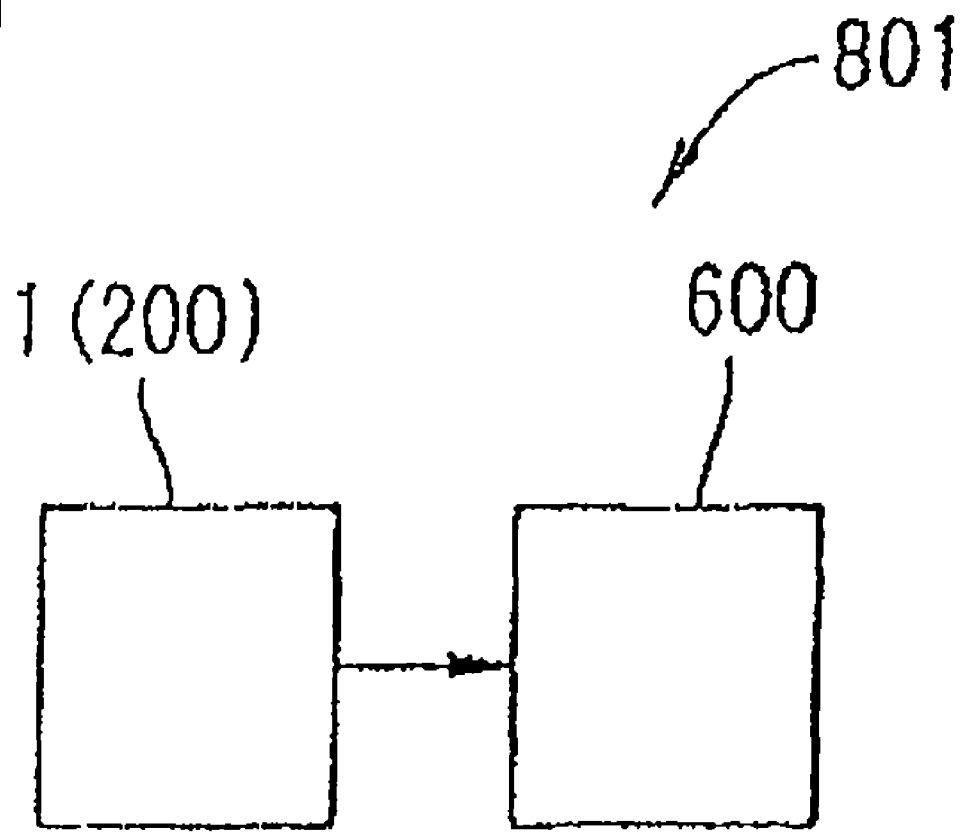
FIG. 41 is a view schematically showing an example of the structure of a substrate manufacturing apparatus according to the present invention in Embodiment 3.

A substrate manufacturing apparatus 801 shown in FIG. 41 is obtained by connecting a substrate chamfering system 600 for chamfering end surfaces of the cut substrates to one of the substrate cutting systems 1 and 200 according to the present invention. Furthermore, the substrate manufacturing apparatuses 802 and 803 shown in FIG. 42 are obtained by incorporating an inspection system 700 for inspecting the size, conditions of the top and bottom surfaces, end surfaces, and the like of the cut substrates and for inspecting the functions of the substrates into the substrate manufacturing apparatus 801 described above.

In the above description of the operations of the substrate cutting systems according to Embodiments 1 and 2, examples in which the bonded mother glass substrate formed by bonding glass substrates to each other is cut have been described. However, the present invention is not limited to these. For example, operations different from the above description can be performed depending on the types of the substrates to be cut or in order to enhance the functionalities of the devices which constitute the substrate cutting system.

In the above description of Embodiments 1 and 2, the substrate cutting systems for cutting the bonded mother substrate formed by bonding glass substrates to each other into a plurality of display panels have been mainly described. However, the substrate which can be applied to the present invention is not limited to this. The substrate used in the substrate cutting system according to the present invention includes a metal substrate (e.g., a steel plate), a wood plate, a plastic plate and a brittle material substrate (e.g., a ceramic substrate, a semiconductor substrate and a glass substrate) as a mother substrate. Furthermore, the substrate used in the substrate cutting system according to the present invention includes a bonded substrate for which mother substrates are bonded to each other, a bonded substrate for which different mother substrates are combined and bonded to each other, and a stacked substrate for which mother substrates are combined and stacked on each other.

The substrate cutting system can be applied to the cutting of the mother substrate for a PDP (plasma display) used for an FPD (flat panel display)), a liquid crystal display panel, a reflective projector panel, a transmissive projector panel, an organic EL device panel, an FED (field emission display) and the like as a bonded brittle mother substrate for which brittle material substrates are bonded to each other.

Embodiment 4

Figure 44:
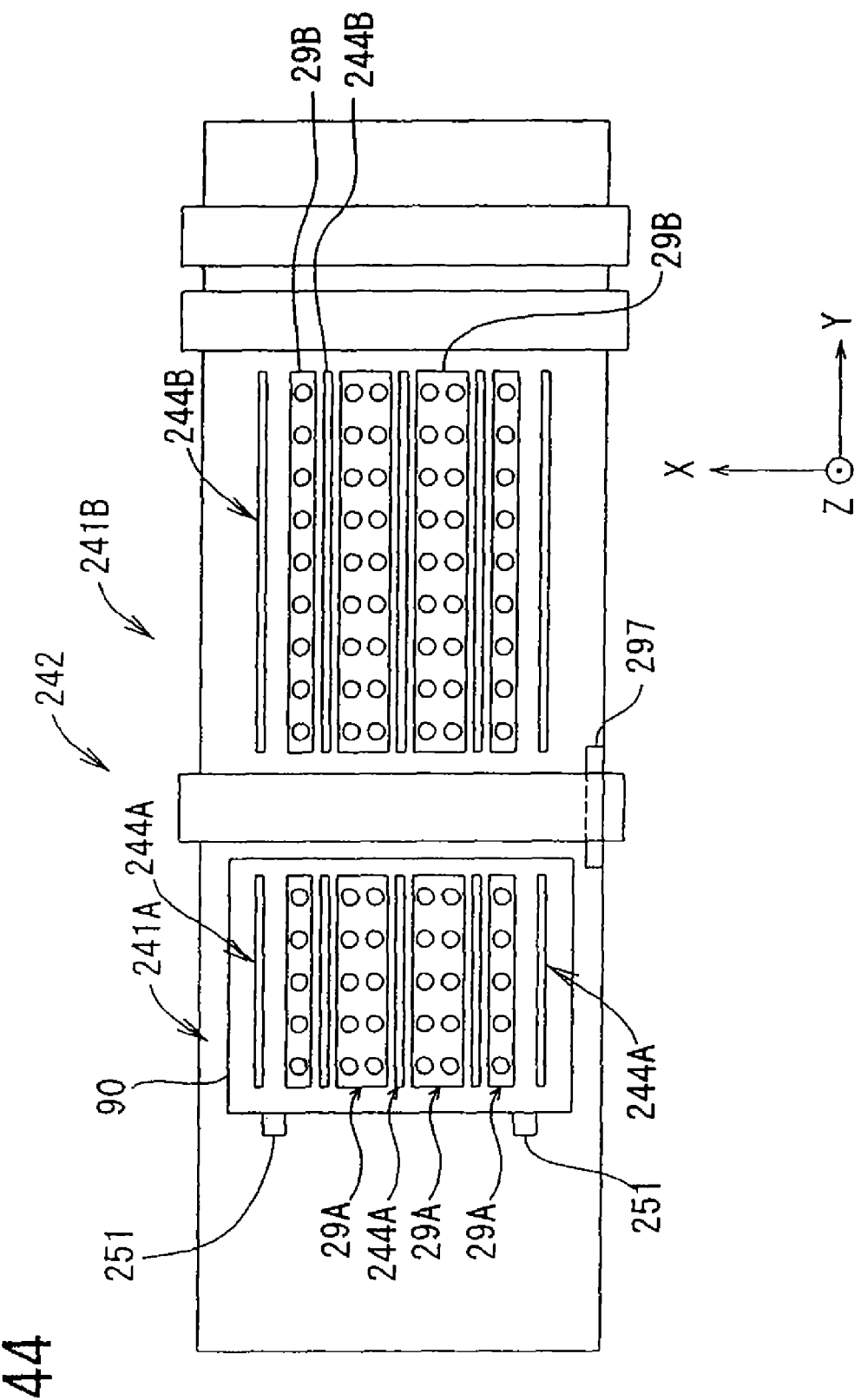
FIG. 44 is a plan view schematically showing a substrate cutting system according to Embodiment 4 of the present invention.

A substrate cutting system according to Embodiment 4 has a similar structure to the substrate cutting system according to Embodiment 2 except that the structure of the first substrate supporting section 241A and the second substrate supporting section 241B is different from each other. As shown in FIG. 44, in the first substrate supporting section 241A according to Embodiment 4, first substrate floating units 29A are provided between the first substrate supporting units 244A adjacent to each other. The structure of the first substrate supporting unit 244A is similar to that in Embodiment 2. The first substrate supporting section 241A and the second substrate supporting section 241B configure a substrate supporting device.

Figure 45:
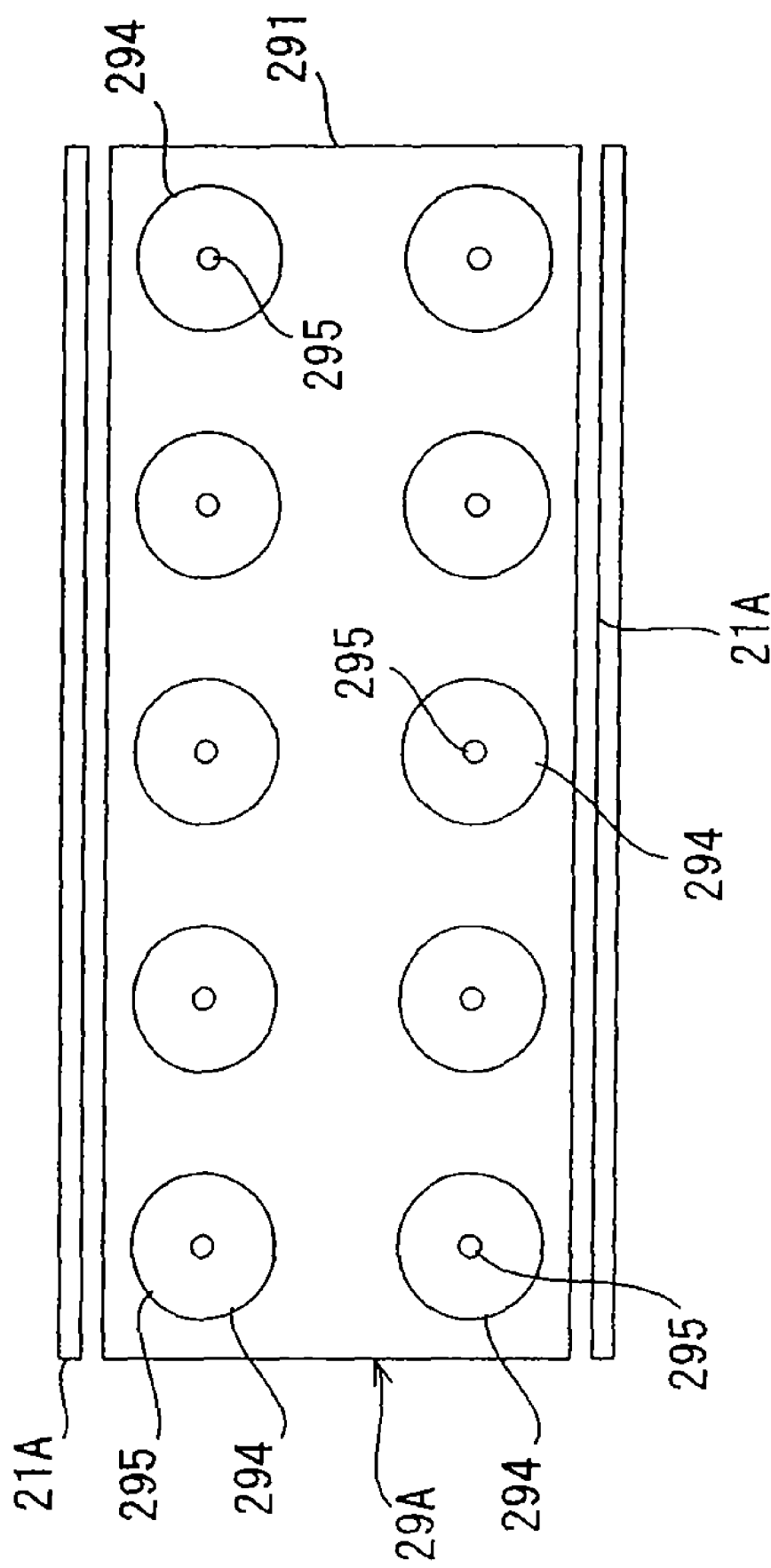
FIG. 45 is a plan view schematically showing a first substrate floating unit in the substrate cutting system.
Figure 46:
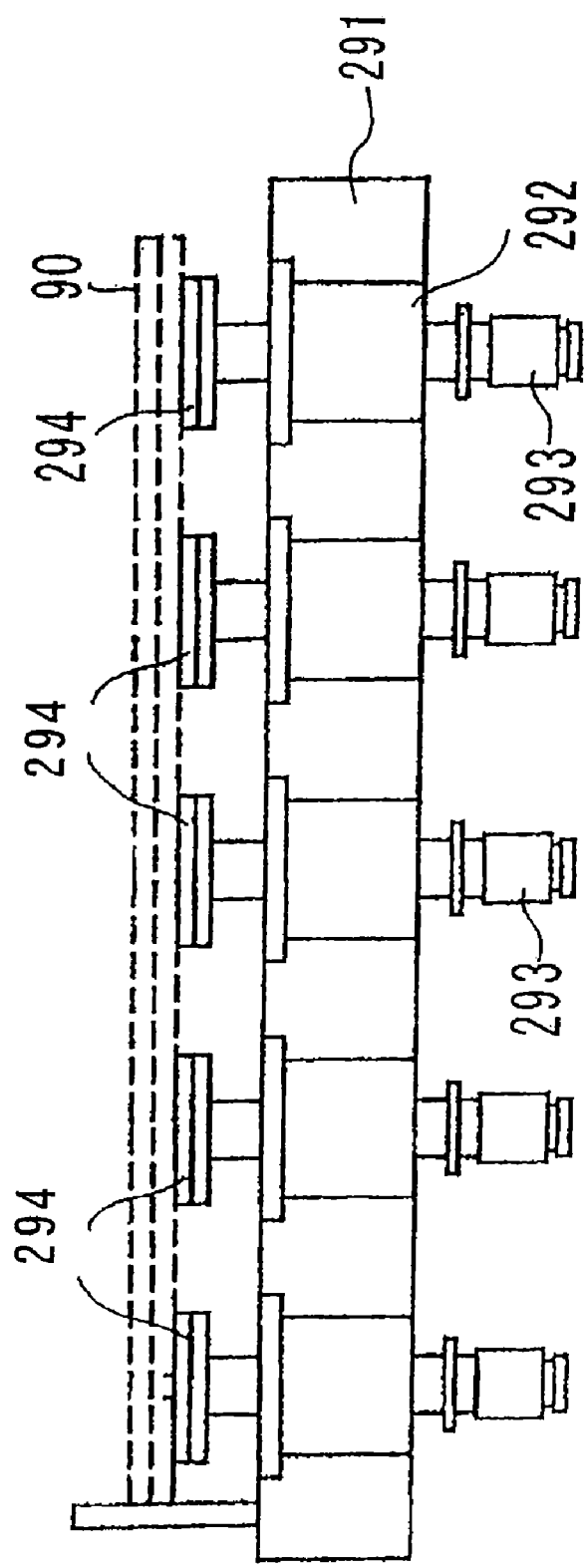
FIG. 46 is a side view showing the first substrate floating unit.
Figure 47:
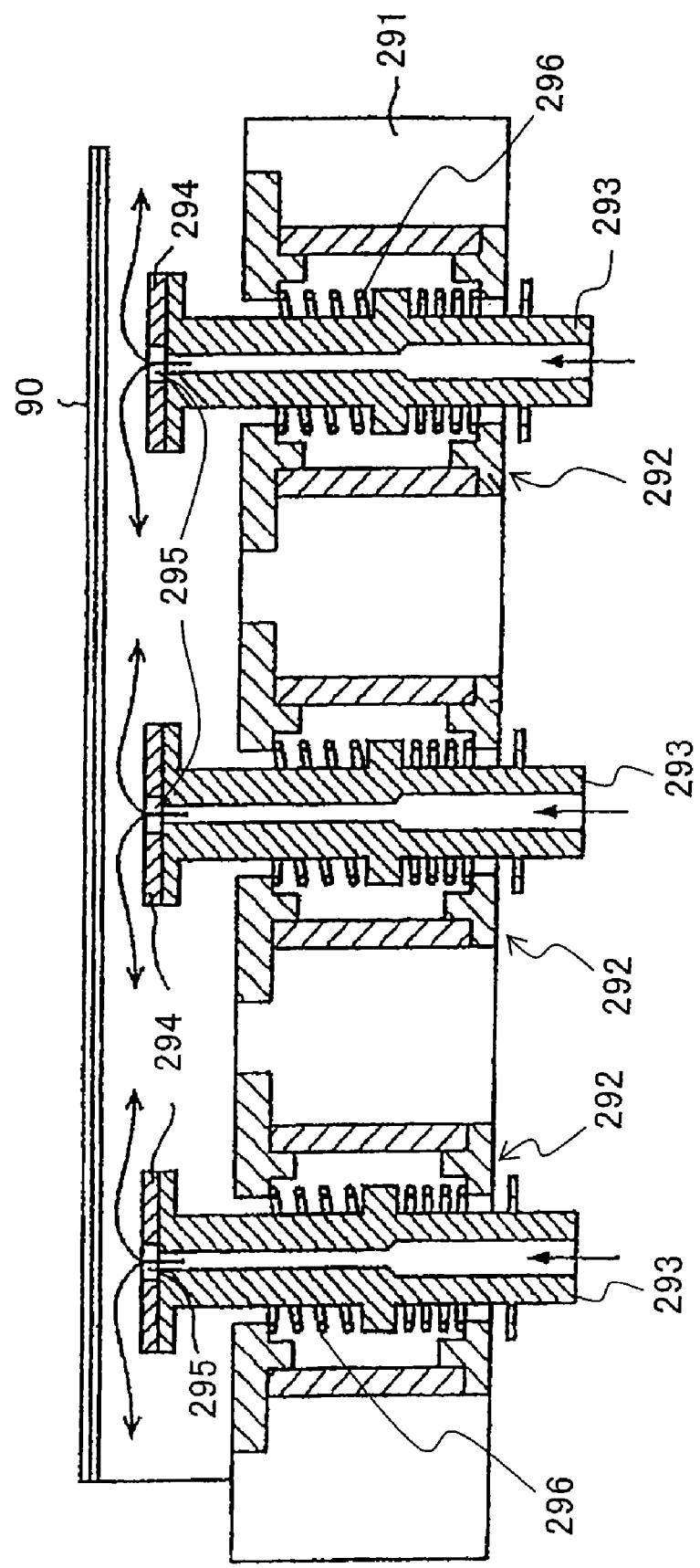
FIG. 47 is a longitudinal-sectional view of the first substrate floating unit.

The first substrate floating units 29A other than those arranged on both sides of the first substrate supporting section 241A, respectively, have a similar structure to each other. FIG. 45 is a plane view showing the first substrate floating unit 29A. FIG. 46 is a side view thereof. FIG. 47 is a longitudinal-sectional view thereof. The first substrate floating unit 29A includes a horizontal table arranged between the first substrate supporting units 244A adjacent to each other; and buffer heads 292 arranged in two columns in the table 291 along the Y direction. The size of the table 291 in the width direction is approximately the same as the space between the first substrate supporting units 244A adjacent to each other. In each of the first substrate floating units 29A arranged on both sides of the first substrate supporting section 241A, respectively, the size of the table 291 in the width direction is shortened such that a gap is formed, through each of the clamp devices 251 can pass between each of the first substrate floating units 29A respectively provided on both sides of the first substrate supporting section 241A and each of the respective first substrate supporting units 244A respectively provided on both sides of the first substrate supporting section 241A.

Each of the buffer heads 292, as shown in FIG. 47, includes: an air gushing rod 293 attached in a vertical state with respect to the table 291 so as to be movable in the up-and-down direction; and a disk-shaped buffer pad 294 attached, in the horizontal state, to the top end of the air gushing rod 293, respectively.

Each of the air gushing rods 293 is supported by a spring coil 296 so as to be elastically inclinable and movable in the upper-and down direction. The central portion of the axle of the air gushing rod 293 is a hollow air flowing path, and compressed air is supplied to this air flowing path. In the central portion of each of the buffer pad 294, an air gushing opening 295, from which the compress air supplied to the air flowing path is gushed, is formed, respectively. With the compressed air gushed from each of the air gushing openings 295, the bonded mother substrate 90 provided thereabove is lifted above.

Figure 48:
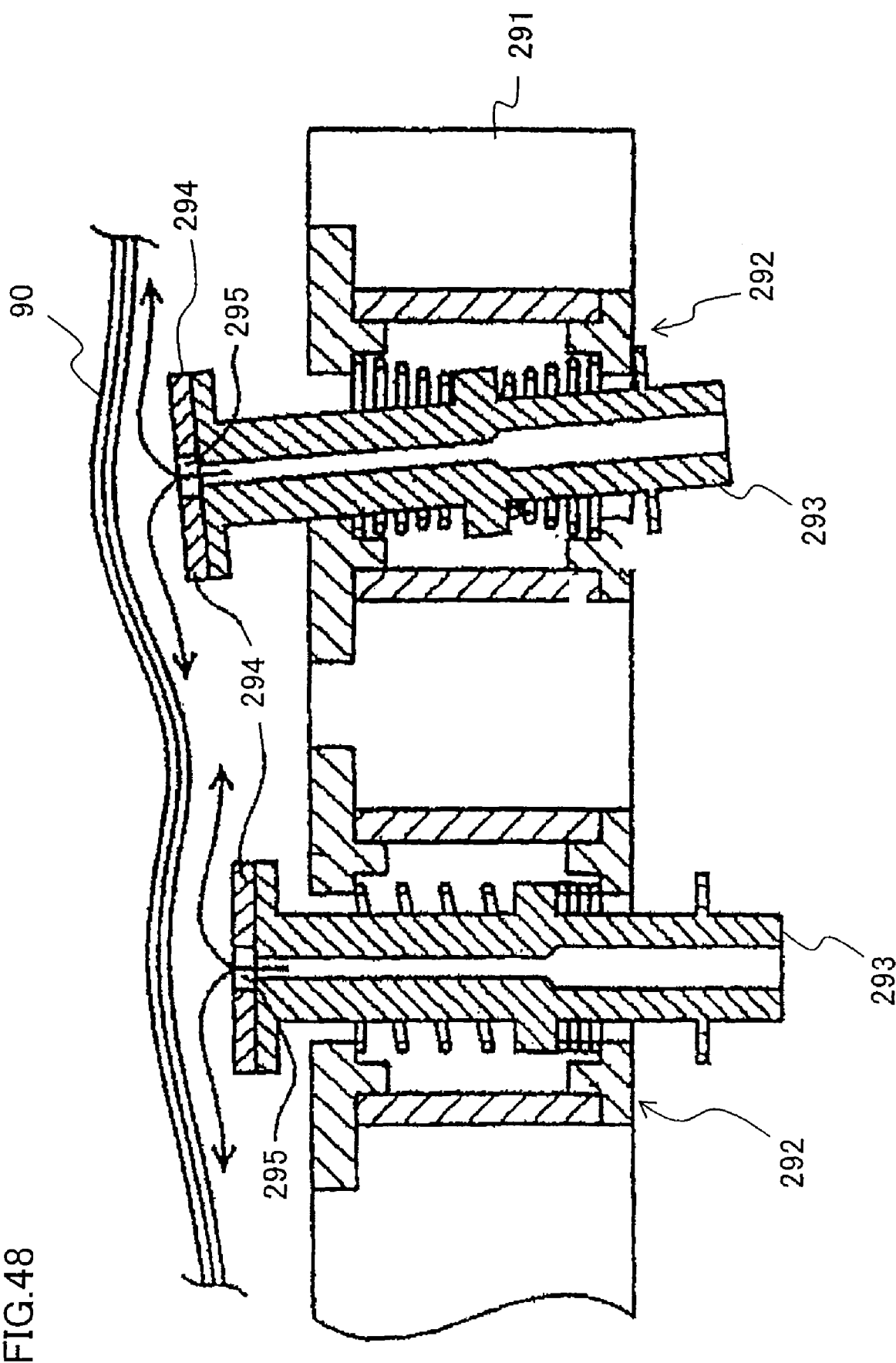
FIG. 48 is a longitudinal-sectional view for explaining the operation of the first substrate floating unit.

The air gushing rod 293 of each of the buffer heads 292 provided in the table 291 is, as shown in FIG. 48, inclinable with respect to the table 291. Owing to this structure, due to the gushing of the compressed air (Bernoulli effect), the buffer pads 294 of the buffer heads 292 entirely move in accordance with the bendings or undulations on the mother bonded substrate 90, and the buffer pads 294 move such that the interval between the bonded mother substrate 90 and each of the buffer pads 294 is maintained constant. The compressed air caused to gush out of each of the air gushing openings 295 flows in layers along the radiation direction of the buffer pad 294. Therefore, the space between the mother bonded substrate 90 and each of the buffer pads 294 can be maintained constant. As a result, any damage to the back surface of the mother bonded substrate 90 can be prevented, thereby maintaining the state in which the mother bonded substrate 90 stably floats.

The first substrate floating units 29A respectively provided on both sides of the first substrate supporting section 241A have the same structure as that of the rest of the first substrate floating units 29A except that the size in the width direction of the table 291 is short such that a gap is formed, through each of the clamp devices 251 can pass between each of the first substrate floating units 29A respectively provided on both sides of the first substrate supporting section 241A and each of the respective first substrate supporting units 244A respectively provided on both sides of the first substrate supporting section 241A; and buffer heads 292 in one column are provided in the table 291 along the Y direction.

In the present Embodiment, as shown in FIG. 44, in the second substrate supporting section 241B, second substrate floating units 29B which are same as the first substrate floating units 29A are respectively provided between adjacent second substrate supporting units 244B to each other.

In the substrate cutting system having such a structure, similar to Embodiment 2, the bonded mother substrate 90 positioned by the positioning unit section 220 (see FIG. 32) is transported to a predetermined position of the first substrate supporting section 241A when the positioning unit section 220 and the timing belt of each of the first substrate supporting units 244A are synchronized and circled.

In this manner, when the bonded mother substrate 90 is transported to the predetermined position with respect to the cutting device guide body 242, the side edge of the bonded mother substrate 90, which is positioned on the substrate carry-in side, is clamped by each of clamp members 51 of the clamp devices 251.

Then, compressed air is supplied to the air gushing rod 293 provided on each of the first substrate floating units 29A and each of the second substrate floating units 29B, and the compressed air is gushed out of the air gushing opening 295 respectively provided in the central portion of each of buffer pads 294. Concurrently, each of the clamp members 51 is moved upward to a predetermined height. As a result, the bonded mother substrate 90 clamped by the clamp members 51 is lifted by the compressed air which is gushed out of each of the air gushing openings 295, thereby the bonded mother substrate 90 being held at the predetermined height by the clamp members 51.

Instead of moving the clamp members 51 upward to the predetermined height, it is possible to hold the clamp members 51 so as to be movable in the upward-and-downward direction. Alternatively, it is possible to energize the clamp members 51, which are held so as to be movable in the upward-and-downward direction, upward with the force equivalent to the weight of each of the clamp members 51 by using an air cylinder or the like. By constructing the clamp member 51 having such a structure, it is possible to cause the clamp members 51 to follow the substrate lifted by the first substrate floating units 29A and the second substrate floating units 29B and move the clamp members 51 in the upward-and-downward direction.

In this state, a first optical device and a second optical device provided on the cutting device guide body 242, respectively, capture a first alignment mark and a second alignment mark, respectively, provided on the bonded mother substrate 90. The inclination of the bonded mother substrate 90 with respect to the cutting device guide body 242, the bonded mother substrate 90 being supported in the horizontal state by the clamp devices 251, the starting position of cutting the bonded mother substrate 90 and the ending position of cutting the bonded mother substrate 90 are calculated. Based on the result of the calculation, the clamp devices 251 holding the bonded mother substrate 90 as well as the upper substrate cutting device 60 and the lower substrate cutting device 70 are moved so as to scribe the bonded mother substrate 90.

The scribing operation in this case is similar to that in Embodiment 2. The bonded mother substrate 90 clamped by the clamp devices 251 is slid by the clamp devices 251 along the Y direction while it is lifted from the timing belts by the first substrate floating units 29A and the second substrate floating units 29B. Concurrently, the bonded mother substrate 90 is scribed by the upper substrate cutting device 60 and the lower substrate cutting device 70 along the Y direction. When it is necessary to scribe a plurality of scribing lines along the Y direction, one scribing line is formed, ant then the bonded mother substrate 90 is slid toward the substrate carry-in side by the clamp devices 251, and then the bonded mother substrate 90 is slid toward the substrate carry-out side along the Y direction, thereby the next scribing line being formed.

When the formation of all the scribing lines along the Y direction is completed, the scribing is performed on the bonded mother substrate 90 along the X direction. When a plurality of scribing lines are formed along the X direction, the scribing lines are formed on the bonded mother substrate 90 along the X direction starting in turn from the side edge opposite to that clamped by the clamp devices 251. Also in this case, the bonded mother substrate 90 is slid by the clamp members 51 along the Y direction while it is lifted from the timing belts by the first substrate floating units 29A and the second substrate floating units 29B, and the bonded mother substrate 90 is placed at the predetermined position with respect to the upper substrate cutting device 60 and the lower substrate cutting device 70. The bonded mother substrate 90 is scribed along the X direction by the upper substrate cutting device 60 and the lower substrate cutting device 70 while the transportation by the clamp members 51 is stopped.

The bonded mother substrate 90 is in a state in which it is lifted from the timing belts when the scribing is performed in the X direction. Thus, a stopper 297 is, as shown in FIG. 44, provided between the first substrate floating units 29A and the second substrate floating units 29B on one side edge of the substrate supporting device 20 such that the bonded mother substrate 90 does not move due to the pressure by the upper substrate cutting device 60 and the lower substrate cutting device 70.

The bonded mother substrate 90 is slid in the Y direction by the clamp devices 251 each time one scribing line is formed along the X direction, and thereafter, the formation of the scribing line is performed along the next X direction.

As described above, the bonded mother substrate 90 is scribed by the upper substrate cutting device 60 and the lower substrate cutting device 70 in a state in which the bonded mother substrate 90 is lifted by the first substrate floating units 29A and the second substrate floating units 29B so as not contact the timing belts of the first substrate supporting units 244A and the timing belts of the second substrate supporting units 244B. Thus, there is no concern that the bonded mother substrate 90 is cut by being rubbed against the timing belts when the scribing is performed, thereby a stable scribing operation being performed.

When the entire scribing operation is completed, the bonded mother substrate 90 is slid in the Y direction by the clamp devices 251 so as to be placed above the timing belts of the second substrate supporting units 244B. Thereafter, simultaneously to the stop of the gushing of the compressed air from the first substrate floating units 29A and the second substrate floating units 29B being stopped, the clamp members 51 are lowered. As a result, the bonded mother substrate 90, for which the scribing is completed, is mounted on the timing belts of the second substrate supporting units 244B.

In such a state, the clamping of the bonded mother substrate 90 by the clamp devices 251 is released, and then the timing belts of the second substrate supporting units 244B are driven. As a result, the bonded mother substrate 90 mounted on the timing belts of the second substrate supporting units 244B is transported to the carry-out side.

As described above, there is no concern that stress is applied to the bonded mother substrate 90 due to the ununiformity of the direction and level of each of the timing belts when the bonded mother substrate 90 is scribed. Furthermore, it is not necessary to synchronize the sliding of the bonded mother substrate by the clamp devices 251 and the circling of each of the timing belts. Yet furthermore, there is no concern that the stress is generated due to the contacting of the bonded mother substrate 90 to each of the timing belts. Moreover, it is not necessary to synchronize the sliding speed of the bonded mother substrate 90 by the clamp devices 251 and the circling speed of each of the timing belts, thereby the controlling of the clamp devices 50 and each of timing belts being easy. Furthermore, when the bonded mother substrate 90 is slid by the clamp devices 251, it is possible to reduce the driving force for the clamp devices 251 since the bonded mother substrate 90 is being lifted in the air.

The structure of the first substrate floating units 29A and the second substrate floating units 29B is not limited to that described above. For example, a structure of the first substrate floating units 29A and the second substrate floating units 29B can be made in which an air gushing opening is formed at the top surface of the table 291 or alternatively, the top surface of the table 291 is made of porous material. The air gushing opening is formed in a groove.

The way of carrying-in and carrying-out the substrate to the scribing position is not limited to timing belts. Other transportation means can be used.

Embodiments 1, 2 and 4 have a structure that the first substrate supporting section, the second substrate supporting section and the substrate cutting device guide are fixed to the mounting base and the clamp devices are movable in the Y direction. Alternatively, it is possible to have a structure in which the clamp devices are fixed to the mounting base and the first substrate supporting section, the second substrate supporting section and the substrate cutting device guide are movable in the Y direction. In any manner, a structure only has to be made such that the first substrate supporting section, the second substrate supporting section and the substrate cutting device guide move relative to the bonded mother substrate 90 gripped by the clamp devices.

INDUSTRIAL APPLICABILITY

According to the substrate cutting system of the present invention, the substrate supported by the first substrate supporting units and the second substrate supporting units is moved in the Y direction while being held by the clamp devices; the substrate being moved can be cut in the X direction from the upper surface side and the lower surface side of the substrate by the substrate cutting device; and then, the substrate supported by the first substrate supporting units and the second substrate supporting units is reciprocated in the Y direction while being held by the clamp devices; and the substrate being moved can be cut in the Y direction from the upper surface side and the lower surface side of the substrate by the substrate cutting device. Therefore, it is possible to continuously cut single-plate substrates of both top and bottom surfaces forming the bonded substrate in two directions perpendicular to each other in a horizontal direction without the bonded substrate being inverted in the up-and-down direction or being rotated by 90 degrees in the horizontal direction. Thus, the entire system becomes compact and it is possible to continuously process in two directions with one setting, such as positioning.

The invention claimed is:

1. A substrate cutting system, comprising:
a mounting base having a substrate supporting device for supporting a substrate;
clamp devices for holding at least one part of a side edge of the substrate carried-in on the table, the clamp devices reciprocating the substrate along the (Y) direction, the (Y) direction being along one side of the mounting base;
a pair of substrate cutting devices for cutting both sides of the substrate, respectively; and
substrate cutting device guide bodies, fixed to the mounting base facing each other, for moving each of the substrate cutting devices on a top surface side and a bottom surface side of the substrate in the (X) direction perpendicular to the (Y) direction, the substrate being moved in the (Y) direction by the clamp devices,
wherein
the substrate supporting device further includes first substrate supporting units and second substrate supporting units, the first substrate supporting units and the second substrate supporting units are apart from each other in the (Y) direction and arranged with the substrate cutting devices therebetween, and
the first substrate supporting units and the second substrate supporting units support the substrate such that the substrate which has been moved in the (Y) direction by the clamp devices is cut along the (X) direction and the (Y) direction by the substrate cutting devices.

2. A substrate cutting system according to claim 1, wherein the first substrate supporting units and the second substrate supporting units support the substrate without rubbing against the substrate when the clamp devices moves while holding the substrate.

3. A substrate cutting system according to claim 2, wherein the first substrate supporting units and the second substrate supporting units are structured by conveyor belts, respectively, the conveyor belts being rotary-driven in the moving direction of the clamp devices at the same speed as that when the clamp devices move while holding the substrate.

4. A substrate cutting system according to claim 1, wherein the substrate cutting devices include a cutter wheel for forming a scribing line on the substrate; and a cutter head having a servo motor for transmitting a pressure force against the substrate to the cutter wheel.

5. A substrate cutting system according to claim 1, further comprising:
a steam unit section for spraying steam onto the top surface and the bottom surface of the substrate, on both of which the scribing line is scribed.

6. A substrate cutting system according to claim 5, wherein a substrate drying means is provided in the steam unit section, the substrate drying means for drying the top surface and the bottom surface of the substrate.

7. A substrate cutting system according to claim 5, further comprising a substrate carry-out device for retrieving the substrate cut by the steam unit section.

8. A substrate cutting system according to claim 7, wherein the substrate carry-out device includes a carry-out robot,
the carry-out robot includes:
a substrate holding means for holding the substrate;
a substrate rotating means for rotating the substrate holding means having the substrate held thereby about a first axis vertical to the substrate; and
a substrate circling means for circling the substrate rotating means around a second axis, the second axis being different from the first axis vertical to the substrate held by the substrate holding means.

9. A substrate cutting system according to claim 7, further comprising a substrate inversion means for inverting the top surface and the bottom surface of the substrate transported by the substrate transportation device.

10. A substrate cutting system according to claim 1, further comprising a positioning unit section for positioning the substrate to be transported to the substrate supporting device.

11. A substrate cutting system according to claim 6, further comprising a transportation unit for transporting the substrate to the substrate drying means, the substrate having been scribed by the substrate cutting device.

12. A substrate cutting system according to claim 1, further comprising a removal means for removing an unnecessary portion of the substrate cut by the substrate cutting devices.

13. A substrate cutting system according to claim 1, wherein the substrate is a bonded mother substrate for which a pair of mother substrates are bonded to each other.

14. A substrate manufacturing apparatus, comprising:
a substrate cutting system according to claim 1; and
a chamfering system for chamfering an edge face of a substrate cut by the substrate cutting system.

15. A substrate manufacturing apparatus, comprising:
a substrate cutting system according to claim 1; and
an inspection system for inspecting the function of a substrate cut by the substrate cutting system.

16. A scribing method for forming scribing lines on the top surface and the bottom surface of a substrate, comprising the steps of: providing a substrate cutting system according to claim 1; and forming at least two scribing lines along at least two lines to be scribed with the pair of substrate cutting devices facing each other, the pair of substrate cutting devices form a first scribing line, then move on the substrate so as to draw a circular region without being part from the substrate and then from a second scribing line.

17. A scribing method according to claim 16, wherein three or more scribing lines are formed by the pair of substrate cutting devices and a polygonal region is formed by all the formed scribing lines.

18. A scribing method according to claim 17, wherein a rectangular region is formed by the scribing lines.

19. A scribing method according to claim 16, wherein the pair of substrate cutting devices include a disk-shaped cutter wheel, blade edge contacting and rolling on the surface of the substrate being formed on the outer circumferences of the pair of substrate cutting device.

20. A scribing method according to claim 19, wherein a plurality of protrusions is formed on the blade edge of the cutter wheel with a predetermined pitch.

21. A scribing method according to claim 16, wherein the pair of cutting devices move on the substrate so as to draw a circular track, a pressure against the substrate is less than a pressure against the substrate when each scribing line is formed.

22. A substrate cutting method for cutting a substrate in which a scribing line is formed on each of the upper surface and the lower surface of the substrate, comprising the steps of: providing a substrate cutting system according to claim 1; and spraying steam onto the upper surface and lower surface of the substrate so as to cut the substrate.

* * * * *